United States Patent
Goto et al.

(10) Patent No.: US 10,682,928 B2
(45) Date of Patent: Jun. 16, 2020

(54) VEHICLE SLIDE RAIL DEVICE

(71) Applicant: TOYOTA BOSHOKU KABUSHIKI KAISHA, Aichi-ken (JP)

(72) Inventors: Naoki Goto, Aichi-ken (JP); Hiroyuki Suzuki, Aichi-ken (JP); Hiroaki Teraguchi, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 359 days.

(21) Appl. No.: 15/813,737

(22) Filed: Nov. 15, 2017

(65) Prior Publication Data
US 2018/0141468 A1    May 24, 2018

(30) Foreign Application Priority Data

Nov. 22, 2016    (JP) ................................ 2016-226948

(51) Int. Cl.
*F16M 13/00*    (2006.01)
*B60N 2/08*    (2006.01)
(Continued)

(52) U.S. Cl.
CPC ......... *B60N 2/0887* (2013.01); *B60N 2/0155* (2013.01); *B60N 2/123* (2013.01)

(58) Field of Classification Search
CPC ..... B60N 2/0887; B60N 2/0155; B60N 2/123
(Continued)

(56) References Cited

U.S. PATENT DOCUMENTS

| 3,711,056 A | * | 1/1973 | Gmeiner | ................ | B60N 2/071 248/429 |
| 8,393,591 B2 | * | 3/2013 | Mizuno | ................ | B60N 2/0705 248/424 |

(Continued)

FOREIGN PATENT DOCUMENTS

| DE | 202007016550 | 5/2009 |
| DE | 202009002581 | 8/2010 |
| JP | 2010-125917 | 6/2010 |

OTHER PUBLICATIONS

German Office Action issued in German Patent Appl. No. DE102017220221.1 dated Jan. 20, 2020, along with English-language translation.

*Primary Examiner* — Terrell L McKinnon
*Assistant Examiner* — Michael McDuffie
(74) *Attorney, Agent, or Firm* — Greenblum & Bernstein, P.L.C.

(57) ABSTRACT

A vehicle slide rail device including a memory operation link which is configured to release a lock mechanism while leaving a memory member in a state of defining a default position, a holding link which is configured to, in response to an operation of the memory operation link, be engaged with the memory operation link by being biased and hold the memory operation link in a release operated position, a detection member which is configured to come into contact with a trigger member installed and be moved so as to release the holding state of the memory operation link at the release operated position, and a variable structure which is engaged with the pressing portion of the holding link and is configured to change a position where the pressing portion is arranged in the holding link according to a movement of the memory operation link.

4 Claims, 33 Drawing Sheets

(51) Int. Cl.
*B60N 2/12* (2006.01)
*B60N 2/015* (2006.01)

(58) Field of Classification Search
USPC .......................................................... 248/429
See application file for complete search history.

(56) References Cited

U.S. PATENT DOCUMENTS

| | | | |
|---|---|---|---|
| 8,397,936 B2* | 3/2013 | Schleining | B65D 43/162 |
| | | | 206/521.1 |
| 2009/0058169 A1 | 3/2009 | Soga | |
| 2009/0134681 A1 | 5/2009 | Quast et al. | |
| 2011/0089305 A1* | 4/2011 | Yamada | B60N 2/071 |
| | | | 248/429 |
| 2012/0019037 A1 | 1/2012 | Rohnert et al. | |
| 2013/0056604 A1* | 3/2013 | Hayashi | B60N 2/0705 |
| | | | 248/429 |

\* cited by examiner

FIG.12

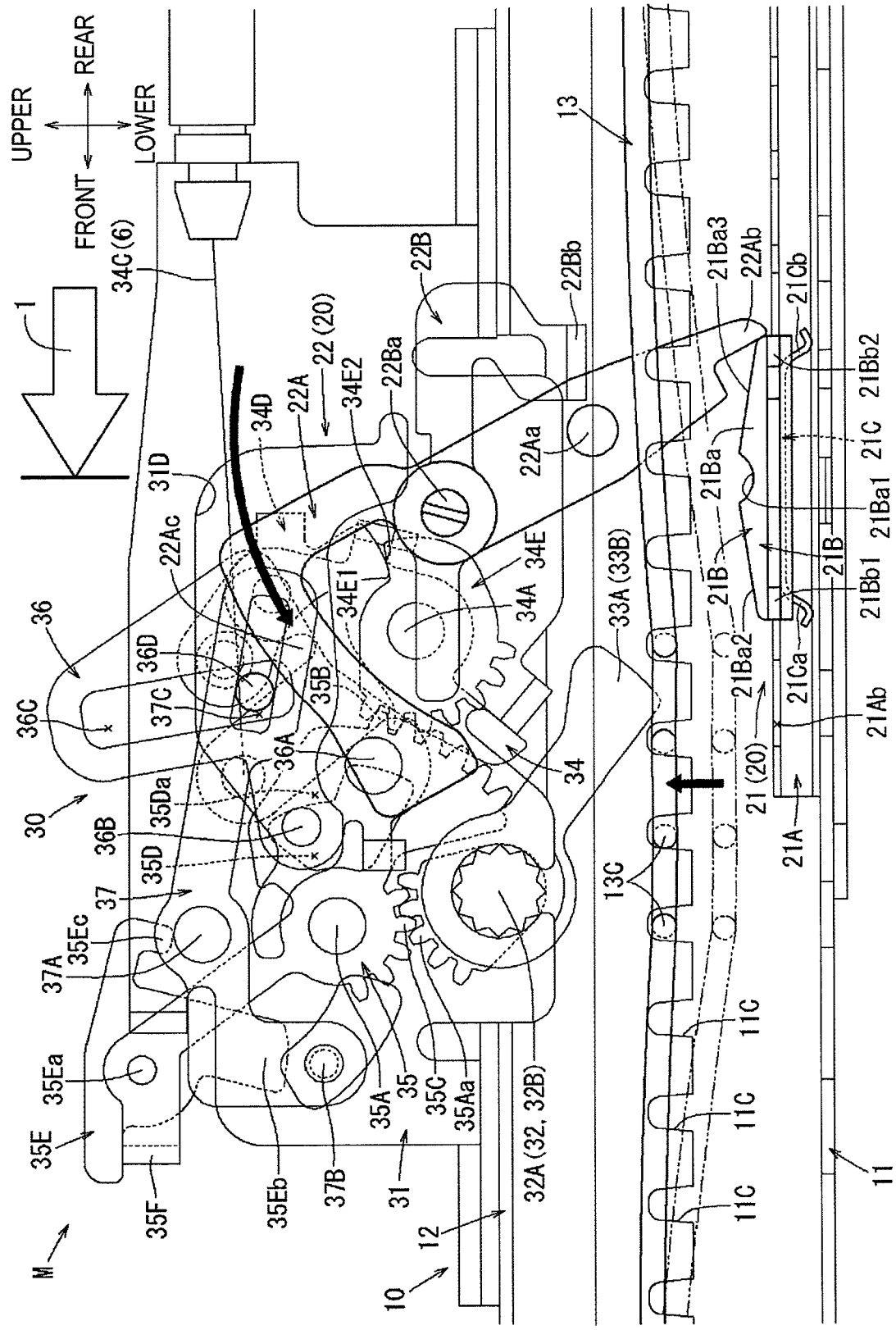

VEHICLE SLIDE RAIL DEVICE

CROSS-REFERENCE TO RELATED APPLICATIONS

This application claims priority from Japanese Patent Application No. 2016-226948 filed on Nov. 22, 2016, the entire contents of which are incorporated herein by reference.

TECHNICAL FIELD

The disclosure relates to a vehicle slide rail device. Specifically, the disclosure relates to a vehicle slide rail device including a slide rail which is capable of adjusting a seat position when a lock mechanism is released and a memory mechanism which includes a memory member configured to define a default position, which is the seat position before change, by mechanical engagement to allow the seat position to return to the default position.

BACKGROUND

As a mechanism for connecting a vehicle seat to a floor in a slidable state, one disclosed in JP-A-2010-125917 is known. This mechanism includes a slide rail that is capable of adjusting a seat position when a lock mechanism is released and a memory mechanism configured to define a default position, which is the seat position before change, by mechanical engagement to allow the seat position to return to the default position. In an initial state, the lock mechanism is maintained in a state where the seat position is locked. The lock mechanism is adapted to be switched to a release state in which the seat position can be adjusted by operating a release lever. The memory mechanism is configured to be operated by a memory lever provided separately from the above-described release lever.

Specifically, in the above-described memory mechanism, the release operation of the above-described lock mechanism is performed by the operation of the memory lever described above. Further, a memory member is left in a state of being engaged at the slide position at which the release operation is performed, and other members are separated into a state of being movable in a sliding direction together with a vehicle seat. Then, in the memory mechanism, by returning the seat position to the default position after changing the seat position, the other members moving together with the above-described vehicle seat are brought into contact with the memory member left in the default position and are moved to return the lock mechanism to a locked state. In the above-described memory mechanism, normally, when the operation of the release lever is performed and the seat position is changed, the memory member is operated to be shifted from a state of defining the default position by the release lever and moves together with the seat to change the default position to a new position as the seat position changes and moves.

In the above related art, a detection structure is brought into contact with the memory member by returning the seat position to the default position and the detection structure returns the lock mechanism to the locked state. This detection structure has a complicated and large configuration in order to avoid interference with other operation systems.

SUMMARY

An object to be achieved by the disclosure is to rationalize a detection structure for returning a seat slide to a locked state by being brought into contact with a trigger member installed at a predetermined slide position.

According to an aspect of the disclosure, there is provided a vehicle slide rail device including: a slide rail which is capable of adjusting a seat position when a lock mechanism is released; a memory mechanism which includes a memory member configured to define a default position, which is the seat position before change, by mechanical engagement to allow the seat position to return to the default position; a memory operation link which is configured to release the lock mechanism while leaving the memory member in a state of defining the default position; a holding link which is configured to, in response to an operation of the memory operation link, be engaged with the memory operation link by being biased and hold the memory operation link in a release operated position; a detection member which is configured to, in response to moving the seat position in a state where the memory operation link is held by the holding link, press a pressing portion of the holding link by being brought into contact with a trigger member installed at a predetermined slide position and be moved so as to release the holding state of the memory operation link by the holding link at the release operated position; and a variable structure which is provided in a state of being engaged with the pressing portion of the holding link and is configured to change a position where the pressing portion is arranged in the holding link according to a movement of the memory operation link, wherein, in a state where the detection member is moved by being brought into contact with the trigger member, the variable structure is configured to arrange the pressing portion at a first position which is a position after the pressing portion is pressed by the detection member, wherein, after the pressing portion has been arranged at the first position, as the memory operation link is operated and the holding link is engaged with the memory operation link by being biased, the variable structure is configured to move the pressing portion to a second position where an interference between the pressing portion and the detection member is avoided, and wherein, after the pressing portion has been moved to the second position, as the detection member moves apart from the trigger member and changes its posture by the change of the seat position, the variable structure is configured to move the pressing portion to a third position at which the pressing portion is capable of being pressed by the detection member, the third position being located in an empty region from which the detection member has retreated due to the detection member changing its posture.

BRIEF DESCRIPTION OF DRAWINGS

FIG. 12 is a side view visualizing the main mechanical component on the back side;

FIG. 33 is a side view showing a structure for releasing the excess movement when the seat position is returned to the default position at a rapid speed from the retreat state shown in FIG. 21.

DETAILED DESCRIPTION

Figure 1:
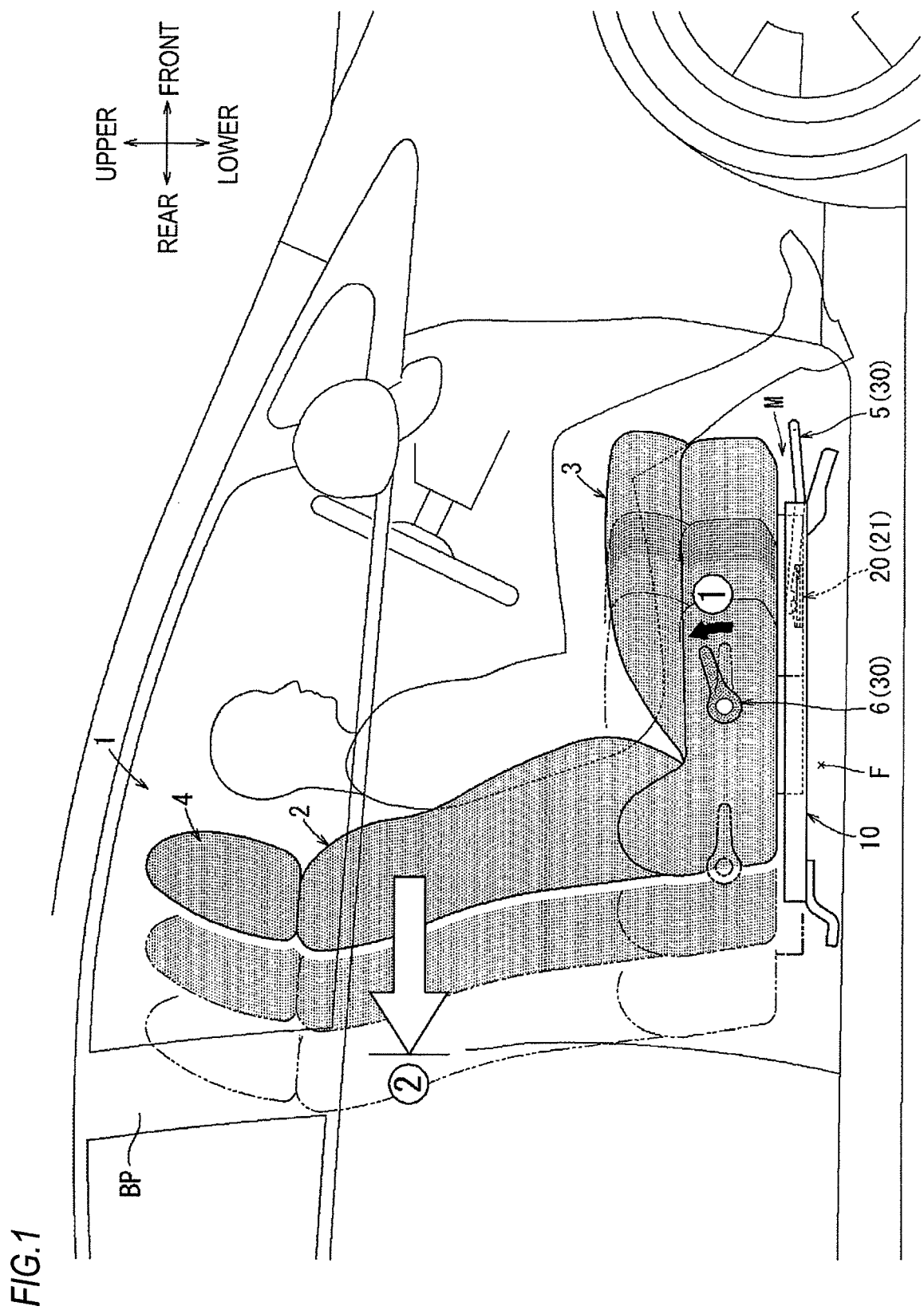
FIG. 1 is a side view showing a schematic configuration of a vehicle slide rail device according to a first embodiment.

Hereinafter, embodiments for carrying out the disclosure will be described with reference to the drawings.

First Embodiment

<Schematic Configuration of Slide Rail Device M>

First, a configuration of a seat 1 to which a slide rail device M (vehicle slide rail device) of a first embodiment is applied will be described with reference to FIGS. 1 to 33. As shown in FIGS. 1 to 4, the seat 1 of the present embodiment is configured as a driver's seat of a right-hand drive vehicle. The seat 1 includes a seat back 2 serving as a backrest of a seated occupant, a seat cushion 3 serving as a seating part, and a headrest 4 serving as a head support part. The above-described seat cushion 3 is provided in a state of being connected to a vehicle floor F via a pair of left and right slide rails 10 configuring the above-described slide rail device M. Further, the seat back 2 is provided in a state of being connected to a rear end portion of the above-described seat cushion 3 via a recliner (not shown). Further, the headrest 4 is mounted on an upper portion of the seat back 2.

Meanwhile, in the following description, the directions such as a front and rear direction, an upper and lower direction and a right and left direction refer to the respective directions as indicated in each of the drawings. Further, the "seat width direction" refers to a lateral width direction (left and right direction) of the seat 1, and the "vehicle width direction" refers to a lateral width direction (left and right direction) of a vehicle. Accordingly, the "inner side in the vehicle width direction" refers to the left side of the seat 1, that is, the passenger's seat side (not shown), and the "outer side in the vehicle width direction" refers to the right side of the seat 1, that is, the entrance door side.

Figure 4:
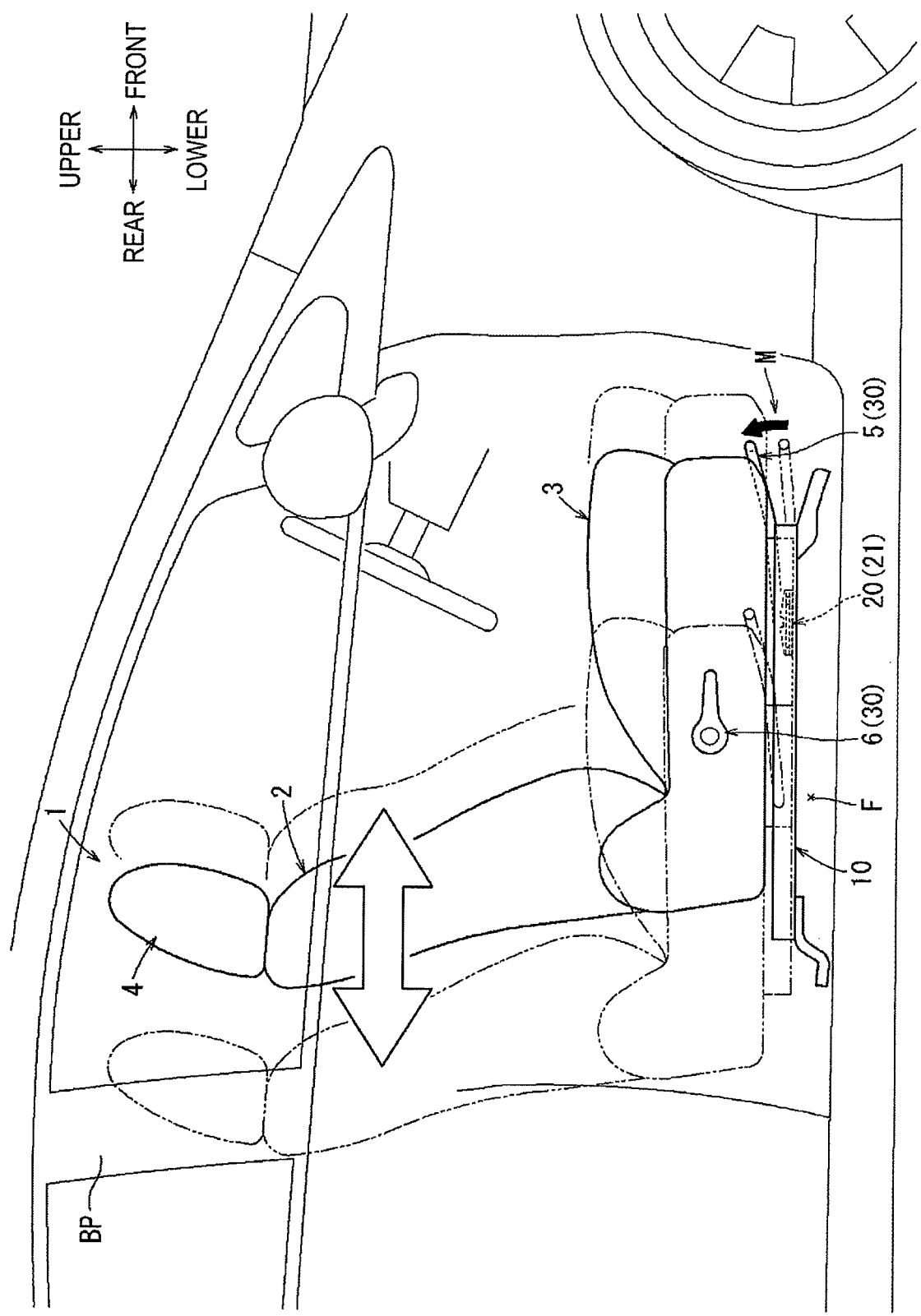
FIG. 4 is a side view showing a situation in which the seat position is adjusted by operating the loop handle.

In an initial state, the above-described seat 1 is maintained in a state where the sliding of each of the above-described slide rails 10 is locked by being biased and the position (hereinafter, referred to as "seat position") thereof in the front and rear direction on the floor F is fixed. As shown in FIG. 4, the locked state of the sliding of each of the above-described slide rails 10 is simultaneously released by an operation of pulling up a loop handle 5 provided at a front lower portion of the seat cushion 3. In this way, each of the above-described slide rails 10 can be switched to a state in which the seat position can be adjusted. Then, each slide rail 10 is returned to a state in which the sliding is locked again by returning the operation of the loop handle 5 after the adjustment of the seat position.

Further, as shown in FIG. 1, the locked state of the sliding of each of the above-described slide rails 10 is simultaneously released also by an operation of pulling up a memory lever 6 provided at an outer (right) side portion of the seat cushion 3 in the vehicle width direction. At that time, even when the operation of the memory lever 6 is returned, each slide rail 10 is kept in a state where the slide lock thereof is released by an action of an operation mechanism 30 included in the slide rail device M (to be described later).

Then, after the operation of the above-described memory lever 6, each slide rail 10 is in a state where the seat position can be freely moved between a position (solid line position in FIG. 1) before the operation and an entrance support position (virtual line position in FIG. 1) as a locking position in the vicinity of the rearmost (to be described later). The released and maintained state of the slide lock of each slide rail 10 is released by moving the above-described seat position to one of the above-described positions, so that each slide rail 10 is locked at that position.

Specifically, when the slide lock of the slide rails 10 is released by the operation of the memory lever 6 described above, in a state where a default position of the seat position is defined by a memory mechanism 20 included in the slide rail device M (to be described later), the slide rails 10 are adapted to be switched to a state (memory state) in which the slide lock of the seat position is basically performed only in one of the entrance support position in the vicinity of the rearmost as indicated by a virtual line in FIG. 1 (solid line in FIG. 2) and the default position as indicated by a solid line in FIG. 1 (virtual line in FIG. 2). With such a configuration, from the state in which the seat position is used at the using position (solid line position in FIG. 1) such as a driving position closer to the front side, the slide rails 10 can be switched, by operating the memory lever 6, to a state in which the seat position is immediately retracted to the entrance support position (virtual line position in FIG. 1) in the vicinity of the rearmost where the entrance into the vehicle can be easily performed, and the seat position can be temporarily locked at that position.

Further, from the state in which the sliding of the slide rails 10 are temporarily locked at the entrance support position (virtual line position in FIG. 1) in the vicinity of the rearmost described above, as shown in FIG. 2, the slide rails 10 are switched to a state in which the seat position is freely movable again between the entrance support position (solid line position in FIG. 2) in the vicinity of the rearmost described above and the default position (virtual line position in FIG. 2) by operating the memory lever 6 again. Therefore, the seat position can be immediately returned to the previous using position (virtual line position in FIG. 2) such as the driving position before change and returned to a state locked at that position by operating the above-described memory lever 6 again after a person sits on the seat 1 at the entrance support position (solid line position in FIG. 2) in the vicinity of the rearmost.

To summarize the above, the temporary backward movement (movement in FIG. 1) of the seat position to the entrance support position by the operation of the memory lever 6 described above and the return movement (movement in FIG. 2) thereof to a using position such as a driving position after the backward movement are carried out in the following procedure, respectively. First, as indicated by a solid line state in FIG. 1, the pull-up operation of the memory lever 6 is performed in a state where the seat 1 is in an arbitrary position such as a driving position (circled number 1 in FIG. 1). Subsequently, the seat position is retracted to move to the entrance support position (virtual line position in FIG. 1) in the vicinity of the rearmost where the movement is locked. Thereby, as indicated by the circled number 2 in FIG. 1, since the seat position is automatically locked at the entrance support position (virtual line position in FIG. 1) in the vicinity of the rearmost, a wide opening for entering the vehicle is secured on the front side of the seat 1, thereby achieving a state (entrance support state) in which the entering into the vehicle can be simply performed. Here, the entrance support position (virtual line position in FIG. 1) in the vicinity of the rearmost where the seat position is locked is set to a position where the seat back 2 substantially overlaps with a B pillar BP of a vehicle in the front and rear direction.

Subsequently, as indicated by a solid line state in FIG. 2, from the state in which the seat position is locked at the entrance support position in the vicinity of the rearmost by the above operation, the pull-up operation of the memory lever 6 is performed again after a driver sits on the seat 1 (circled number 3 in FIG. 2). Then, the seat position is moved forward to a using position (virtual line position in FIG. 2) such as a driving position before change, in which the movement of the seat position is locked. In this way, as indicated by the circled number 4 in FIG. 2, the seat position is automatically locked at the using position (virtual line position in FIG. 2) before the change. As a result, the seat position can be simply returned to the default position without a fine adjustment of the using position.

Figure 2:
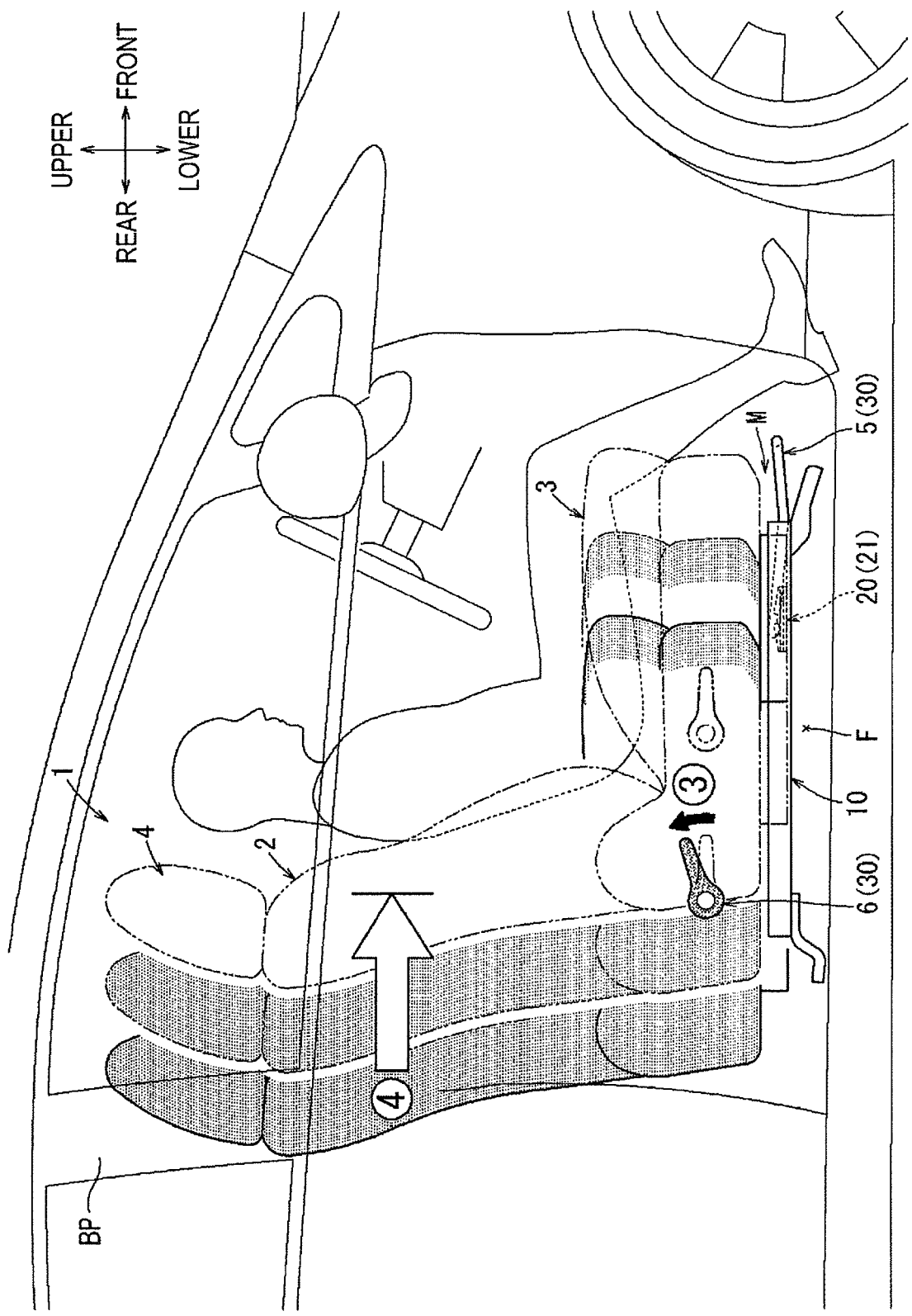
FIG. 2 is a side view showing a procedure for returning a seat position from an entrance support position to a default position.
Figure 3:
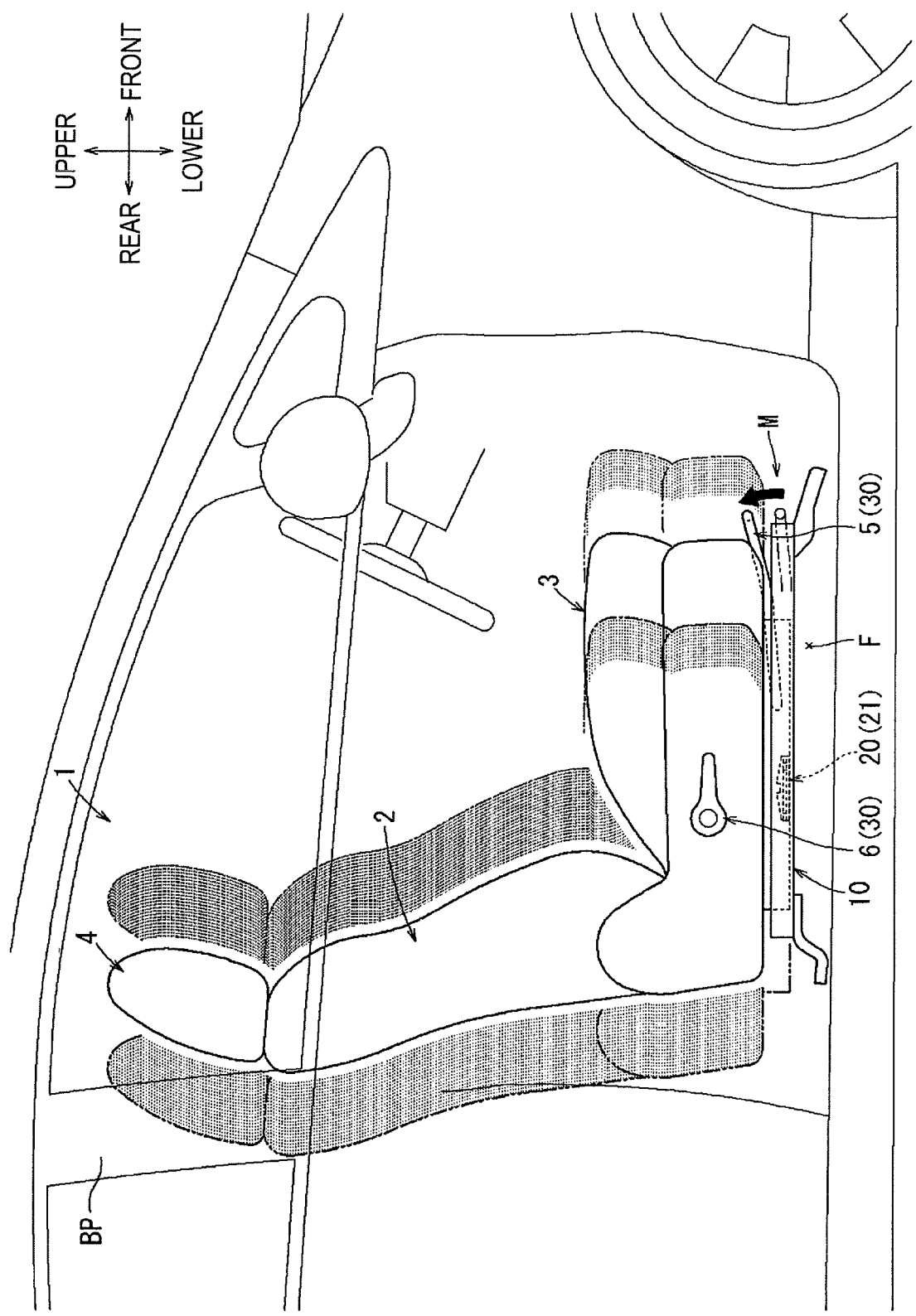
FIG. 3 is a side view showing a state in which sliding is locked by operating a loop handle after operating a memory lever.

Further, as shown in FIG. 3, in the state (memory state) in which the default position of the seat position is defined by the operation of the memory lever 6 described above, the released and maintained state of the previous slide lock by the memory mechanism 20 is cancelled by performing the pull-up operation of the loop handle 5 at an arbitrary position between the positions as described with reference to FIGS. 1 and 2. Thus, the above-described slide rails 10 are switched to state in which the sliding is locked at that position. With such a configuration, even when the slide rails 10 are switched to the state (memory state) in which the seat position can be locked only at the two front and rear positions as described with reference to FIGS. 1 and 2 by the operation of the memory lever 6, the released and maintained state (memory state) of the slide lock at that position can be immediately cancelled by operating the loop handle 5 as necessary, and the seat position can be locked at that position (arbitrary position).

Meanwhile, in each of FIGS. 1 to 3, a state in which the above-described seat 1 is in a memory state, i.e., a state in which the slide lock thereof is released and maintained by the operation of the memory lever 6 is indicated by a state in which painting is thinly performed on the seat 1. Further, a state in which the memory state of the seat 1 is cancelled by the operation of the loop handle 5 is indicated by a state in which painting is not performed on the seat 1.

Even when the memory state is cancelled by the operation of the above-described loop handle 5 in FIG. 3, by operating the memory lever 6 again from that state, the above-described slide rails 10 are returned to the memory state before the above-described cancel operation has been performed, i.e., the state in which the slide lock is released and maintained. With such a configuration, even when the memory state is temporarily cancelled by the operation of the loop handle 5 described above, the slide rails 10 are returned a state before the memory state is cancelled by operating the memory lever 6 again from that state, and can be switched to a state in which the seat position can be immediately returned to an using position (solid line position) such as a driving position before change.

<Specific Configuration of Slide Rail 10>

Hereinafter, the specific configurations of the slide rail 10, the memory mechanism 20 and the operation mechanism 30 configuring the above-described slide rail device M will be described in detail. First, the configuration of each slide rail 10 will be described with reference to FIGS. 5 and 6. Specifically, each slide rail 10 includes a lower rail 11 attached on the floor F, an upper rail 12 attached to a lower portion of the seat cushion 3 in a state of being slidable in the front and rear direction with respect to the lower rail 11, and a lock spring 13 for locking the slide between both rails 11, 12. Meanwhile, since a basic structure of each slide rail 10 is substantially common on the left and right sides, the details of these configurations will be described with reference to the configuration of the slide rail 10 on the inner side in the vehicle width direction shown in FIG. 6. Here, the above-described lock spring 13 corresponds to the "lock mechanism" in the disclosure.

Figure 6:
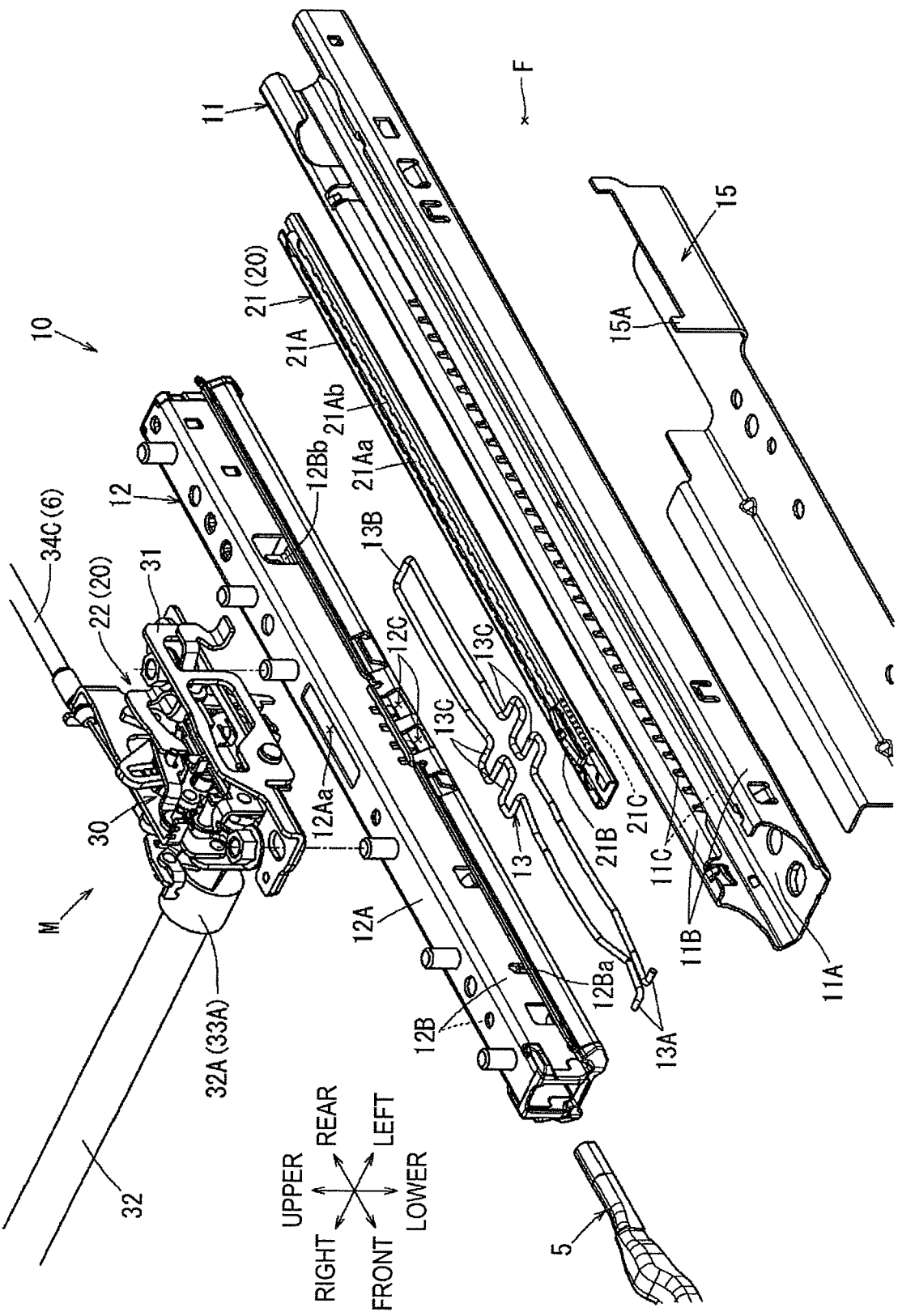
FIG. 6 is an exploded perspective view showing a slide rail on the inner side in a vehicle width direction.

As shown in FIG. 6, the above-described lower rail 11 is formed by bending a single plate material of steel or the like that is elongated in the front and rear direction of a vehicle into a substantially U shape in the width direction. The above-described lower rail 11 is fixed in a state where end portions on the front and rear sides thereof are integrally fastened on the floor F by a fastening member such as a bolt (not shown), respectively. The above-described lower rail 11 is formed in a rail shape whose transverse sectional shape is substantially uniform in the front and rear direction.

Specifically, the above-described lower rail 11 is formed in a transverse sectional shape which includes a bottom surface portion 11A disposed on the floor F with its surface facing upward, and a pair of left and right lower-side fin parts 11B extending upward from both left and right portions of the bottom surface portion 11A and extending to be folded back in an inverted U shape to face each other inwardly. The lower rail 11 is set in a state where end portions on the front and rear sides of the above-described bottom surface portion 11A are respectively brought into surface contact on the floor F from the upper side. Then, the lower rail 11 is integrally fastened on the floor F by a fastening member such as a bolt (not shown) inserted from the upper side.

On the left and right lower-side fin parts 11B of the above-described lower rail 11, lock grooves 11C with which corresponding lock portions 13C of the lock spring 13 (to be described later) can respectively enter and engage from the lower side are formed at tip edge portions of the fin portions folded back in the inverted U shape. A plurality of lock grooves 11C are respectively formed side by side at equal intervals in the front and rear direction in a shape that is opened downward along tip edge portions of the lower-side fin parts 11B folded back inward and suspended. The lock grooves 11C formed in these lower-side fin parts 11B are provided side by side at bilaterally symmetrical positions.

Similar to the above-described lower rail 11, the upper rail 12 is formed by bending a single plate material of steel or the like that is elongated in the front and rear direction of a vehicle into a substantially Ω shape in the width direction. By being inserted into the lower rail 11 from an opening end portion on either side in the longitudinal direction of the above-described lower rail 11, the above-described upper rail 12 is assembled in a state of being slidable in the longitudinal direction with respect to the lower rail 11. Specifically, the upper rail 12 is formed in a transverse sectional shape which includes a top plate portion 12A attached to a lower portion of the above-described seat cushion 3 with its surface facing upward, and a pair of left and right upper-side fin parts 12B extending downward from both left and right portions of the top plate portion 12A and extending to be folded back in a U shape to face outwardly in opposite directions.

The above-described upper rail 12 is assembled by being inserted in the longitudinal direction with respect to the above-described lower rail 11 in such a way that the tip edge shapes of the left and right upper-side fin parts 12B of the upper rail 12 folded back into the U shape respectively are hooked into the edge shapes of the left and right lower-side fin parts 11B of the lower rail 11 folded back into the inverted U shape. By being assembled in this way, the upper rail 12 is assembled to the lower rail 11 in a state where it is prevented from being respectively detached in the height direction and the seat width direction with respect to the lower rail 11 by engagement between the left and right upper-side fin parts 12B and the left and right lower-side fin parts 11B described above. Specifically, the above-described upper rail 12 is assembled to the lower rail 11 via a resin shoe (not shown) and a steel ball (rolling body, not shown) assembled between the lower rail 11 and the upper rail 12 in a state where it can smoothly slide in the front and rear direction while suppressing the rattling in the height direction and the seat width direction.

The lock spring 13 is formed by bending a single plate material of steel or the like that is elongated in the front and rear direction into a substantially U shape in a plan view. In the lock spring 13, a rear end portion 13B is formed as a folded-back portion which is bent in the seat width direction and is folded-back to the front side. Further, the lock spring 13 is configured such that the lock portions 13C bent so as to protrude in a wavy shape toward the outer side in the seat width direction respectively are formed at intermediate portions of a pair of left and right line parts extending from the folded-back rear end portion 13B to the front side. Further, front end portions 13A of the line parts of the lock spring 13 are respectively bent in a shape protruding to the outer side in the seat width direction.

The above-described lock spring 13 is set as a state of being rotatably pin-connected in such a way that each of tip portions of the front end portions 13A of the above-described line parts bent to the outer side in the seat width direction is inserted, from the inner side, into each of through-holes 12Ba formed in upright wall portions of the front regions of the upper-side fin parts 12B of the above-described upper rail 12 while being elastically pushed and narrowed. Further, the above-described lock spring 13 is set as a state of being rotatably pin-connected in such a way that each of folded-back portions on both corner sides of the above-described rear end portion 13B is hooked, from the upper side, to each of hook pieces 12Bb formed by being cut and raised inward from upright wall portions of the rear regions of the upper-side fin parts 12B of the above-described upper rail 12.

Further, the lock spring 13 is assembled in a state where each of the left and right lock portions 13C described above is, from the inner side, passed into each of through-grooves 12C formed in upright wall portions of the central regions in the front and rear direction of the left and right upper-side fin parts 12B of the above-described upper rail 12 and penetrating in the seat width direction while being elastically pushed and narrowed. Each of the though-grooves 12C described above has a comb-like slit through which each of the lock portions 13C of the lock spring 13 passed through each of the through-grooves 12C can be passed in the upward direction while being elongated. As described above, the lock spring 13 has a both end support structure in which the front end portions 13A and the rear end portion 13B are pin-connected to the upper rail 12 so as to be rotatable in the height direction. Therefore, in the free state of the lock spring 13, each of the lock portions 13C described above is maintained in a state where it is inserted, from the lower side, into each of the slits elongated in a comb shape in the through-grooves 12C of the upper rail 12 by the restoring action according to the spring biasing force of its own.

In the above-described lock spring 13, the slits of the through-grooves 12C formed in the upper-side fin part 12B on each side and the lock grooves 11C formed in the lower-side fin part 11B on each side are aligned with each other in the vehicle width direction, so that the slide position in the front and rear direction of the above-described upper rail 12 with respect to the lower rail 11 is adapted to pass across the slits of the through-grooves 12C and the lock grooves 11C from the lower side. As a result, the sliding in the front and rear direction of the upper rail 12 with respect to the lower rail 11 is maintained in a locked state via the lock portions 13C of the above-described lock spring 13. In each of FIGS. 11, 12, 24, 27 and 29, a state in which the sliding of the above-described upper rail 12 with respect to the lower rail 11 is locked is represented by a state in which the lock spring 13 is in a posture shape extending substantially in a straight line without being pushed and bent downward.

As the above-described loop handle 5 is operated (see FIG. 14) or the memory lever 6 is operated (see FIG. 17), the lock portions 13C are pushed and bent downward, so that the above-described lock spring 13 can be removed downward from the lock grooves 11C of the lower rail 11. With the above operation, the slide locked state of the upper rail 12 is released by the above-described lock spring 13, so that the upper rail 12 can slide with respect to the lower rail 11. Then, due to various movements such as that the operation of the loop handle 5 is released or the operation state of the memory lever 6 is released, the lock spring 13 is returned again to the state (slide locked state) in which it enters the lock grooves 11C of the lower rail 11 by its spring biasing force, as in the state shown in each of the figures such as FIG. 11.

At that time, when the sliding position of the upper rail 12 is in a state where the lock grooves 11C of the lower rail 11 are not positioned at a tip position of the lock portions 13C of the lock spring 13 to be restored, i.e., a state in which a shelf surface between the lock grooves 11C is positioned at that position, the lock portions 13C are retuned only to the position where it is brought into contact with the shelf surface, and the lock portions 13C are not in the slide locked state. However, by adjusting the position so that the slide position of the upper rail 12 is shifted back and forth from the slide position, the lock portions 13C are aligned with the lock grooves 11C of the lower rail 11 and enter the lock grooves 11C, thereby locking the slide.

Figure 5:
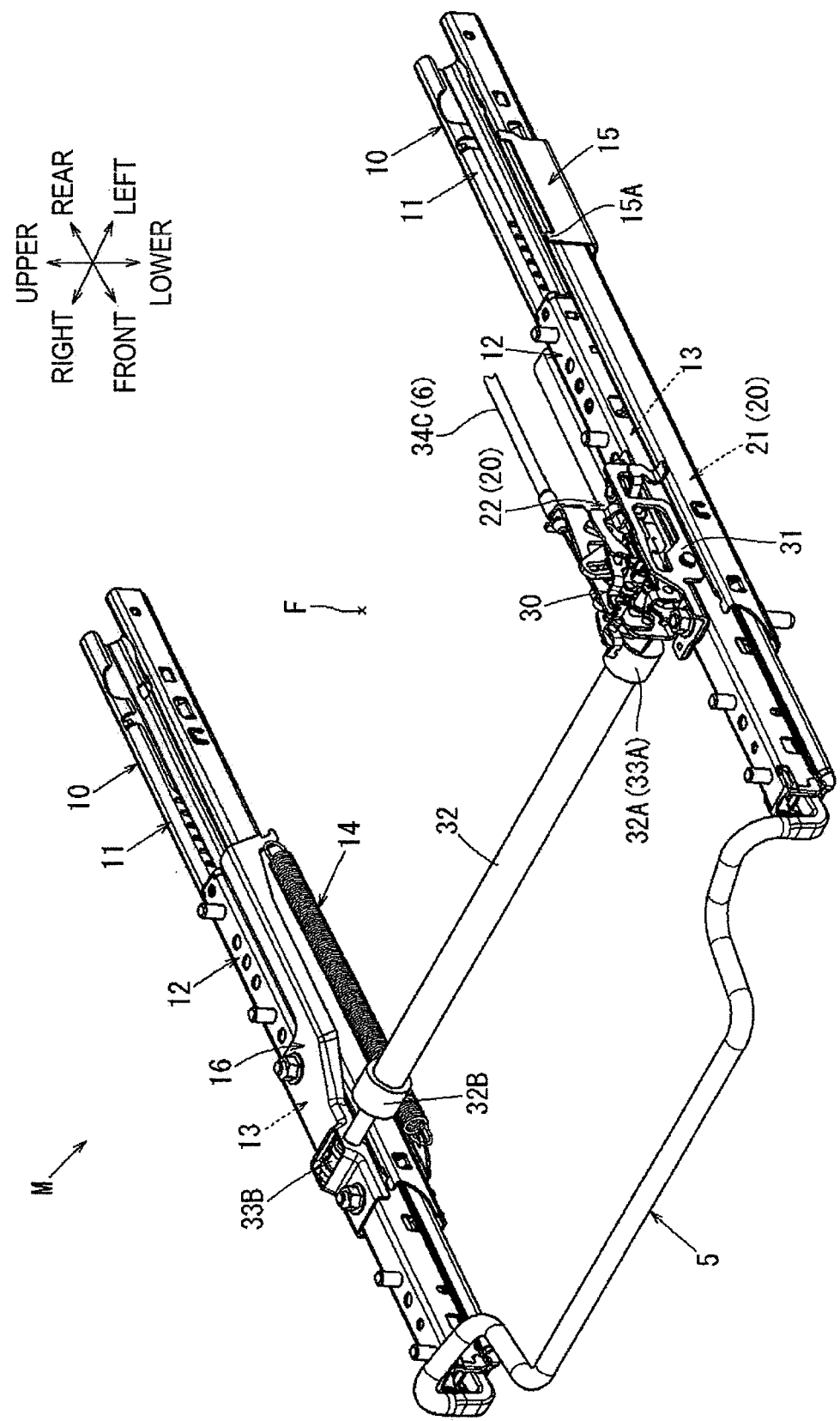
FIG. 5 is a perspective view showing an overall configuration of the vehicle slide rail device.

Hereinabove, the specific configuration of each of the slide rails 10 shown in FIG. 5 has been described. Meanwhile, the memory mechanism 20 and the operation mechanism 30 (to be described later) are additionally assembled to one of the slide rails 10, which is disposed on the inner side (left side) in the vehicle width direction. With the above configuration, as the above-described memory lever 6 is operated, the unlocking operation of the lock spring 13 in the slide rail 10 on the inner side in the vehicle width direction is performed via the above-described operation mechanism 30. On the other hand, in the slide rail 10 on the outer side (right side) in the vehicle width direction, a release arm 33B is disposed on the upper rail 12. The release arm 33B is assembled in a state of being able to receive power transmission via a rod 32 of the operation mechanism 30 (to be described later). With the above configuration, as the above-described memory lever 6 is operated, the unlocking operation of the lock spring 13 in the slide rail 10 on the outer side in the vehicle width direction is also synchronously performed via the above-described release arm 33B.

Further, in the above-described slide rail 10 disposed on the outer side (right side) in the vehicle width direction, a tension spring 14 is additionally hooked between the upper rail 12 and the lower rail 11. With the above configuration, a force in a direction in which the upper rail 12 is pushed and moved toward the front side with respect to the lower rail 11 is normally applied to both of the slide rails 10 by a spring biasing force exerted by the above-described tension spring 14. Thus, as the slide locked state of the slide rails 10 is released, the upper rail 12 can slide to the front side with respect to the lower rail 11 with a slight force.

Further, a stopper bracket 15 is attached to the slide rail 10 disposed on the inner side (left side) in the vehicle width direction. The stopper bracket 15 is able to restrict the seat position at a position where the seat position is retracted to the entrance support position (virtual line position in FIG. 1) in the vicinity of the rearmost when the slide rail 10 slides to the rear side while maintaining a state in which the slide lock thereof is released by the operation of the memory lever 6 described above. As shown in FIGS. 5 and 6, the above-described stopper bracket 15 is formed by bending a plate material of steel or the like into an L shape. The stopper bracket 15 is externally attached to the lower rail 11 so that a bottom plate portion and a standing plate portion are brought into contact with the bottom surface portion 11A and the outer surface portion of the lower-side fin part 11B on the left side of the lower rail 11. Here, the stopper bracket 15 corresponds to the "trigger member" in the disclosure.

Figure 16:
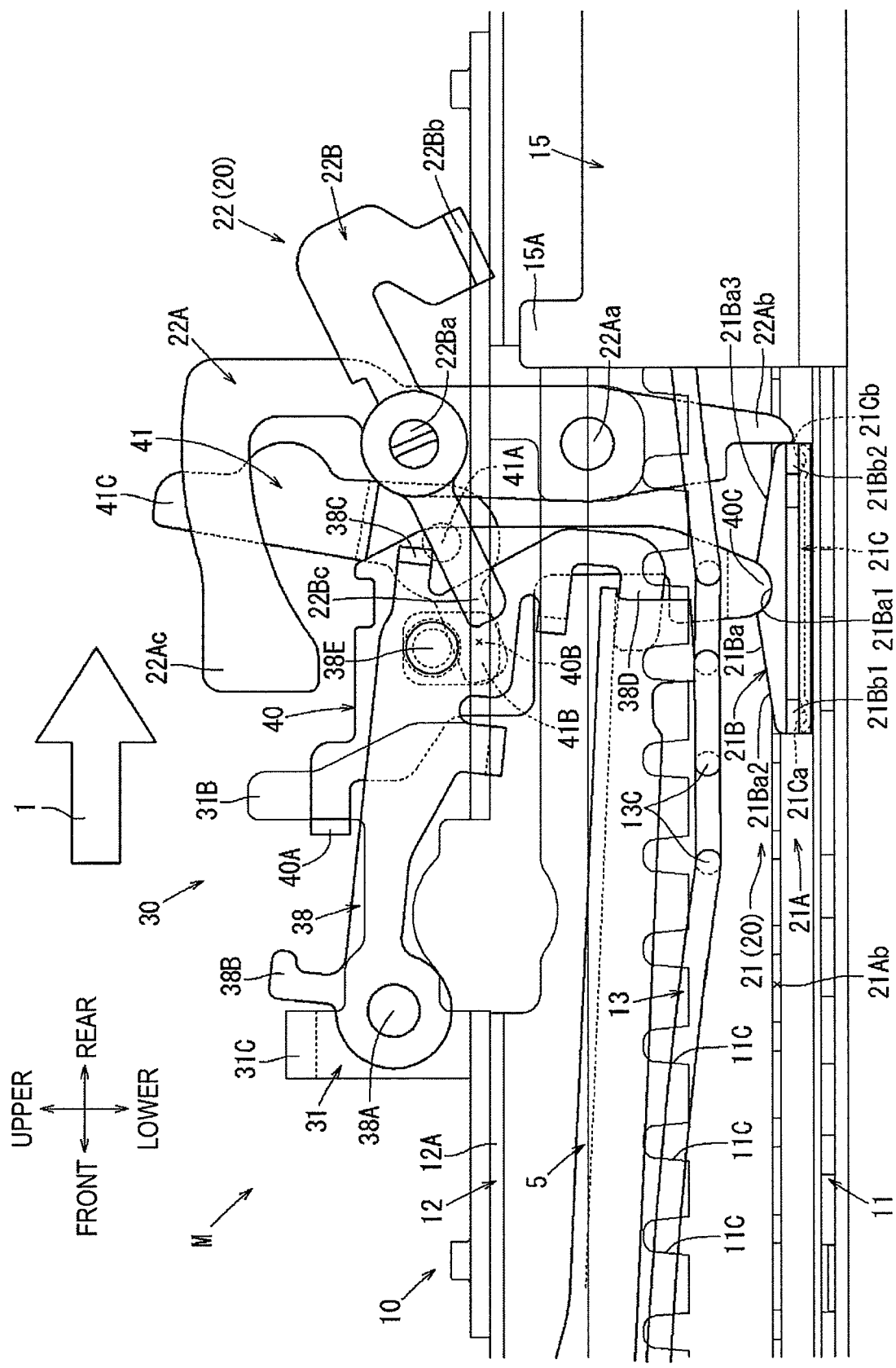
FIG. 16 is a side view showing a state in which the seat position is retracted in an operation state of the loop handle.

In the stopper bracket 15 having the above configuration, as shown in FIG. 16, when the above-described slide rail 10 on the inner side (left side) in the vehicle width direction is unlocked by the operation of the loop handle 5 described above and slides to the rear side, a stopper link 22B (to be described later) is pulled up to a position higher than a locking projection 15A on the front upper side of the stopper bracket 15. Therefore, the stopper link 22B is allowed to pass rearward beyond the stopper bracket 15 and slide to the rearmost position without being brought into contact with the stopper bracket 15. However, as shown in FIGS. 21 to 24, in the stopper bracket 15, when the slide rail 10 on the inner side in the vehicle width direction is unlocked by the operation of the memory lever 6 described above and slides to the rear side, the above-described stopper link 22B is not pulled up. Therefore, the position of the stopper link 22B is restricted so that the stopper link 22B slides only to the entrance support position in the vicinity of the rearmost, in which the stopper link 22B is brought into contact with the stopper bracket 15 from the front side and is locked.

<Specific Configuration of Memory Mechanism 20>

Subsequently, a specific configuration of the memory mechanism 20 will be described with reference to FIGS. 5 to 10. As shown in FIGS. 5 and 6, the memory mechanism 20 mainly includes of a memory body 21 assembled to the lower rail 11 and a trigger 22 assembled to the upper rail 12. As shown in FIGS. 17 to 21, when the seat position is changed in the rearward direction by the operation of the memory lever 6 described above, the memory body 21 remains at a fixed position on the lower rail 11 and functions as a member for defining the default position of the seat position.

Figure 26:
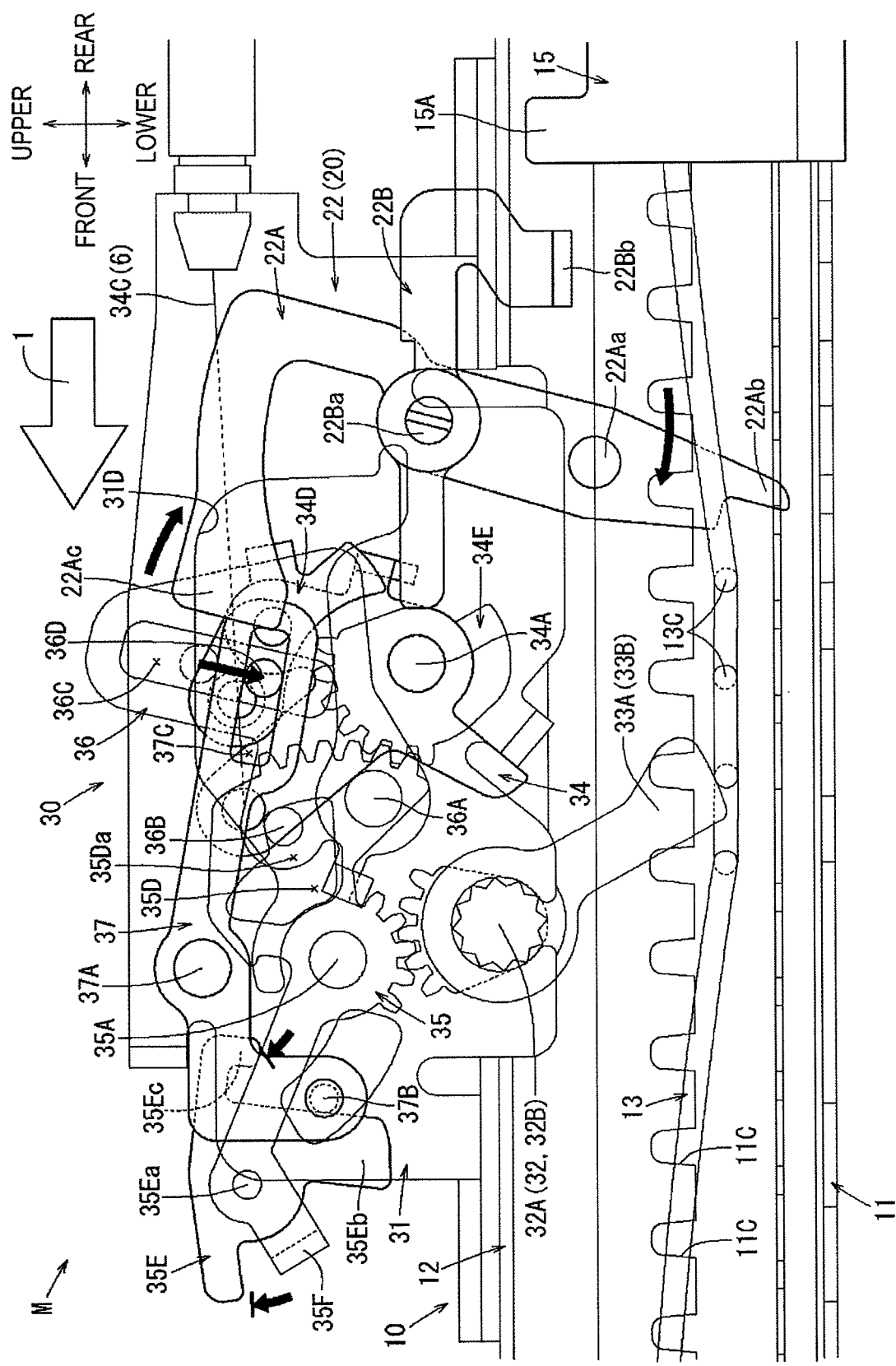
FIG. 26 is a side view showing a state in which the seat position is advanced after the operation.
Figure 27:
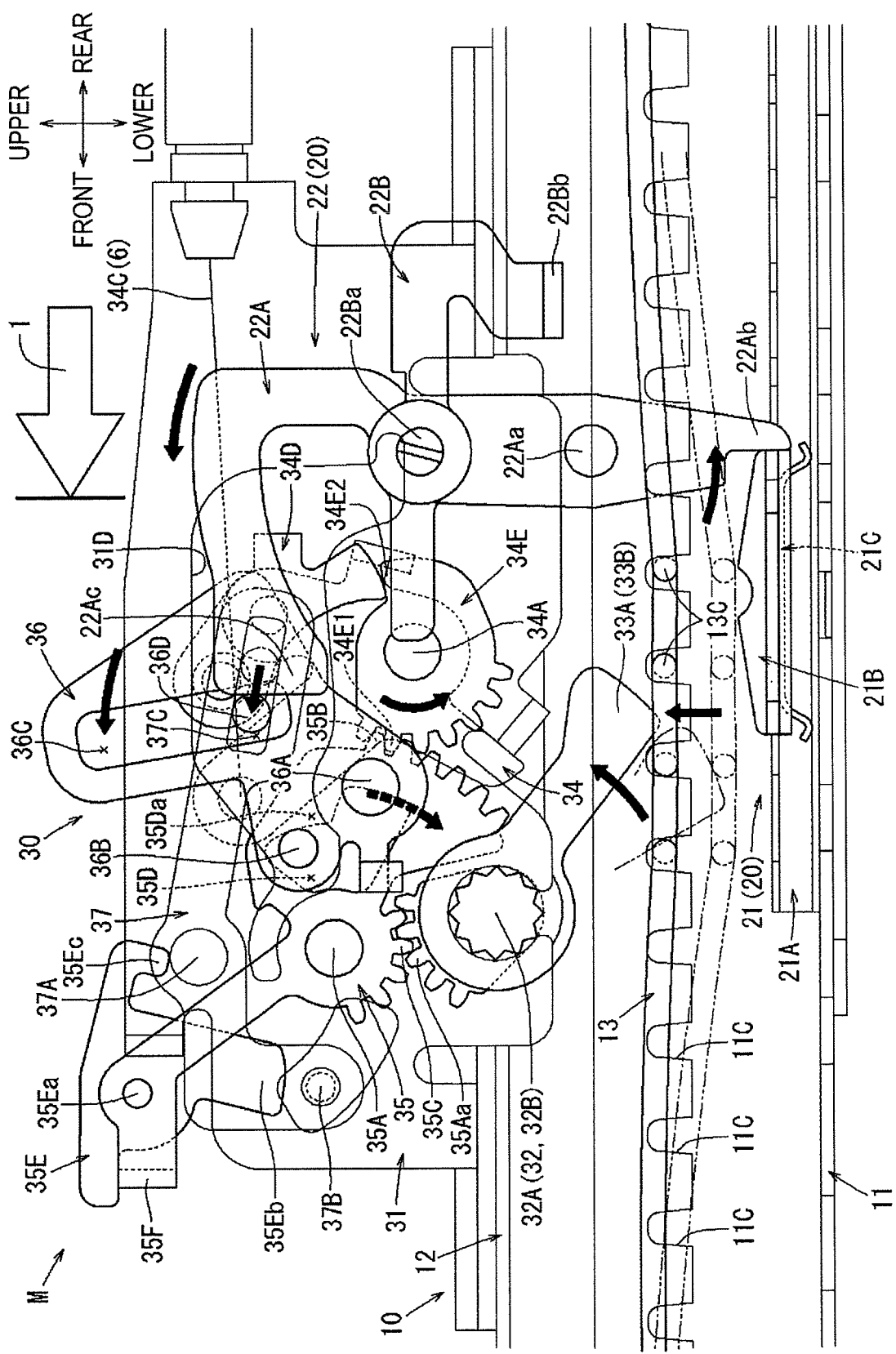
FIG. 27 is a side view showing a state in which a detection link is brought into contact with the memory piece by the advance movement of the seat position and the sliding is returned to the locked state.

As the above-described memory lever 6 is operated and the seat position is moved rearward to the entrance support position described above with reference to FIGS. 22 to 24, the trigger 22 is rotated by being pressed from the front side by the locking projection 15A of the above-described stopper bracket 15 and functions to lock the seat position at that position. Further, as shown in FIGS. 26 and 27, even when the seat position advances to return to the previous default position instead of the entrance support position shown in FIG. 24 after the above-described memory lever 6 is operated, the trigger 22 is rotated by being pressed from the rear side by the above-described memory body 21 and functions to lock the seat position at that position, as in the previous case.

Further, as shown in FIGS. 13 to 16, when trying to retract the seat position by operating the above-described loop handle 5, the above-described trigger 22 is switched to a posture state in which it is not brought into contact with the locking projection 15A of the above-described stopper bracket 15, and functions to slide the seat position to the rearmost position beyond the stopper bracket 15.

<Specific Configuration of Memory Body 21>

Subsequently, a specific configuration of the above-described memory body 21 will be described with reference to FIGS. 6 and 7. The memory body 21 includes a memory rail 21A that is elongated in the front and rear direction, a memory piece 21B that is assembled so as to be slidable in the front and rear direction with respect to the memory rail 21A, and a leaf spring 21C that normally biases the memory piece 21B in an upward direction for engaging with the memory rail 21A. Here, the memory piece 21B corresponds to the "memory member" and the "trigger member" in the disclosure.

The memory rail 21A has a shape formed by bending a single plate material of steel or the like that is elongated in the front and rear direction into a substantially U shape in the width direction and additionally bending upper edge portions at the bent tips thereof into a collar shape to face each other inwardly. The above-described memory rail 21A is provided so that end portions on the front and rear sides thereof are screwed on the bottom surface portion 11A of the above-described lower rail 11 and are integrally fixed thereto.

By inserting the memory piece 21B from one of front and rear opening end portions of the above-described memory rail 21A into the inside thereof, the memory rail 21A is assembled in a state of guiding the memory piece 21B in the front and rear direction so that the memory piece 21B slides so as not to be released in the height direction. Specifically, since the memory piece 21B is assembled to the inside of the above-described memory rail 21A, the memory rail 21A guides the memory piece 21B so as to slide in the front and rear direction in a state where a head portion 21Ba of the memory piece 21B protrudes upward from a slit-like guide hole 21Aa opening between both top plate portions protruding in a collar shape.

On inner edge portions facing the guide hole 21Aa of both top plate portions of the above-described memory rail 21A protruding in a collar shape, a plurality of rectangular memory grooves 21Ab are formed side by side at equal intervals in the front and rear direction. Each memory groove 21Ab is opened such that the hole shape of the guide hole 21Aa is partially expanded in the vehicle width direction. As the memory teeth 21Bb1, 21Bb2 on the front and rear sides of the memory piece 21B assembled in the memory rail 21A are respectively fitted into the memory grooves 21Ab from the lower side, these memory grooves 21Ab function to maintain the memory piece 21B in a state of restricting the sliding in the front and rear direction of the memory piece 21B.

Figure 7:
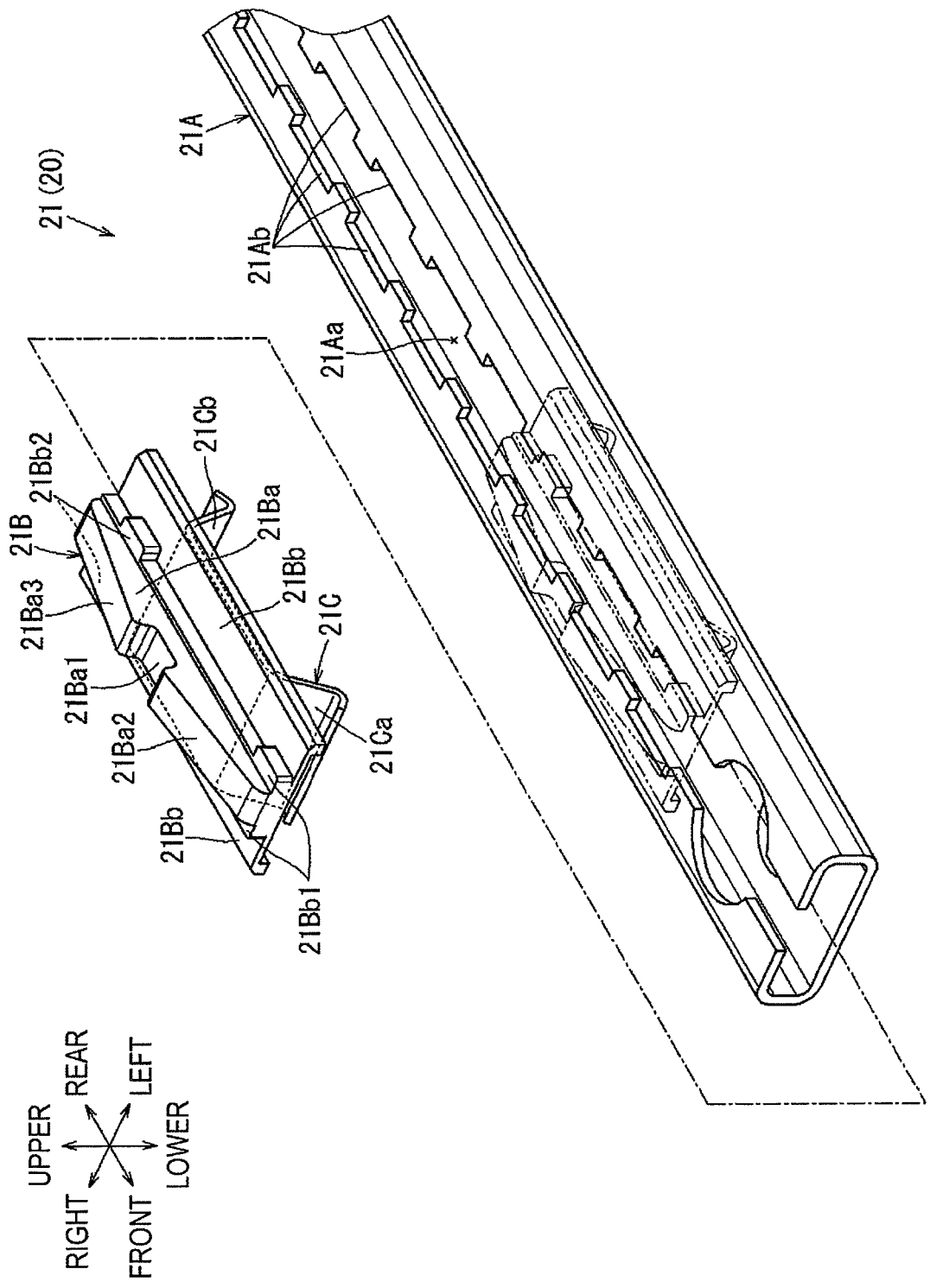
FIG. 7 is an exploded perspective view of a memory body.

As shown in FIG. 7, the memory piece 21B is configured as a slider member including a pedestal-shaped head portion 21Ba that is elongated in the front and direction and each flange piece 21Bb that protrudes in the front and direction from an underbody of the head portion 21Ba. By being inserted into the above-described memory rail 21A from one of the front and rear opening end portions, the above-described memory piece 21B is assembled as a state in which the head portion 21Ba protrudes upward from the guide hole 21Aa of the memory rail 21A and each flange piece 21Bb protrudes so as to be positioned directly below the both top plate portions of the memory piece 21B (see FIG. 6). With the above assembly, by the protruding of each flange piece 21Bb described above, the memory piece 21B is provided as a state of being guided so as to be straightly slidable in the front and rear direction without being released in the height direction with respect to the memory rail 21A.

As shown in FIG. 7, the memory teeth 21Bb1, 21Bb2 protruding in a substantially rectangular shape toward the upper side are formed at the end portions on the front and rear sides of the flange pieces 21Bb of the above-described memory piece 21B. As shown in FIG. 6, when the slide position of the above-described memory piece 21B in the memory rail 21A is in each position corresponding to a position where the sliding of the above-described slide rail 10 is locked, the memory piece 21B is pulled upward by an biasing force of the leaf spring 21C, and thus, these memory teeth 21Bb1, 21Bb2 are fitted into the memory grooves 21Ab of the above-described memory rail 21A from the lower side, thereby restricting the sliding of the memory piece 21B in the front and rear direction. Specifically, the memory teeth 21Bb1 on the front side are fitted to be brought into contact with the front surface in each memory groove 21Ab, and the memory teeth 21Bb2 on the rear side are fitted to be brought into contact with the rear surface in each memory grooves 21Ab.

Figure 13:
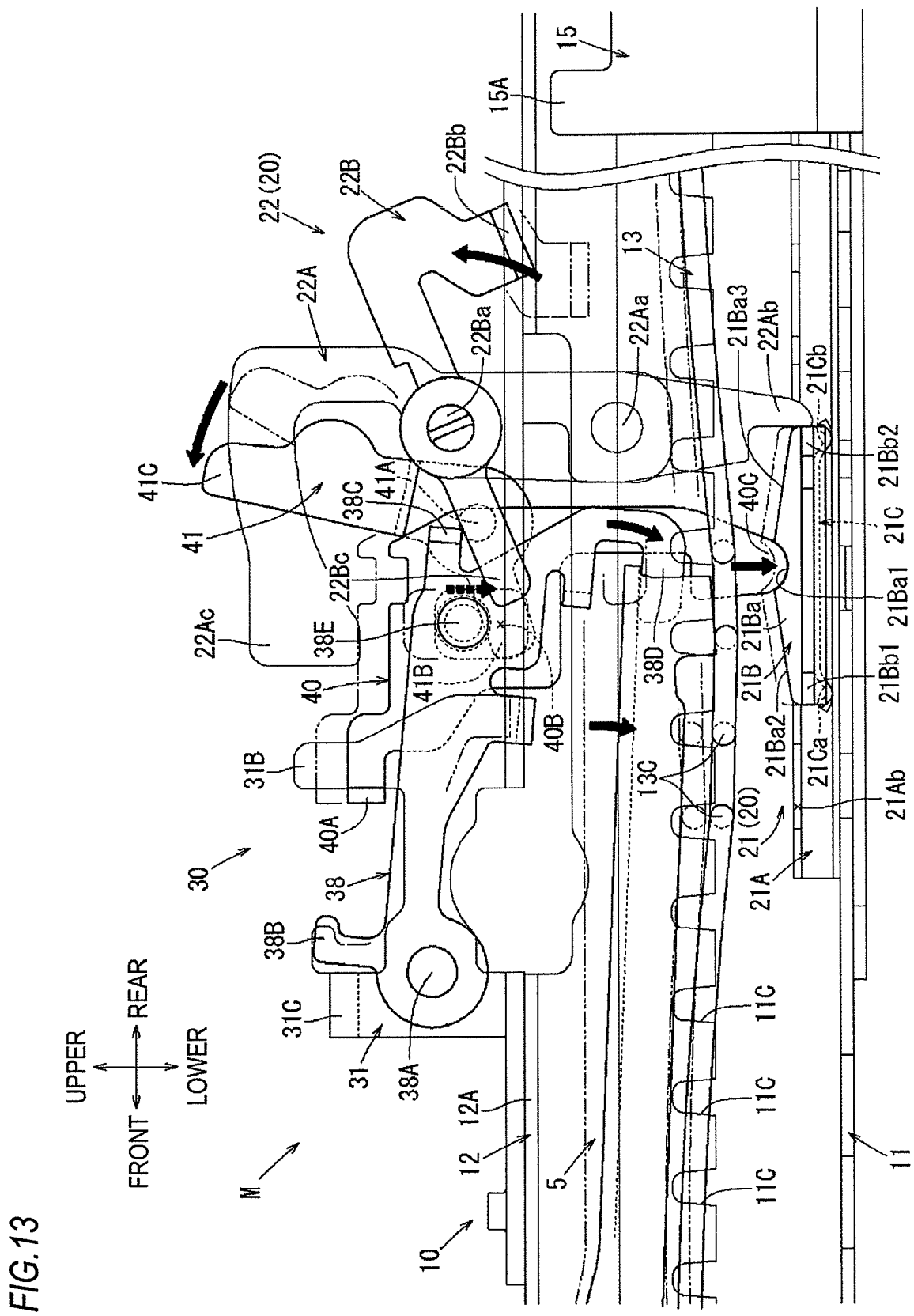
FIG. 13 is a side view showing a state in which a memory piece is removed from a state of defining a default position by a memory release member by operating the loop handle from the initial state shown in FIG. 11.

Further, in the head portion 21Ba of the above-described memory piece 21B, a top surface has a shape bulging in a substantially mountain shape in a side view, a concave surface portion 21Ba1 recessed in an arc shape is formed at an apex portion of the mountain in the center in the front and rear direction, and inclined surfaces 21Ba2, 21Ba3 are formed so as to fall obliquely forward and backward from the concave surface portion 21Ba1. As shown in FIG. 13, when the above-described loop handle 5 is operated, the above-described concave surface portion 21Ba1 functions as a pressure receiving portion into which the pressing piece 40C on the lower end side of the memory release member 40 pushed downward by the same operation is fitted and pressed downward. With this pressing, the memory piece 21B is pushed downward against a biasing force of the leaf spring 21C, and the memory teeth 21Bb1, 21Bb2 are removed from the state in which they are fitted into the memory grooves 21Ab of the memory rail 21A, so that the position restriction state of the memory piece 21B is released.

Figure 11:
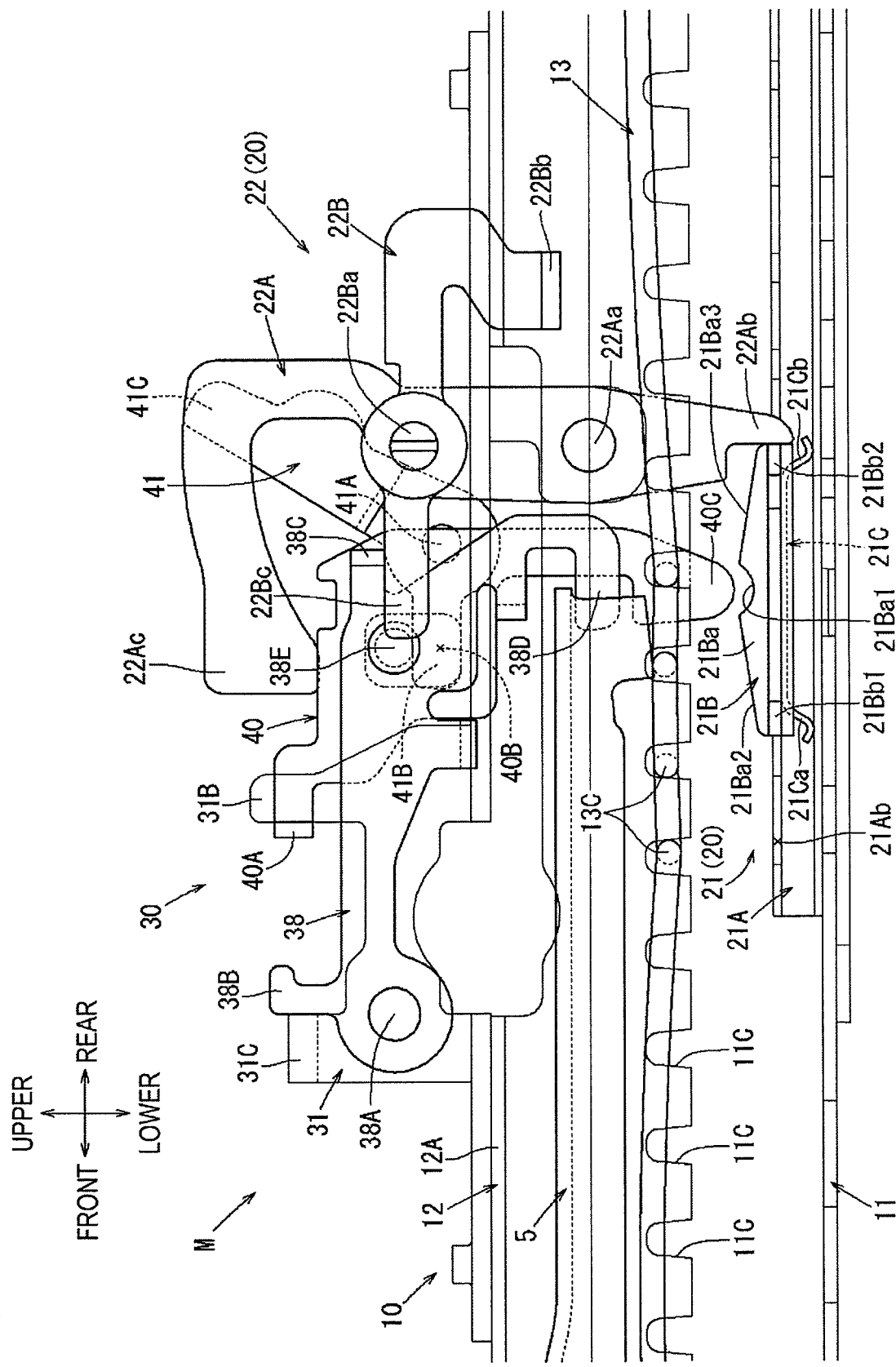
FIG. 11 is a side view visualizing a main mechanical component on the front side of the vehicle slide rail device in an initial state.

As shown in FIGS. 7 and 11, the leaf spring 21C has a configuration bent in a substantially truncated mountain shape in a side view, and a top plate portion thereof is integrally attached to a bottom surface of the above-described memory piece 21B. With the above attachment, when the memory piece 21B is assembled in the memory rail 21A, the leaf spring 21C is provided in a state where a front leg 21Ca and a rear leg 21Cb extending downward from the bottom surface of the memory piece 21B are respectively pressed against the bottom surface of the memory rail 21A. Thus, the leaf spring 21C normally applies an upward biasing force for fitting the memory piece 21B into each memory groove 21Ab of the memory rail 21A.

The front leg 21Ca of the above-described leaf spring 21C extends obliquely forward and downward from the region directly below the inclined surface 21Ba2 on the front side of the memory piece 21B, and the rear leg 21Cb of the leaf spring 21C extends obliquely rearward and downward from the region directly below the inclined surface 21Ba3 on the rear side of the memory piece 21B. By the leaf spring 21C having the above configuration, the memory piece 21B is spring-biased upward with respect to the memory rail 21A in a well-balanced manner with a wide front-rear width by the front leg 21Ca and the rear leg 21Cb described above. Thus, the memory piece 21B is straightly fitted into each memory groove 21Ab from the lower side without being tilted back and forth or is pushed downward by the pressing piece 40C of the memory release member 40.

Figure 30:
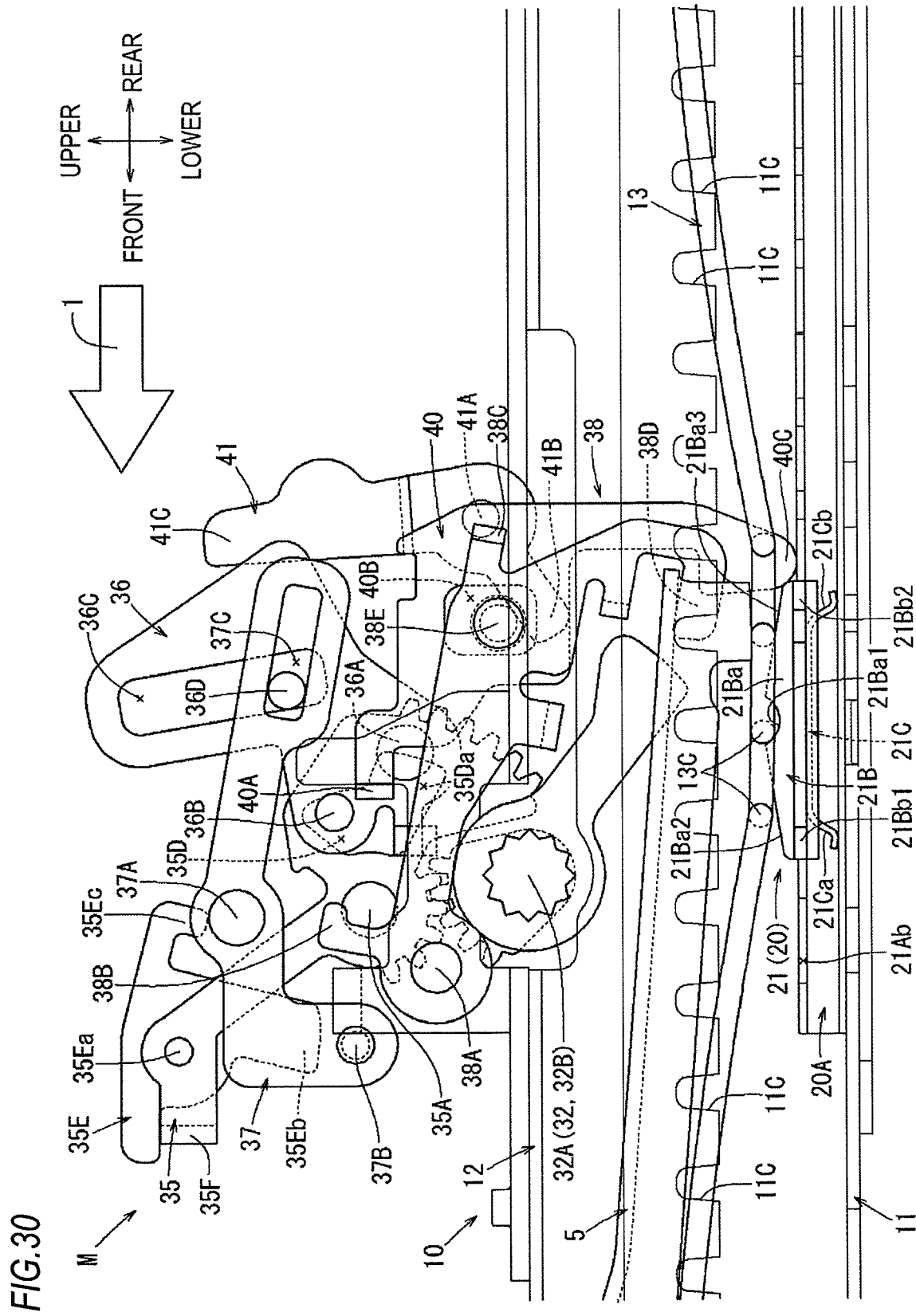
FIG. 30 is a side view showing a state in which the seat position is brought closer to the default position while the loop handle is operated.
Figure 31:
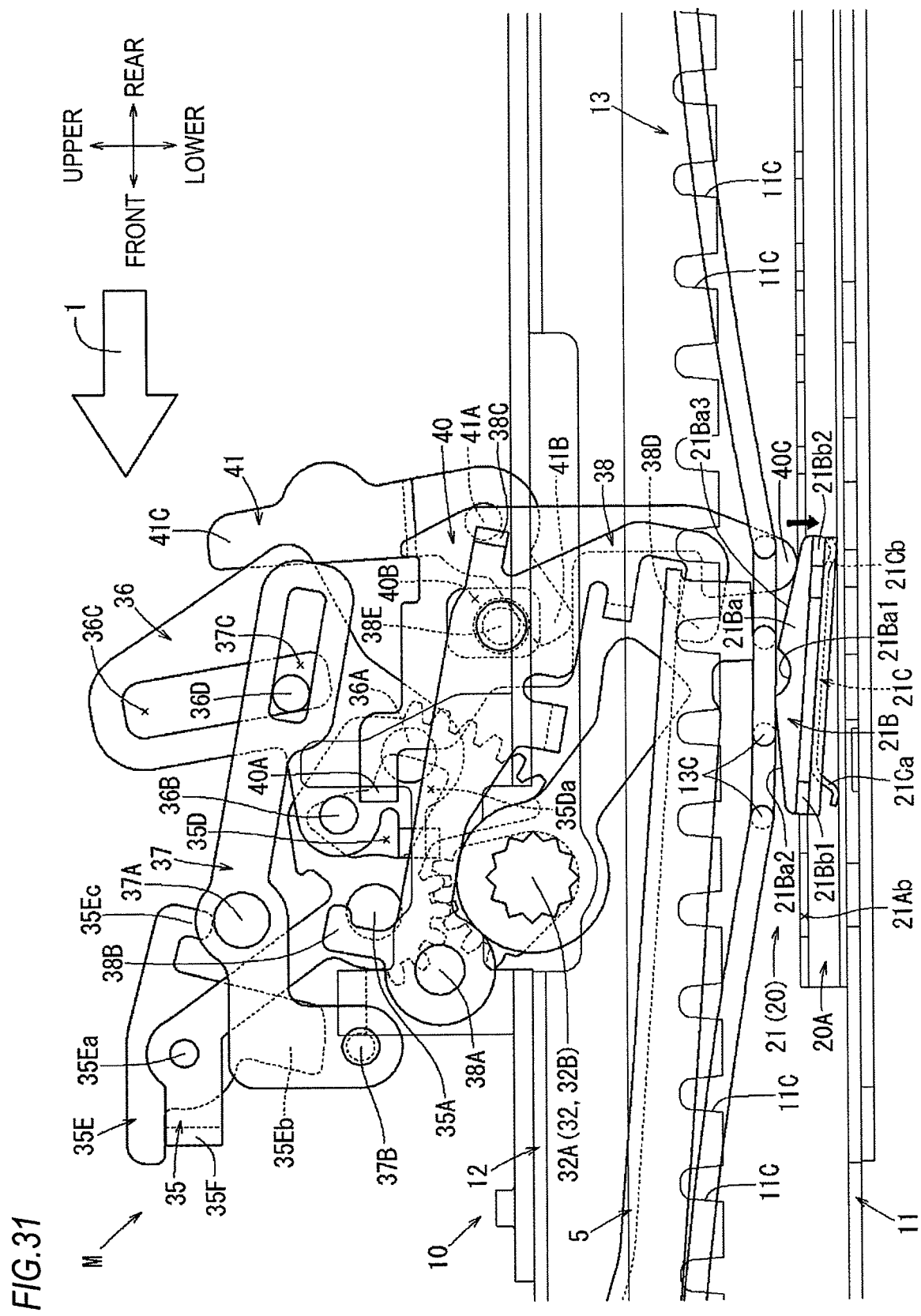
FIG. 31 is a side view showing a state in which the memory release member moves on an inclined surface of the memory piece by making the seat position further closer to the default position.

As shown in FIGS. 30 and 31, the above-described memory piece 21B is pushed down by the loop handle 5 at the position where the above-described memory release member 40 is spaced rearward from the position directly above the memory piece 21B, and is further moved from the rear side toward the memory piece 21B in an operated state in which the memory release member 40 is pushed down. In this case, the memory release member 40 is caused to move on the inclined surface 21Ba3 on the rear side, and then, as shown in FIG. 32, the memory release member 40 can move to a position where it enters the concave surface portion 21Ba1.

Specifically, as shown in FIG. 31, when the memory release member 40 is brought into contact with the memory piece 21B from the rear side in the operated state in which the memory release member 40 is pushed down as described above, a rear end portion of the memory piece 21B receives a pressing force for pushing the memory piece 21B forward and downward by the pressing piece 40C protruding in an arc shape on the lower end side of the memory release member 40. In this way, the memory piece 21B is in the rearwardly tilted posture in which it elastically pushes the rear leg 21Cb of the leaf spring 21C downward, and the pressing piece 40C of the memory release member 40 moves on the inclined surface 21Ba3 on the rear side. At that time, the memory teeth 21Bb2 on the rear side of the memory piece 21B are removed downward from the corresponding memory grooves 21Ab of the memory rail 21A in accordance with the above rearward tilting. However, since the memory teeth 21Bb1 on the front side are maintained in a state of being fitted into the corresponding memory grooves 21Ab, the memory piece 21B is maintained in the positional restricted state.

Figure 32:
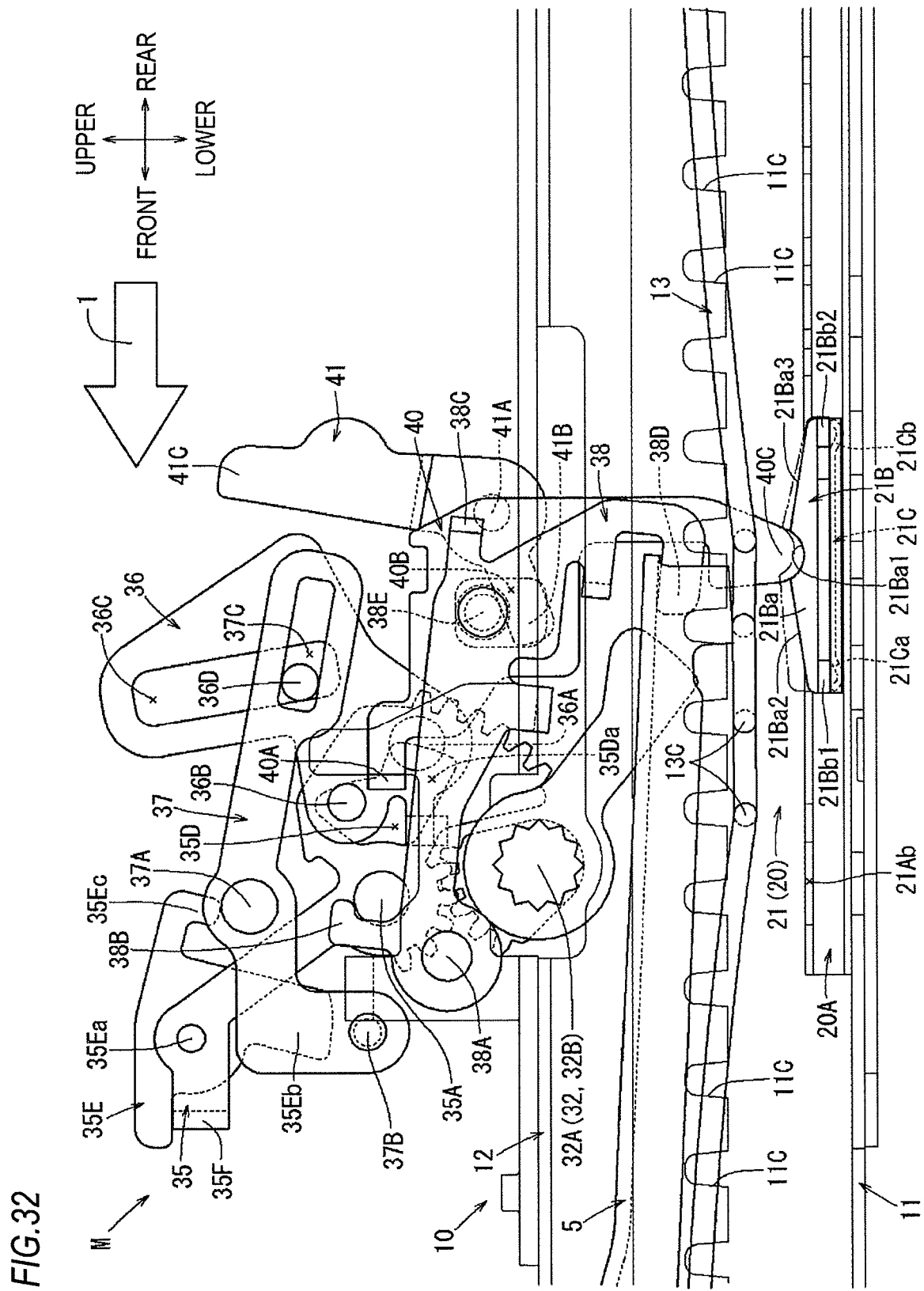
FIG. 32 is a side view showing a state in which the seat position is returned to the default position by further movement.

Further, as the memory release member 40 is further moved forward from the above state in an operated state in which it is pushed down, as shown in FIG. 32, the pressing piece 40C of the memory release member 40 reaches and enters the concave surface portion 21Ba1 of the memory piece 21B and, as in the above-described state shown in FIG. 13, the memory release member 40 straightly pushes the memory piece 21B downward, so that both of the memory teeth 21Bb1, 21Bb2 on the front and rear sides are removed from the memory grooves 21Ab of the memory rail 21A. In this way, the memory piece 21B moves together with the memory release member 40 in the front and rear direction, and, as shown in FIG. 16, the memory piece 21B moves in the front and rear direction together with the movement in the front and rear direction of the memory release member 40 in the operated state in which the memory release member 40 is pushed down.

Then, after the memory piece 21B moves together with the memory release member 40, the memory release member 40 is pulled upward by releasing the operation of the loop handle 5. Thereby, as in the state shown in FIG. 11, at that position, the memory piece 21B is again fitted into each of the memory grooves 21Ab of the memory rail 21A by a biasing force of the leaf spring 21C and is returned to a state in which its position is restricted. Through the above series of operations, the position of the memory piece 21B is displaced to a position corresponding to the moving position of the seat 1 in accordance with the operation of the loop handle 5.

<Specific Configuration of Trigger 22>

Subsequently, a specific configuration of the above-described trigger 22 will be described with reference to FIGS. 8 to 11. The trigger 22 is assembled on a base bracket 31 of the operation mechanism 30 (to be described later) which is assembled on the upper rail 12 of the above-described slide rail 10. Specifically, the trigger 22 includes a detection link 22A and the stopper link 22B. The detection link 22A is rotatably pin-connected to the above-described base bracket 31 by a shaft pin 22Aa having an axis oriented in the vehicle width direction. The stopper link 22B is rotatably pin-connected to a position higher than the setting position of the shaft pin 22Aa of the detection link 22A by a shaft pin 22Ba having an axis oriented in the vehicle width direction. Here, the detection link 22A corresponds to the "detection member" in the disclosure.

The above-described detection link 22A is formed of a single plate material of steel or the like cut into a substantially inverted L shape which has a surface oriented in the vehicle width direction and is elongated in the height direction. In the detection link 22A, a vertical side portion extending in the height direction is passed through a through-hole 12Aa formed in the top plate portion 12A of the above-described upper rail 12 from the upper side, and an intermediate portion entering the inside of the upper rail 12 is rotatably pin-connected to the shape portion of the base bracket 31 which similarly enters the inside of the upper rail 12 by the above-described shaft pin 22Aa. In the detection link 22A, a leg piece 22Ab is formed on a lower end portion of the vertical side portion entering the inside of the upper rail 12. The leg piece 22Ab is brought into contact with the above-described memory piece 21B from the rear side to detect the movement thereof. Further, in the detection link 22A, a pressing piece 22Ac extending in an arm shape toward the front side is formed on an upper end portion of the vertical side portion.

Figure 21:
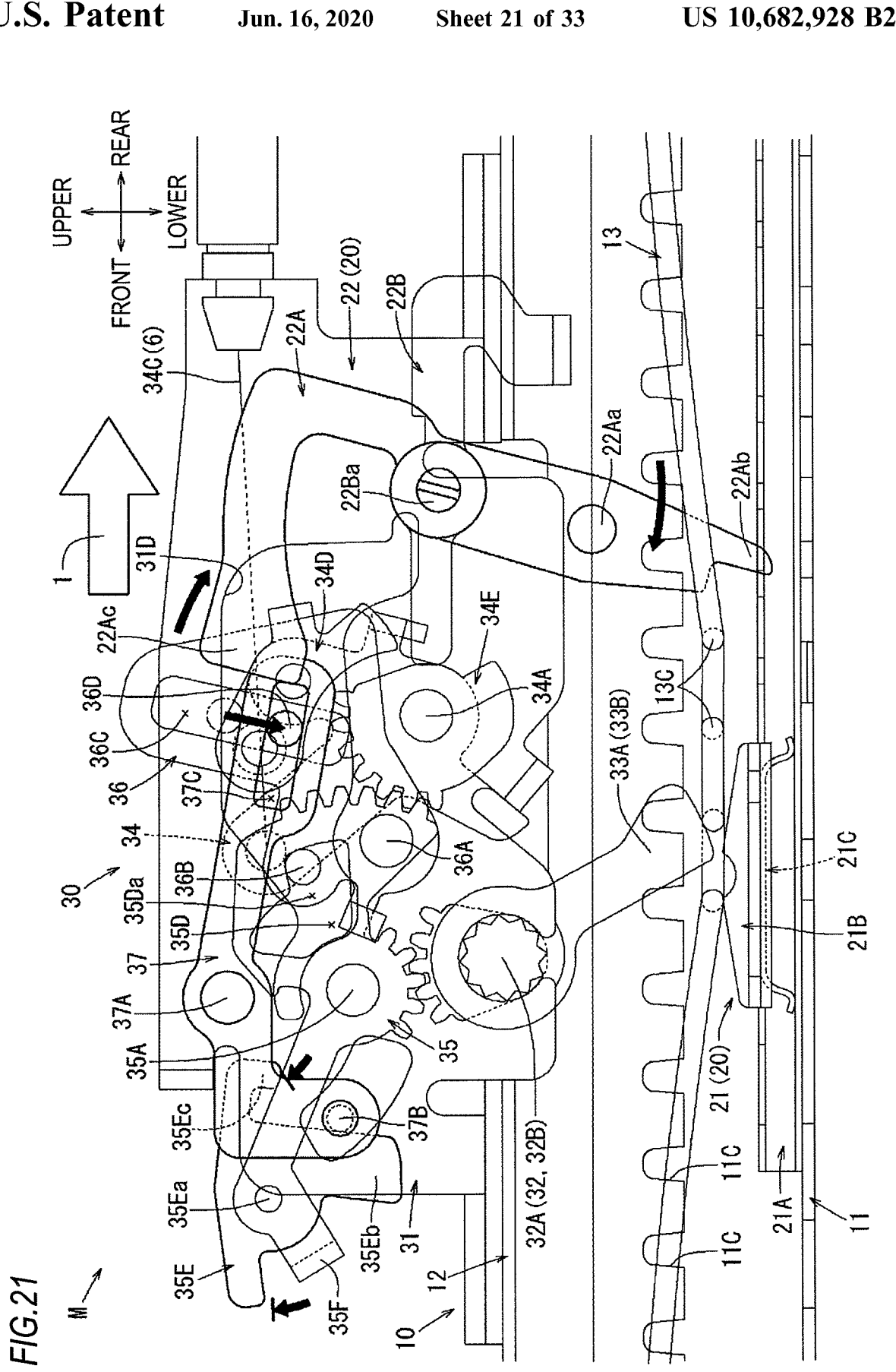
FIG. 21 is a side view showing a state in which the seat position is retracted in a state where the slide lock is released and maintained by operating the memory lever.

The above-described detection link 22A is normally biased to rotate in the clockwise direction (backward direction) in the figure in which the leg piece 22Ab is kicked out forward about the shaft pin 22Aa by a spring (not shown) hooked between the above-described base bracket 31 and the detection link 22A. However, as shown in FIG. 11, when the above-described memory piece 21B is placed at a position corresponding to the moving position of the seat 1, the detection link 22A is maintained in a state of an upright posture in which the above-described leg piece 22Ab is stopped by a rear end of the memory piece 21B. As shown in FIG. 21, as the seat position is retracted while leaving the memory piece 21B by operating the above-described memory lever 6, the detection link 22A is switched to a state of the rearwardly tilted posture in which the leg piece 22Ab is slightly kicked up to the front side by the above-described spring biasing force, so that the detection link 22A is locked at the same position by being brought into contact with the base bracket 31.

Then, as the seat position is returned from the above state position to the default position where the memory piece 21B is placed, as shown in FIG. 27, the detection link 22A is pushed and rotated in the counter-clockwise direction (forward direction) in the figure to the position where the above-described leg piece 22Ab is brought into contact with the rear end of the memory piece 21B again and is in a state of the upright posture about the shaft pin 22Aa. With this movement, the detection link 22A pushes and moves the slide pin 36D of the operation mechanism 30 (to be described later) toward the front side by the pressing piece 22Ac and locks the seat position at that position. Here, the slide pin 36D corresponds to the "pressing portion" in the disclosure.

Further, as shown in FIGS. 8 to 11, the stopper link 22B is formed of a single plate material of steel or the like which has a surface oriented in the vehicle width direction and is elongated in the front and rear direction. The stopper link 22B is rotatably pin-connected to a tip portion of the vertical side portion of the above-described detection link 22A on the upper side of the upper rail 12 by the above-described shaft pin 22Ba. A rear end portion of the stopper link 22B is bent into a crank shape inward in the vehicle width direction and a lower end portion on the tip thereof is bent into a shape protruding inward in the vehicle width direction. In this way, a locking piece 22Bb is formed at the same portion of the stopper link 22B. The locking piece 22Bb can be brought into contact with the locking projection 15A of the stopper bracket 15 described with reference to FIGS. 5 and 6 from the front side.

As shown in FIG. 11, the above-described stopper link 22B is normally biased to rotate in the clockwise direction in the figure about the shaft pin 22Ba by a spring (not shown) hooked between the above-described base bracket 31 and the stopper link 22B. With the above biasing, the stopper link 22B is normally maintained in a state where its rotation is stopped at a rotational position where a pressure receiving piece 22Bc extending forward from the setting position of the shaft pin 22Ba is brought into contact with a release piece 38C formed at a release operation link 38 of the operation mechanism 30 (to be described later) from the lower side.

Figure 22:
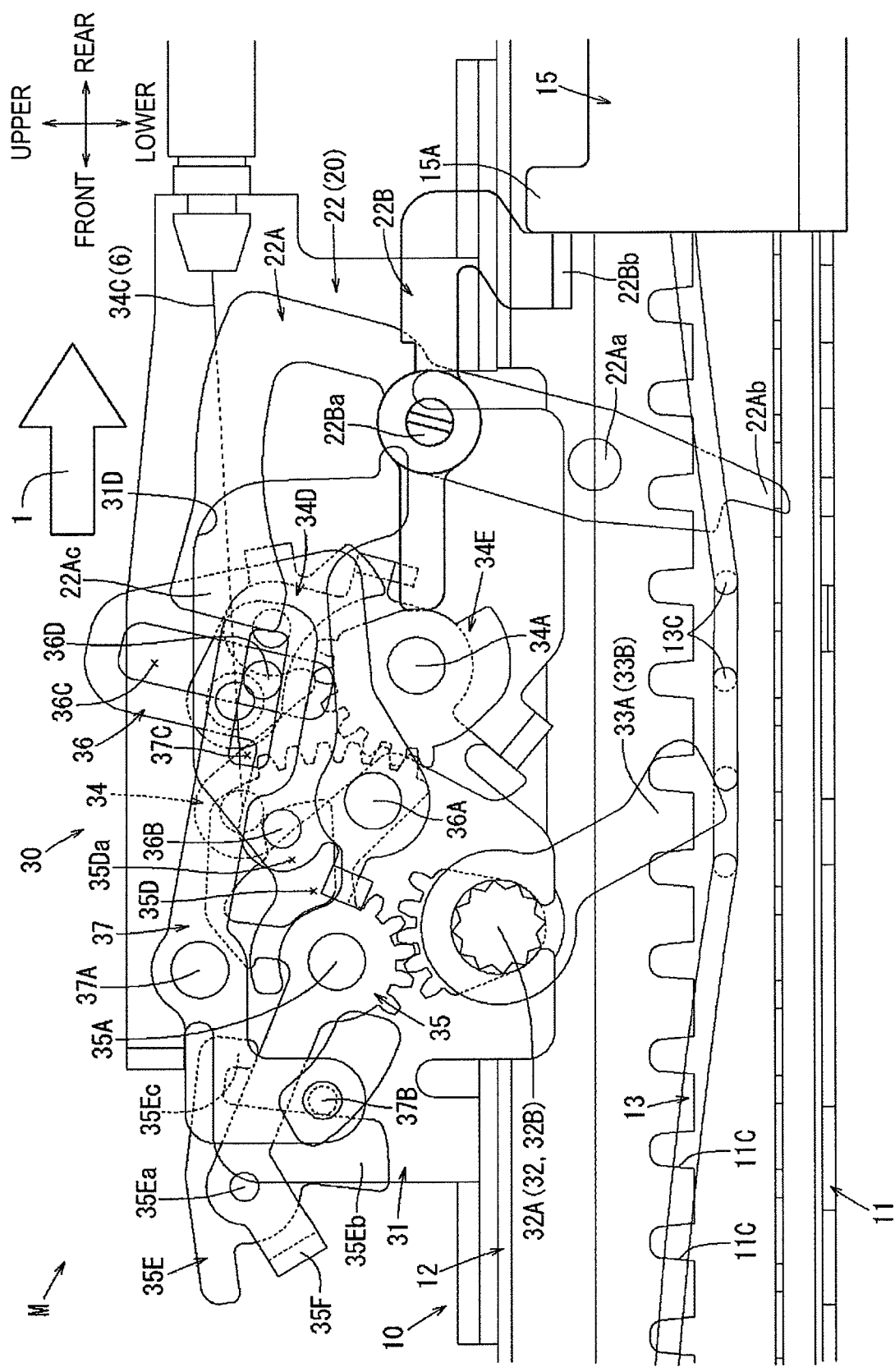
FIG. 22 is a side view showing a state in which a stopper link is brought into contact with a stopper bracket by the retreat movement of the seat position.
Figure 23:
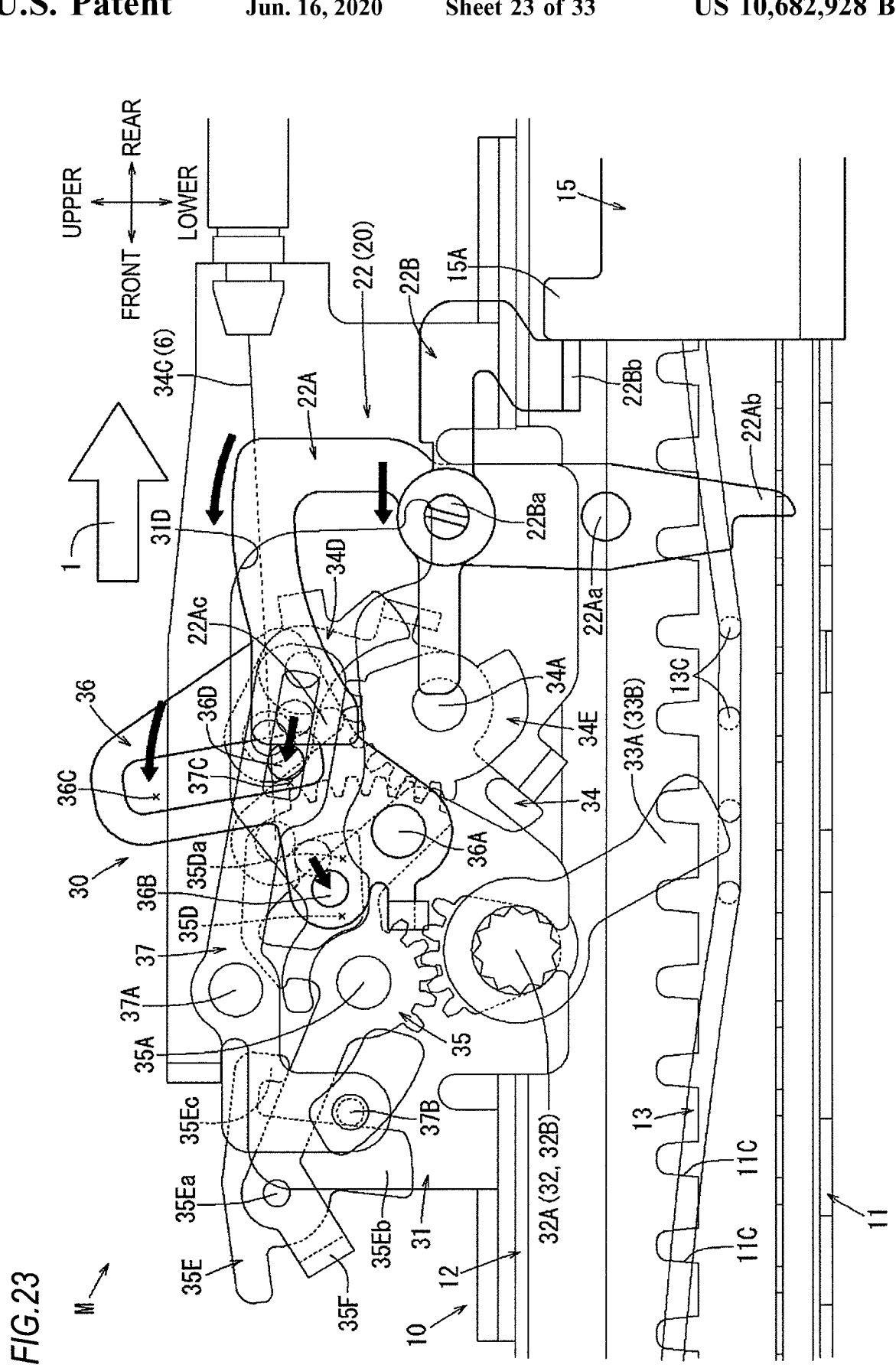
FIG. 23 is a side view showing a state in which the released and maintained state of the slide lock is released by the contact.

As shown in FIGS. 21 and 22, as the seat position is retracted while leaving the memory piece 21B by operating the above-described memory lever 6, the locking piece 22Bb on the rear end side of the stopper link 22B is brought into contact with the locking projection 15A of the stopper bracket 15 from the front side. In this way, as shown in FIG. 23, the stopper link 22B presses the detection link 22A forward via the shaft pin 22Ba that is a connection point with the above-described detection link 22A to push and rotate the detection link 22A in the counter-clockwise direction in the figure about the shaft pin 22Aa. With this movement, as in the state shown in FIG. 27, the detection link 22A pushes and moves the slide pin 36D of the operation mechanism 30 (to be described later) forward by the pressing piece 22Ac and locks the seat position at that position.

Figure 14:
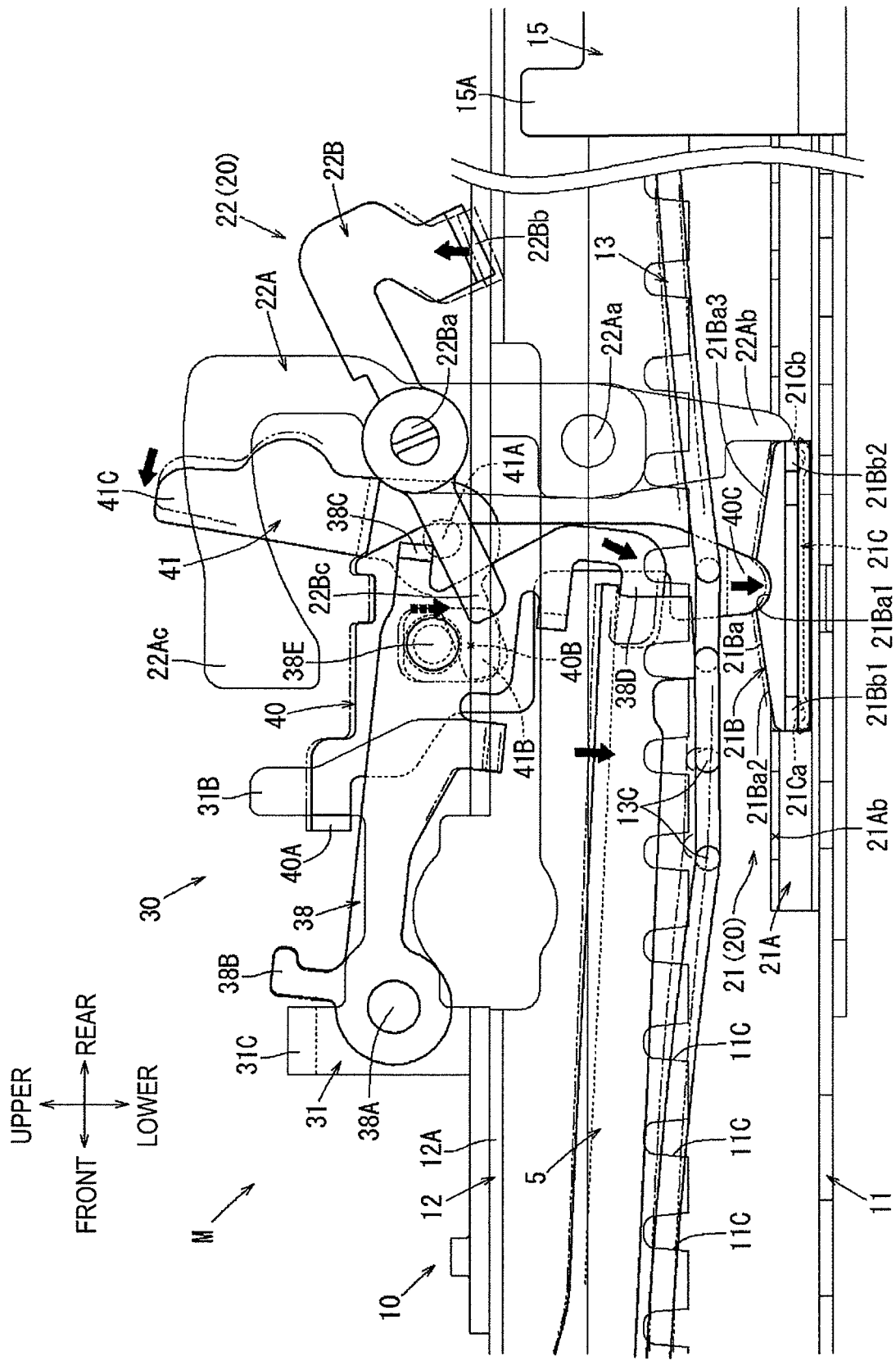
FIG. 14 is a side view showing a state in which a slide lock is released by further operating the loop handle.
Figure 15:
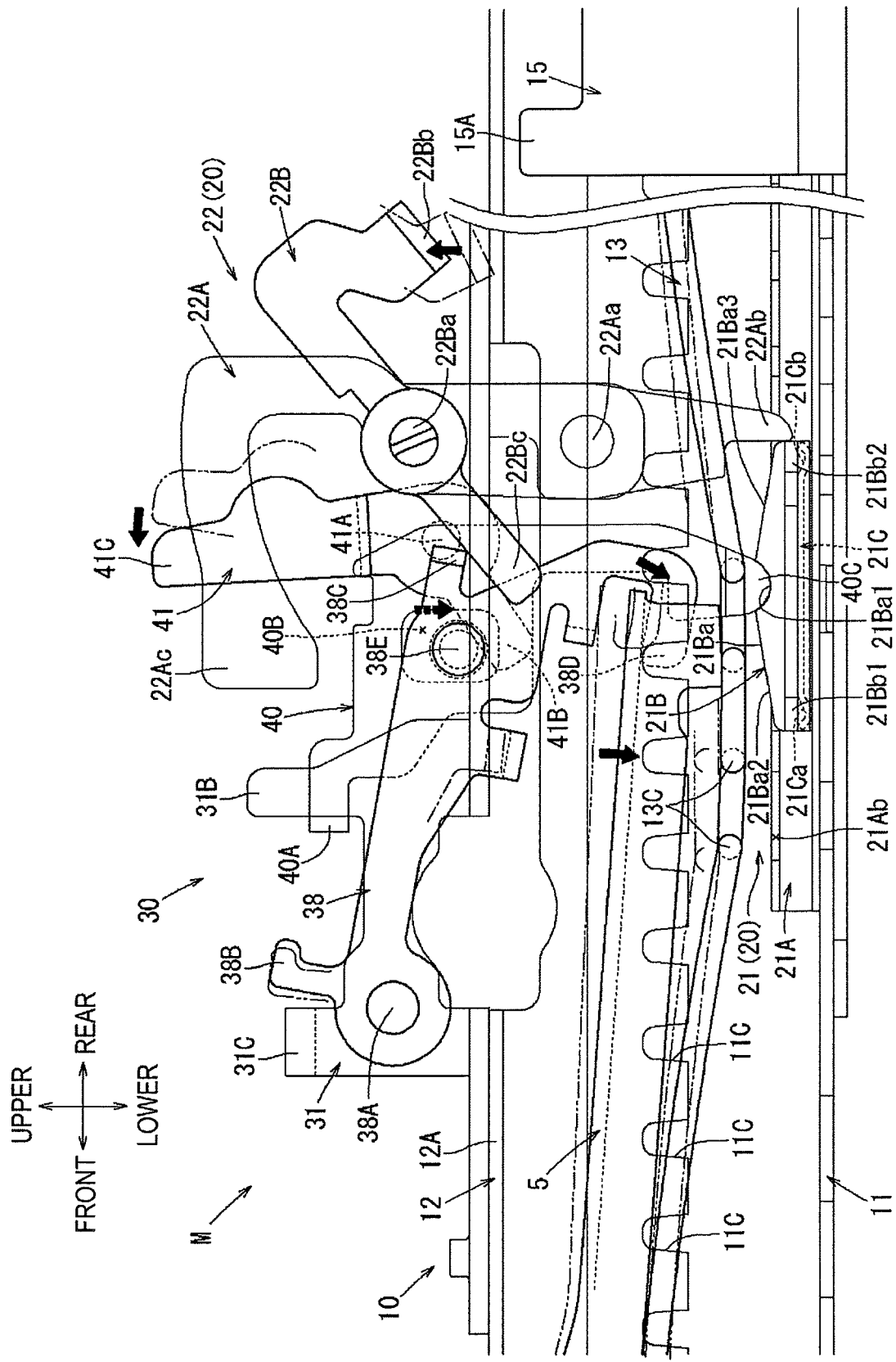
FIG. 15 is a side view showing a state in which the loop handle is further operated to an overstroke position.

However, as shown in FIGS. 14 and 15, when the above-described loop handle 5 is operated, the stopper link 22B is operated such that the pressure receiving piece 22Bc is pressed downward by the release piece 38C formed on the release operation link 38 of the operation mechanism 30 (to be described later). Thus, the locking piece 22Bb on the rear side of the stopper link 22B is operated to be pulled up to a position higher than the locking projection 15A of the above-described stopper bracket 15. In this way, as shown in FIG. 16, when the above-described loop handle 5 is operated and the seat position is retracted, the seat position can be retracted to the rearmost position since the locking piece 22Bb is not brought into contact with the locking projection 15A of the stopper bracket 15.

Meanwhile, as described with reference to FIG. 21, when the operation of the above-described memory lever 6 causes the above-described trigger 22 to move from the intermediate position where the seat position is retracted while leaving the memory piece 21B toward the default position where the memory piece 21B is left from the rear side, the speed thereof may become abrupt due to momentum of collision or the like. In this case, as shown in FIG. 27, even when the detection link 22A is brought into contact with the memory piece 21B and reaches a position of an upright posture, the sliding of the trigger 22 is not locked and a force directed to an excessive position may be applied to the trigger 22 by the momentum.

Specifically, even when the trigger 22 is pushed and rotated to the position where the detection link 22A is brought into contact with the memory piece 21B and is in the upright posture, the movement of the lock spring 13, which is released from the releasing operation according to the pushing and rotating, elastically returning to the locked state may be delayed. However, as shown in FIG. 33, in the case described above, the above-described detection link 22A is pushed and rotated by being brought into contact with the memory piece 21B, thereby pushing and moving the slide pin 36D. And then, the slide pin 36D is released to be removed from the contact with the detection link 22A by the shape of an elongated hole 37C of a control link 37 (to be described later). In this way, even when the detection link 22A is pushed and moved to the position of the forwardly tilted posture beyond the position of the upright posture, overload is not applied thereto, and the lock at the excessive position is also permissible by the lock spring 13 returning to the lock state at that position. Here, the control link 37 corresponds to the "variable structure" in the disclosure.

<Specific Configuration of Operation Mechanism 30>

Figure 8:
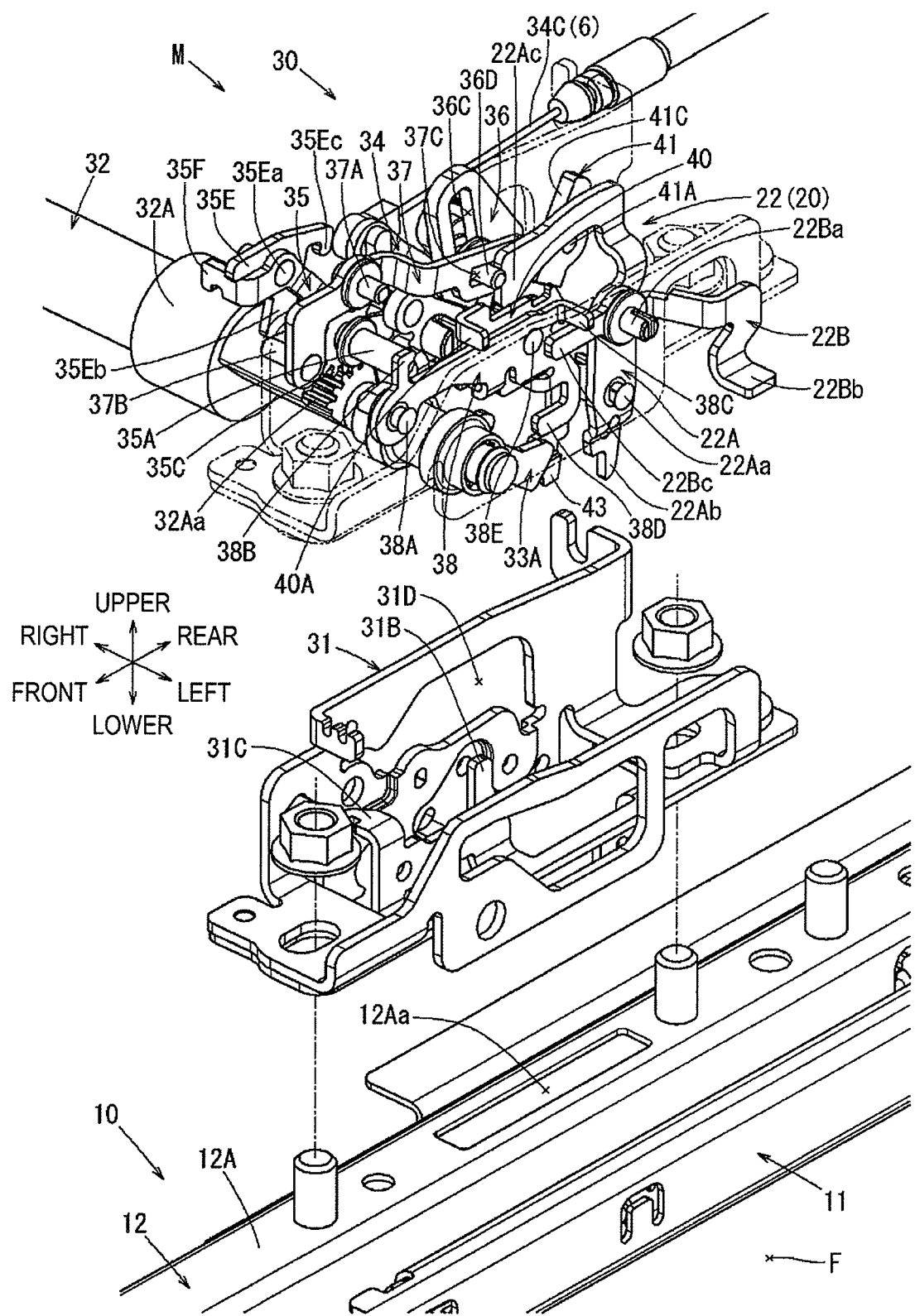
FIG. 8 is an exploded perspective view of a mechanical component assembled on the upper side of the slide rail.
Figure 9:
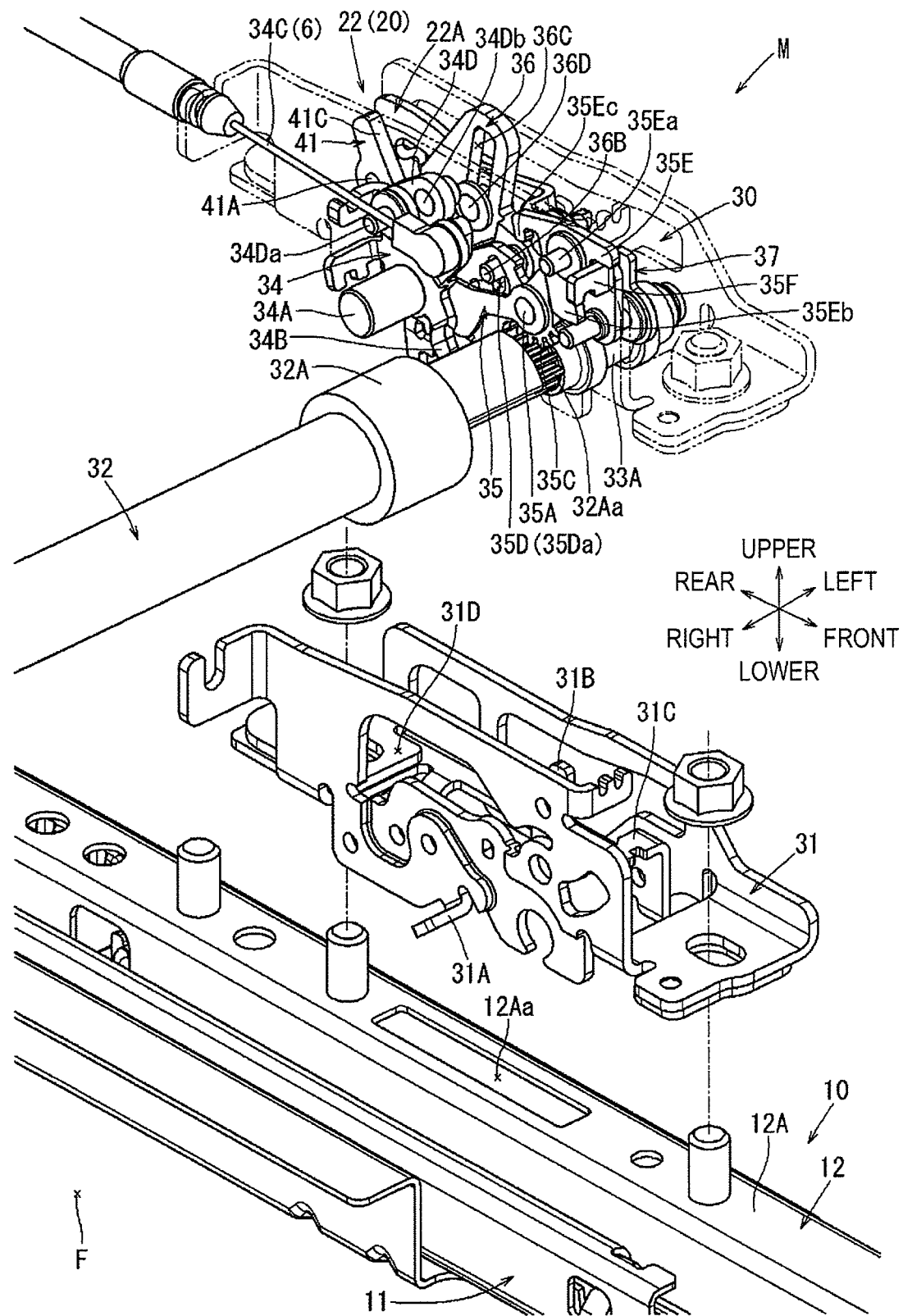
FIG. 9 is an exploded perspective view of the mechanical component, as seen from the opposite side.
Figure 10:
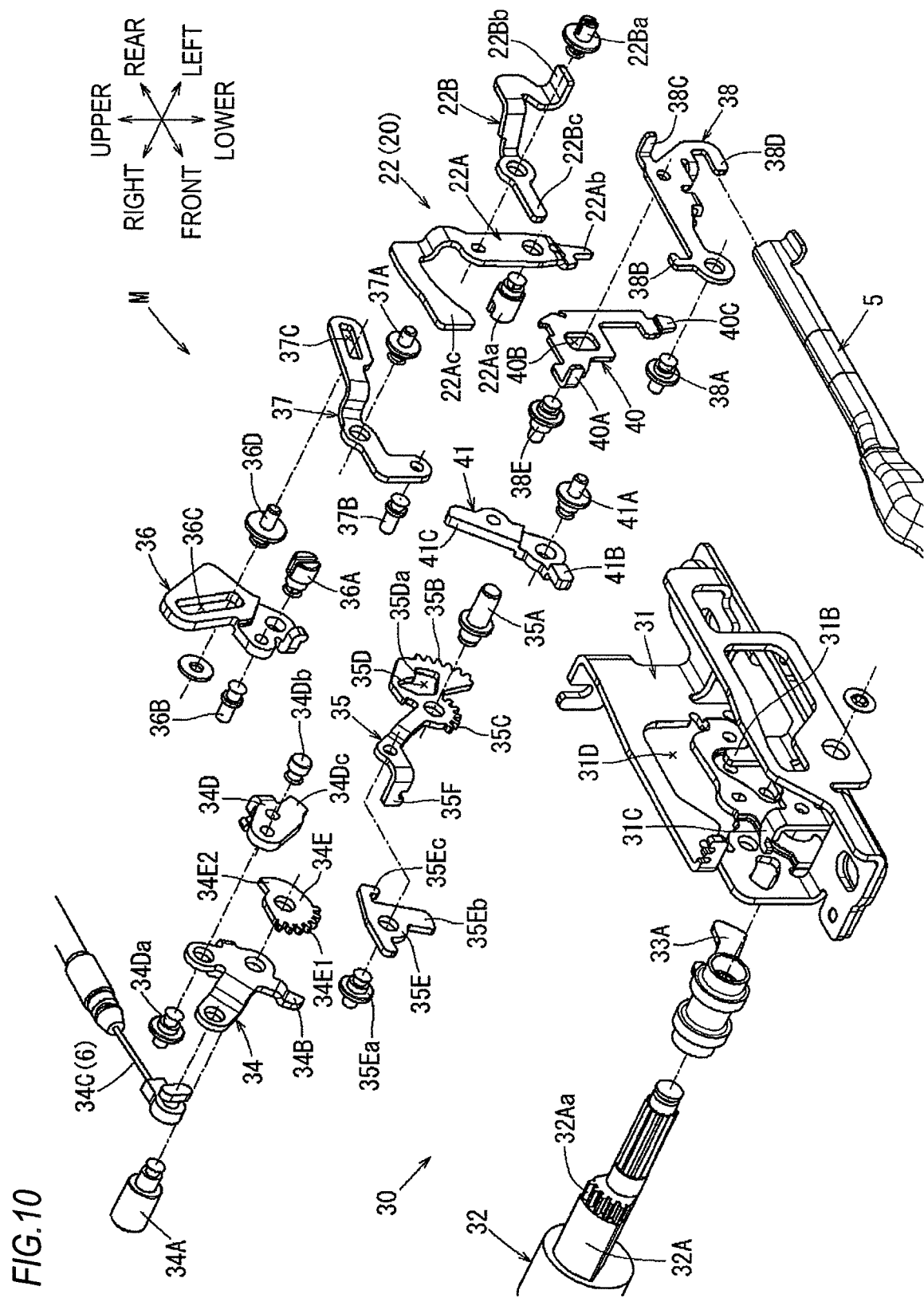
FIG. 10 is a further exploded perspective view of the mechanical component.

Subsequently, a specific configuration of the operation mechanism 30 will be described with reference to FIGS. 5 and 6 and FIGS. 8 to 33. As shown in FIGS. 5 and 6, the operation mechanism 30 is configured such that each component part is assembled to the base bracket 31 serving as a base provided on the upper rail 12 of the slide rail 10 on the inner side in the vehicle width direction. Specifically, as shown in FIG. 5, the operation mechanism 30 includes the rod 32 and release arms 33A, 33B. The rod 32 is rotatably pin-connected between the above-described base bracket 31 and a support bracket 16 provided on the upper rail 12 of the slide rail 10 on the outer side in the vehicle width direction via operation shafts 32A, 32B. The release arms 33A, 33B are integrally coupled to the operation shafts 32A, 32B of the rod 32 and synchronously perform the operation of unlocking the lock springs 13 in the slide rails 10 on the respective sides. As shown in FIGS. 8 to 10, the operation mechanism 30 further includes an input link 34, a memory operation link 35, a holding link 36, the control link 37, the release operation link 38 and a forced release link 41, which are provided as a state of being rotatably pin-connected to the base bracket 31, and the memory release member 40 which is provided as a state of being slidably guided with respect to the base bracket 31 in the height direction.

<Specific Configuration of Base Bracket 31, Rod 32, and each of Release Arms 33A, 33B>

The above-described base bracket 31 is formed of a plate material of steel or the like combined in a substantially U shape in a front view. As shown in FIGS. 5 and 6, the base bracket 31 is provided in a state where a bottom plate portion of the U shape is bolted on the top plate portion 12A of the above-described upper rail 12 and is integrally fixed thereto. As shown in FIGS. 8 to 10, the rod 32 is provided in a state of being rotatably pin-connected to the above-described base bracket 31 via the operation shaft 32A having an axis oriented in the vehicle width direction. Specifically, the above-described operation shaft 32A is rotatably pin-connected to the base bracket 31 in a state where it is integrally coupled to the operation shaft 32B (see FIG. 5) on the opposite side via the above-described rod 32.

Figure 17:
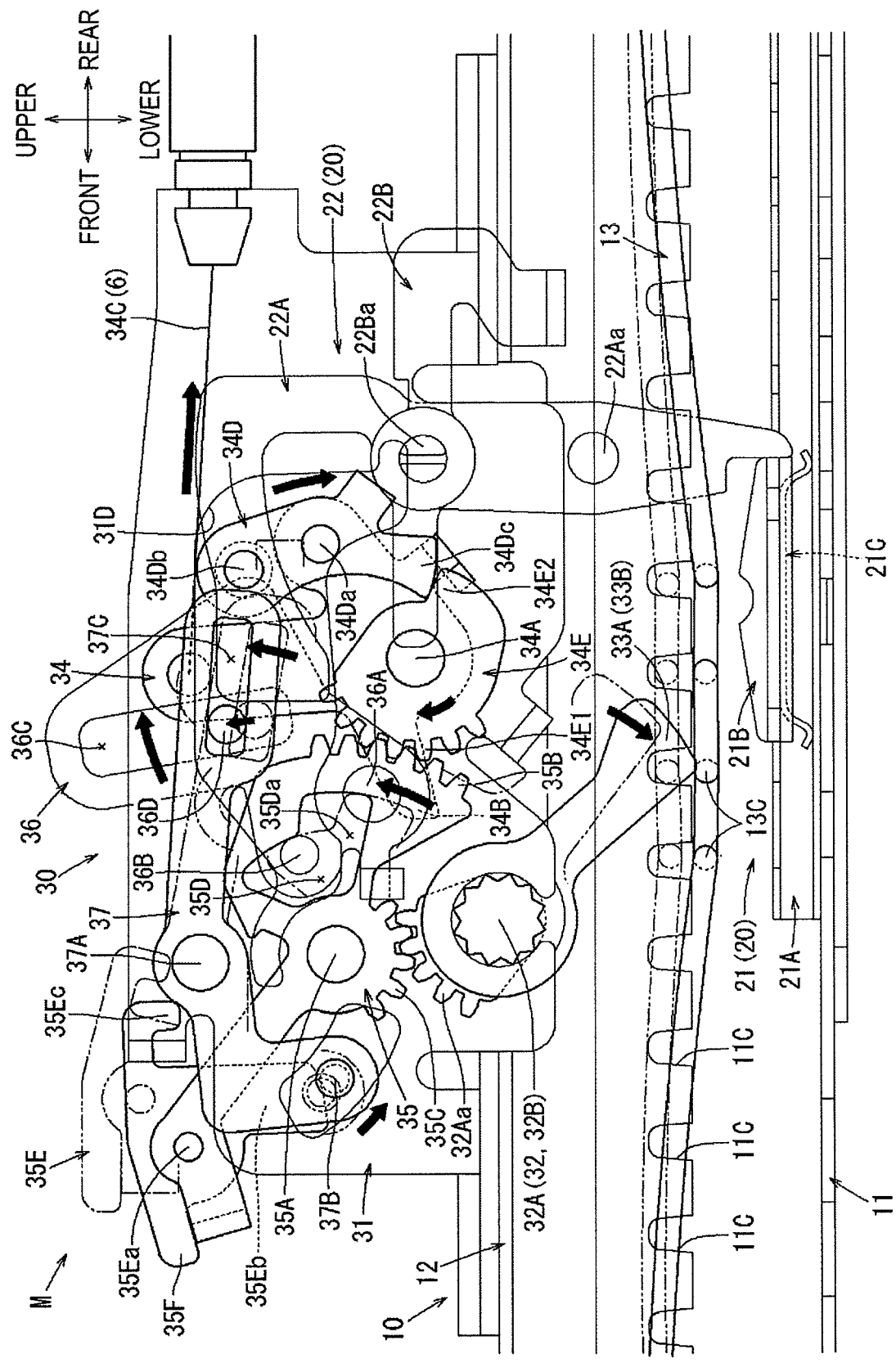
FIG. 17 is a side view showing a state in which the slide lock is released by operating the memory lever from the initial state shown in FIG. 12.
Figure 18:
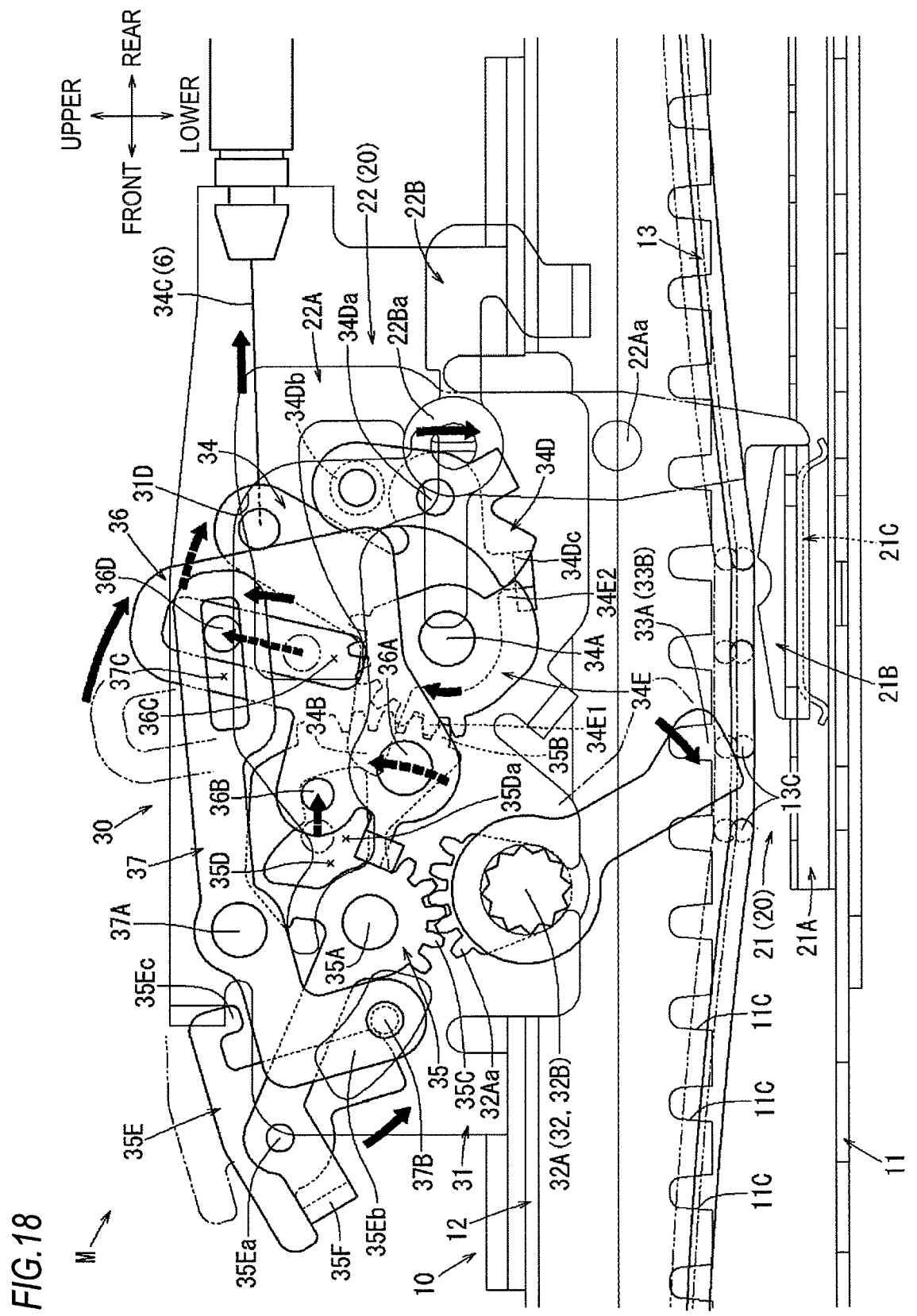
FIG. 18 is a side view showing a state in which a memory operation link is maintained in a release operated position by further operating the memory lever.
Figure 19:
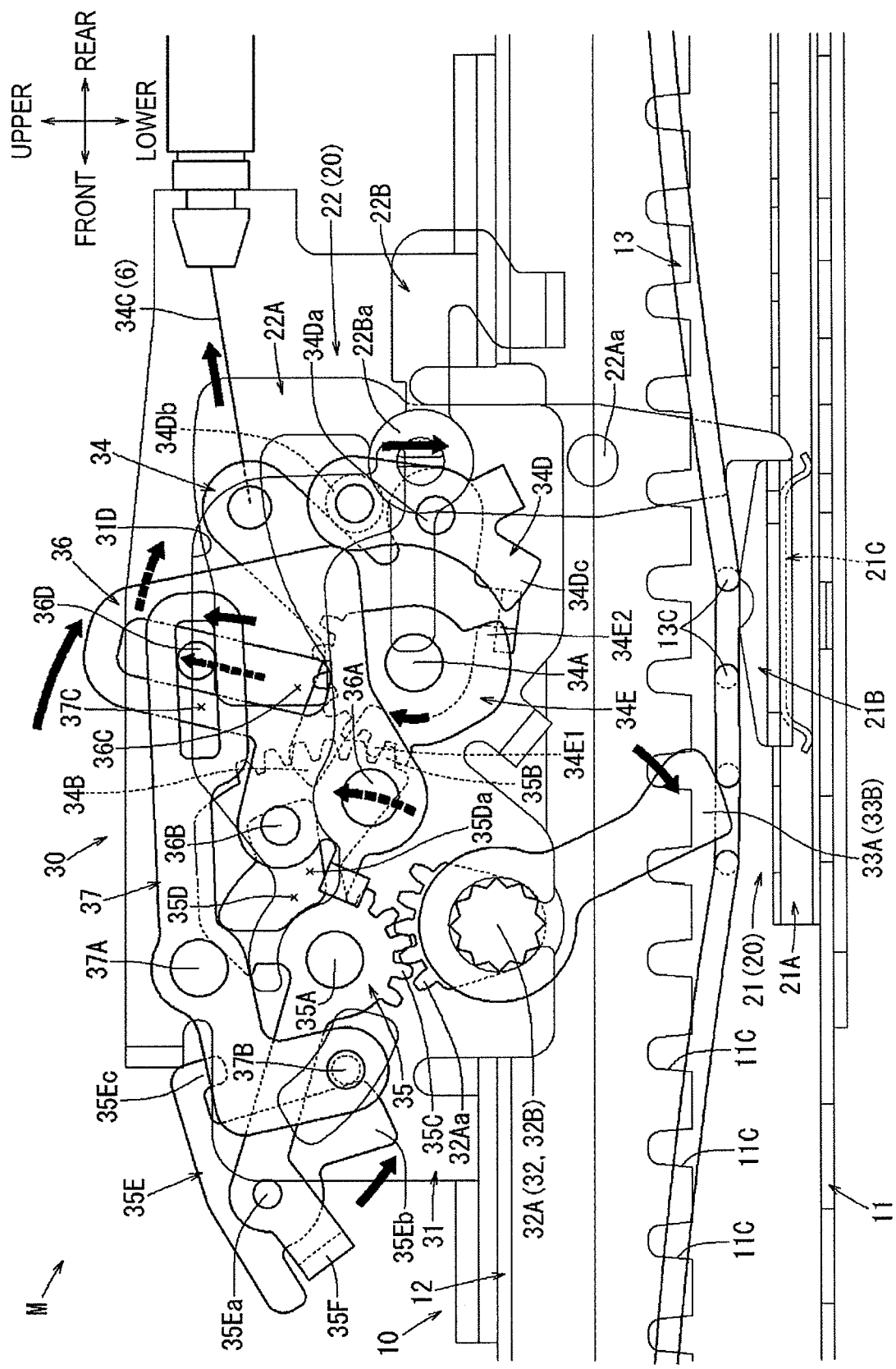
FIG. 19 is a side view showing a state in which the memory lever is further operated to the overstroke position.

As shown in FIGS. 8 to 10, a driven gear 32Aa is formed on an outer peripheral portion of the above-described operation shaft 32A. The driven gear 32Aa is gear-connected to an output gear 35C of the memory operation link 35 (to be described later) and receives the rotational force. With the above configuration, as shown in FIGS. 17 to 19, the rod 32 and the operation shafts 32A, 32B are operated to pivot in a direction opposite to the memory operation link 35 in accordance with the rotational movement of the memory operation link 35. Then, with the above pivot operation, the operation shafts 32A, 32B push and deflect, toward the lower side, the lock portions 13C of the lock springs 13 of the slide rails 10 on the respective sides by the release arms 33A, 33B on the respective sides integrally coupled thereto, thereby simultaneously releasing the locked states of the lock springs 13.

<Specific Configuration of Input Link 34>

Figure 12:
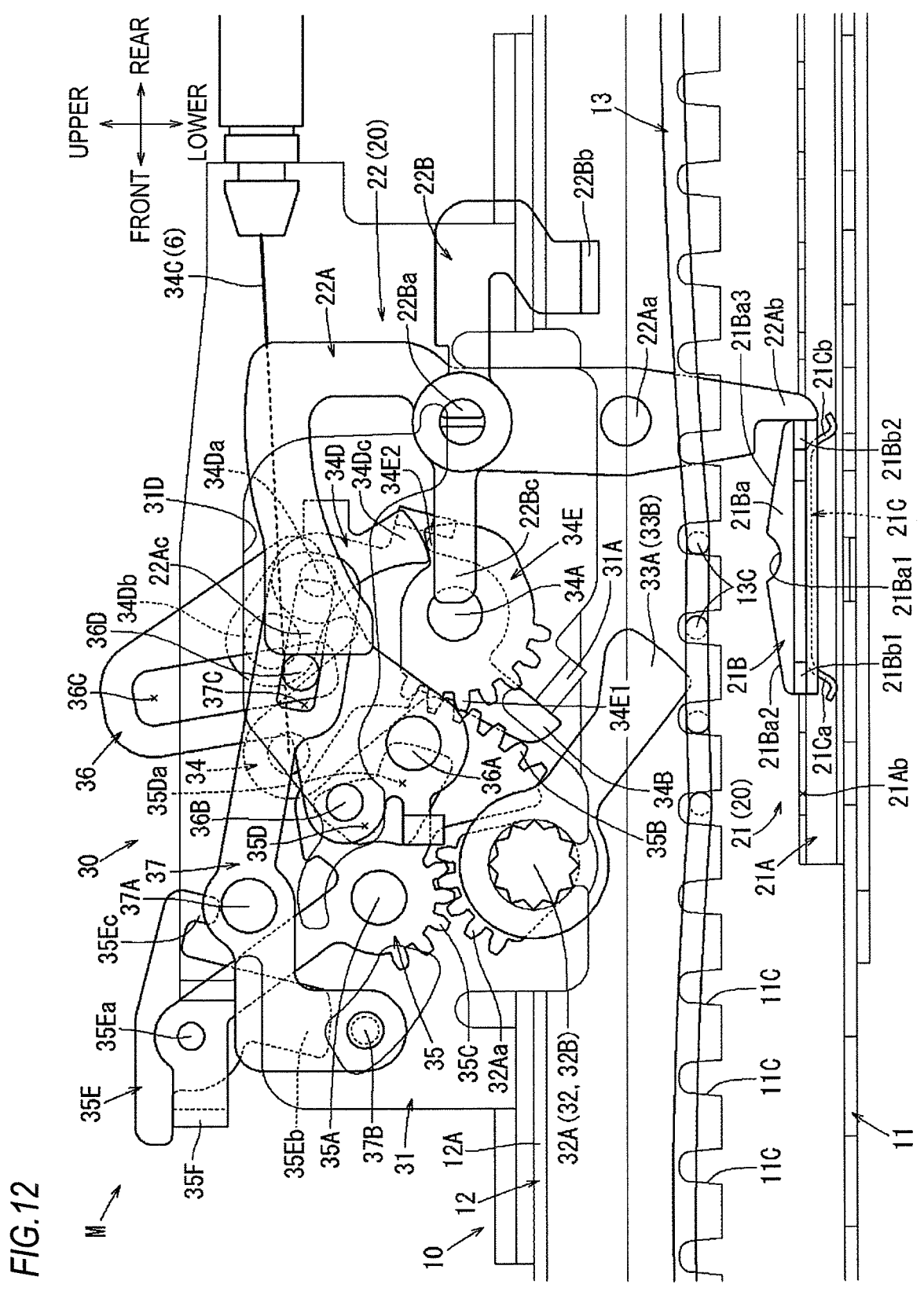

As shown in FIGS. 9 and 10, the input link 34 is provided in a state of being rotatably pin-connected to the above-described base bracket 31 by a shaft pin 34A having an axis oriented in the vehicle width direction. As shown in FIG. 12, the input link 34 is normally biased to rotate in the counter-clockwise direction (forward direction) in the figure about the shaft pin 34A by a spring (not shown) hooked between the above-described base bracket 31 and the input link 34. With the above biasing, the input link 34 is normally maintained in a state where an arm-shaped protruding piece 34B extending forward and downward from the setting position of the shaft pin 34A is brought into contact with a locking piece 31A formed in the base bracket 31 and is locked.

A leading end portion of a cable 34C connected to the above-described memory lever 6 is connected to the portion of the above-described input link 34 extending forward and upward from the setting position of the shaft pin 34A. With the above connection, as shown in FIGS. 17 to 19, as the memory lever 6 is operated, the input link 34 is operated to rotate in the clockwise direction (backward direction) in the figure about the shaft pin 34A against the above-described spring biasing force (not shown). Meanwhile, as shown in FIGS. 9 and 10, in the above-described input link 34, a separate locking/unlocking link 34D is provided in a state of being rotatably pin-connected to the portion offset upward from the setting position of the shaft pin 34A by a shaft pin 34Da having an axis oriented in the vehicle width direction.

As shown in FIG. 12, in the locking/unlocking link 34D, a guide pin 34Db having a shaft protruding in the vehicle width direction is provided in a state of being rotatably pin-connected to the portion extending forward and upward from the setting position of the shaft pin 34Da. As shown in FIG. 9, the above-described guide pin 34Db is provided in a state of being inserted into a guide hole 31D formed in the above-described base bracket 31. The above-described locking/unlocking link 34D is normally biased to rotate in the clockwise direction (backward direction) in FIG. 12 about the shaft pin 34Da by a spring hooked between the above-described input link 34 and the locking/unlocking link 34D. With the above biasing, the locking/unlocking link 34D is normally maintained in a state where the above-described guide pin 34Db is brought into contact with an upper inner peripheral surface in the guide hole 31D of the base bracket 31 and is locked.

As shown in FIGS. 17 to 19, when the above-described memory lever 6 is operated and the input link 34 is operated to rotate in the clockwise direction (backward direction) in the figure about the shaft pin 34A, the above-described locking/unlocking link 34D is adapted to move in conjunction with the rotation direction of the input link 34 by the shaft pin 34Da that is a connection point with the input link 34. At that time, by a spring biasing force (not shown) acting between the above-described input link 34 and the locking/unlocking link 34D, the locking/unlocking link 34D is adapted to change its rotational posture with respect to the input link 34 while the guide pin 34Db slides along the upper inner peripheral surface in the guide hole 31D of the base bracket 31.

As shown in FIG. 18, the upper inner peripheral surface of the guide hole 31D of the base bracket 31, on which the above-described guide pin 34Db slides, is shaped to guide the guide pin 34Db so that it is gradually and straightly dropped downward with the progress of the operation of the memory lever 6. With the above guidance, as shown in FIG. 19, when the memory lever 6 is operated to the overstroke position, the locking/unlocking link 34D is disengaged from the engagement state with a driving gear 34E (to be described later) and is released so that excessive operation movement amount is not transmitted to the driving gear 34E.

As shown in FIGS. 10 and 12, another driving gear 34E is additionally provided as a state of being rotatably pin-connected to the shaft pin 34A serving as a support shaft of the above-described input link 34. The driving gear 34E is not integrated with the above-described input link 34. However, when the above-described locking/unlocking link 34D is engaged with the driving gear 34E so as to be integral in the rotation direction, as shown in FIGS. 17 and 18, the driving gear 34E is pushed and rotated by the locking/unlocking link 34D in accordance with the rotational operation of the above-described input link 34.

Specifically, as shown in FIGS. 10 and 12, a gear portion 34E1 provided in a state of being gear-connected to an input gear 35B of the memory operation link 35 (to be described later) is formed on the outer peripheral surface of the above-described driving gear 34E. With the above configuration, as shown in FIG. 12, the driving gear 34E normally receives the action of a spring biasing force (not shown) via the above-described memory operation link 35 and receives the rotational biasing force in the counter-clockwise direction (forward direction) in the figure about the shaft pin 34A.

However, the above-described driving gear 34E is normally maintained as a state in which its rotation is stopped by bringing a kick piece 34Dc curved and extending rearward and downward from the setting position of the shaft pin 34Da of the above-described locking/unlocking link 34D into contact with a corner portion 34E2 formed to protrude on the outer peripheral portion in the counter-clockwise direction. As shown in FIGS. 17 and 18, when the above-described memory lever 6 is operated and the input link 34 is rotated about the shaft pin 34A, the corner portion 34E2 of the above-described driving gear 34E is pressed by the kick piece 34Dc of the locking/unlocking link 34D operated to move in conjunction with the above movement, so that the driving gear 34E is pushed and rotated in the clockwise direction in the figure about the shaft pin 34A. Then, with the above rotation, the driving gear 34E transmits its rotational force to the memory operation link 35 to push and rotate the memory operation link 35 against the above-described spring biasing force (not shown). As shown in FIG. 19, when the above-described memory lever 6 is operated to the overstroke position, the kick piece 34Dc of the locking/unlocking link 34D is removed from the corner portion 34E2, so that the driving gear 34E is not operated to be excessively pressed from the locking/unlocking link 34D.

<Specific Configuration of Memory Operation Link 35>

As shown in FIGS. 10 and 12, the memory operation link 35 is provided in a state of being rotatably pin-connected to the above-described base bracket 31 by a shaft pin 35A having an axis oriented in the vehicle width direction. The input gear 35B is formed on an outer peripheral portion of the above-described memory operation link 35. The input gear 35B is gear-connected to the gear portion 34E1 of the above-described driving gear 34E and receives the rotational force. Further, the output gear 35C is additionally formed on an outer peripheral portion of the memory operation link 35 different from the portion on which the input gear 35B is formed. The output gear 35C is gear-connected to the driven gear 32Aa of the operation shaft 32A connected to an end portion of the above-described rod 32 and can transmit the rotational force to the operation shaft 32A.

As shown in FIG. 12, the above-described memory operation link 35 is normally biased to rotate in the clockwise direction in the figure about the shaft pin 35A by a spring (not shown) hooked between the above-described base bracket 31 and the memory operation link 35. With the above biasing, the memory operation link 35 is normally maintained in a state where its rotation is stopped at the rotational position where the driving gear 34E gear-connected to the memory operation link 35 via the above-described input gear 35B is locked by the locking/unlocking link 34D. As shown in FIGS. 17 to 19, as the above-described memory lever 6 is operated, the memory operation link 35 receives the power transmission from the driving gear 34E and is turned in the counter-clockwise direction in the figure about the shaft pin 35A against the spring biasing force (not shown).

Meanwhile, as shown in FIGS. 10 and 12, a receiving hole 35D is formed in the above-described memory operation link 35. The receiving hole 35D can receive a holding pin 36B protruding in the vehicle width direction from the holding link 36 (to be described later) as a state in which the holding pin 36B can be moved within a certain range in the rotation direction or the radial direction. In the receiving hole 35D, an outer peripheral surface on the outer side in the radial direction centered on the shaft pin 35A is curved in an arc shape drawn about the shaft pin 35A. However, in the receiving hole 35D, a lead-in hole 35Da is formed at a tip region from an intermediate portion in the clockwise direction in the figure. The lead-in hole 35Da is expanded in a shape in which the outer peripheral surface on the outer side in the radial direction is widened in a stepwise manner.

As shown in FIG. 12, the holding pin 36B incorporated in the above-described receiving hole 35D is normally maintained as a state of being pressed on the outer peripheral surface on the outer side in the radial direction in the above-described receiving hole 35D by an action of the spring biasing force (not shown) applied to the holding link 36 (to be described later). With the above configuration, when the above-described memory operation link 35 is in its initial state position before being operated to rotate, the holding pin 36B is maintained as a state of being pressed on the outer peripheral surface of the region in the above-described receiving hole 35D offset in the rotation direction from the lead-in hole 35Da. As shown in FIG. 17, when the above-described memory operation link 35 is pushed and rotated in the clockwise direction in the figure about the shaft pin 35A by operating the memory lever 6, the holding pin 36B slides on the outer peripheral surface of the above-described receiving hole 35D to release the rotational movement of the memory operation link 35.

However, as shown in FIG. 18, upon reaching the formation area of the lead-in hole 35Da with the progress of rotation of the above-described memory operation link 35, the holding pin 36B enters the lead-in hole 35Da to be pressed on the outer peripheral surface of the lead-in hole 35Da by an action of the spring biasing force (not shown) applied to the above-described holding link 36. Then, as the memory operation link 35 is further operated to rotate from that state, the holding pin 36B is adapted to slide on the outer peripheral surface of the lead-in hole 35Da, as shown in FIG. 19.

Therefore, after the holding pin 36B enters the lead-in hole 35Da as described above, as shown in FIG. 20, when a hand of operating the memory lever 6 is released and the memory operation link 35 tries to perform a return rotation in the counter-clockwise direction in the figure by a spring biasing force (not shown), the holding pin 36B is abutted against a stepped surface of the lead-in hole 35Da and is held in a state where the return rotation of the memory operation link 35 is restricted. With the restriction of the return rotation, the memory operation link 35 is held in a rotated state, so that the lock spring 13 unlocked via the above-described release arm 33A is maintained in a positional state of being released.

Further, as shown in FIGS. 10 and 12, a separate swinging link 35E is provided as a state of being rotatably pin-connected to the portion of the above-described memory operation link 35 extending forward and upward from the setting position of the shaft pin 35A by a shaft pin 35Ea having an axis oriented in the vehicle width direction. Normally, as shown in FIG. 12, the swinging link 35E is biased to rotate in the counter-clockwise direction (forward direction) in the figure about the shaft pin 35Ea by a spring (not shown) hooked between the above-described memory operation link 35 and the swinging link 35E. With the above biasing, the swinging link 35E is normally maintained in a state where its rotation is stopped at the rotational position where it is brought into contact with a locking piece 35F formed at a tip portion of the above-described memory operation link 35 extending forward and upward.

As shown in FIG. 17, as the above-described memory operation link 35 is operated to rotate by operating the memory lever 6, the above-described swinging link 35E moves integrally with the memory operation link 35 in the counter-clockwise direction in the figure about the shaft pin 35A. Then, an engaging pin 37B protruding in the vehicle width direction from the lower front end portion of the control link 37 (to be described later) is pressed downward by an engaging piece 35Eb extending downward from the setting position of the shaft pin 35Ea against a spring biasing force (not shown) applied to the control link 37.

With the above pressing, as shown in FIG. 18, the swinging link 35E is adapted to push and rotate the control link 37 in the counter-clockwise direction in the figure about the shaft pin 37A that is the rotation center of the control link 37 with the progress of rotation movement of the memory operation link 35. Then, as the control link 37 is pushed and rotated, the swinging link 35E is operated so as to pull up the slide pin 36D which is inserted in both the elongated hole 37C formed in the above-described control link 37 and an elongated hole 36C formed in the holding link 36 (to be described later) and is provided so as to be slidable within a common hole shape of the elongated holes. Here, the elongated hole 36C formed in the above-described holding link 36 corresponds to the "first elongated hole" in the disclosure, and the elongated hole 37C formed in the control link 37 corresponds to the "second elongated hole" in the disclosure.

Figure 20:
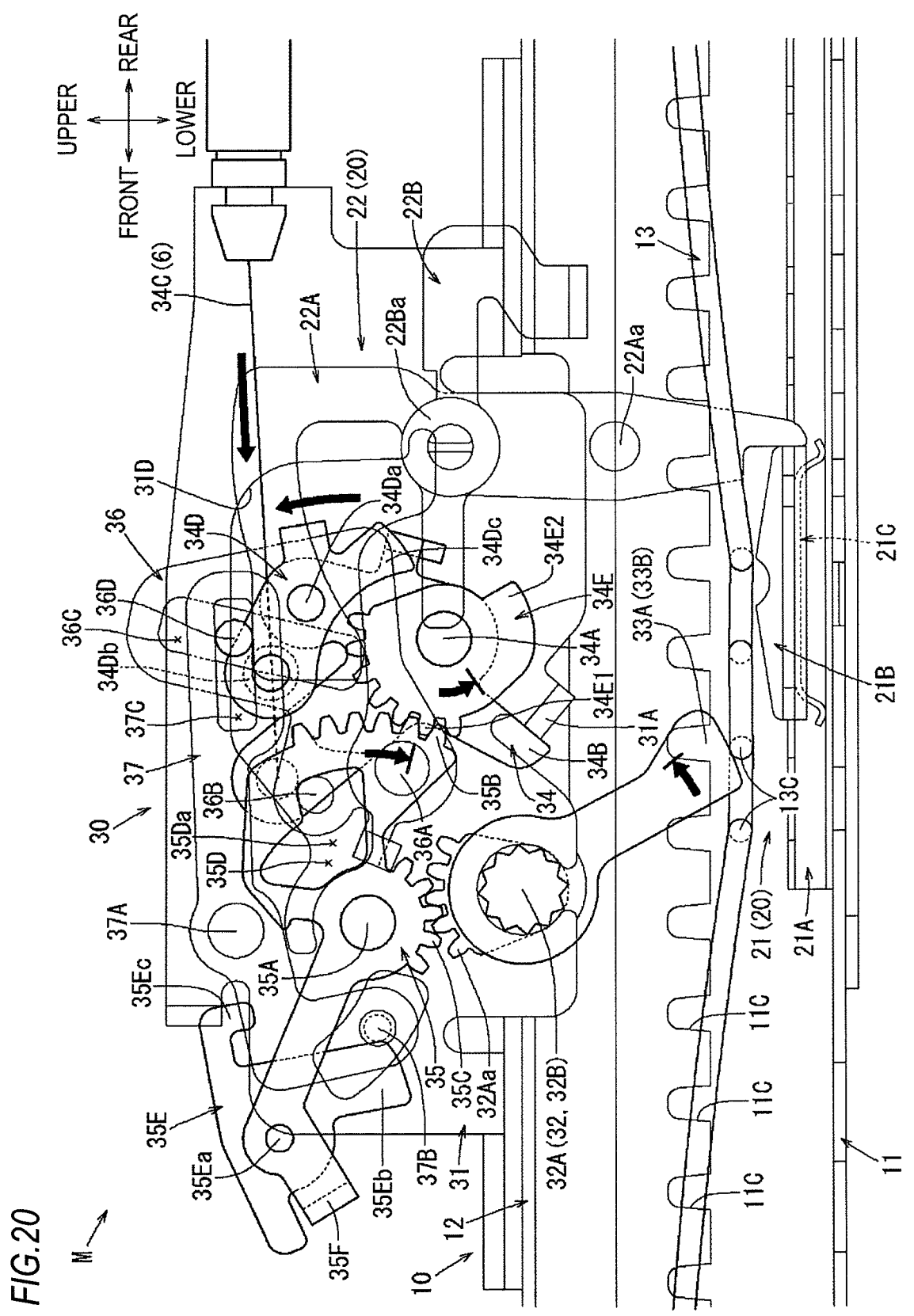
FIG. 20 is a side view showing a state in which an operation hand is released after operation of the memory lever.

In addition, as shown in FIGS. 19 and 20, as the above-described memory operation link 35 is operated to the rotational position where the above-described holding pin 36B enters the lead-in hole 35Da, the swinging link 35E is removed forward from a state in which the above-described engaging piece 35Eb presses the engaging pin 37B of the control link 37 downward and can be changed to a state in which it does not press the engaging pin 37B any more. Then, in this way, as shown in FIG. 20, the engaging pin 37B tries to return to the upward movement by a spring biasing force (not shown) applied to the control link 37. However, at that time, since the slide pin 36D pulled up by the above-described control link 37 moves on the pressing piece 22Ac of the detection link 22A (to be described later) and is stopped, the return movement of the engaging pin 37B is also stopped at that position.

Thereafter, as shown in FIG. 21, as the seat position is retracted and the detection link 22A is switched to the rearwardly tilted posture, the above-described control link 37 is rotated such that the slide pin 36D moving on the pressing piece 22Ac of the detection link 22A is biased to be dropped to a space formed by the retreating of the pressing piece 22Ac. In this way, the engaging pin 37B of the control link 37 is moved upward and pressed against the rear surface of the engaging piece 35Eb of the swinging link 35E, so that the swinging link 35E is rotated in the clockwise direction (backward direction) in the figure about the shaft pin 35Ea against a spring biasing force (not shown).

In this way, the swinging link 35E is maintained in a state where a locking claw 35Ec formed at the portion extending rearward from the setting position of the shaft pin 35Ea is brought into contact with the portion of the memory operation link 35 extending forward and upward from the upper side and the rotation of the swinging link 35E with respect to the memory operation link 35 in the clockwise direction (backward direction) in the figure is restricted. Then, with such rotation restriction, the rotation posture of the control link 37 is also restricted at the rotational position where the engaging pin 37B is brought into contact with the swinging link 35E and is stopped. As shown in FIG. 12, due to the movement returning to the initial position state before the above-described memory operation link 35 is operated to rotate and by the action of a spring biasing force (not shown), the swinging link 35E is returned to a state in which it is brought into contact with the locking piece 35F of the memory operation link 35 in the counter-clockwise direction in the figure and is stopped.

<Specific Configuration of Holding Link 36>

As shown in FIGS. 10 and 12, the holding link 36 is provided as a state of being rotatably pin-connected to the above-described base bracket 31 by a shaft pin 36A having an axis oriented in the vehicle width direction. The holding pin 36B extending in the vehicle width direction is attached to the holding link 36 at an upper portion of the setting position of the shaft pin 36A. The holding pin 36B is assembled in a state of being inserted into the receiving hole 35D of the above-described memory operation link 35 in the vehicle width direction. As shown in FIG. 12, normally, the above-described holding link 36 is biased to rotate in the clockwise direction (backward direction) in the figure about the shaft pin 36A by a spring (not shown) hooked between the above-described base bracket 31 and the holding link 36. With the above biasing, the holding link 36 is normally maintained in a state where its rotation is stopped at the rotational position where the above-described holding pin 36B is locked by being brought into contact with a radially outer peripheral surface in the receiving hole 35D of the memory operation link 35.

As shown in FIG. 17, when the above-described memory operation link 35 is operated to rotate by operating the memory lever 6, the holding pin 36B of the above-described holding link 36 slides along the outer peripheral surface of the receiving hole 35D, thereby releasing the rotation of the memory operation link 35. Then, as shown in FIG. 18, the above-described holding pin 36B of the holding link 36 enters the formation area of the lead-in hole 35Da by the rotation of the above-described memory operation link 35, so that the holding link 36 is rotated in the clockwise direction (backward direction) in the figure about the shaft pin 36A by a spring biasing force (not shown), and the holding pin 36B is drawn into the lead-in hole 35Da. With this drawing, the holding pin 36B is displaced to be closer to the position immediately above the shaft pin 36A that is the rotation center of the holding link 36. Thus, even when the above-described memory operation link 35 is moved from the above state so as to return its rotation in the clockwise direction (backward direction) in the figure about the shaft pin 35A, the above-described holding pin 36B is abutted against a stepped surface of the lead-in hole 35Da with the shaft pin 36A of the above-described holding link 36 as a support portion and is held in a state of strongly restricting the returning operation of the memory operation link 35.

Meanwhile, as shown in FIGS. 10 and 12, an elongated hole 36C is formed at the portion of the above-described holding link 36 offset to the rear side from the setting position of the shaft pin 36A. The elongated hole 36C extends straightly upward in the initial state shown in FIG. 12. Further, in the elongated hole 36C, the slide pin 36D having an axis oriented in the vehicle width direction is assembled so as to be slidable only along the extending direction of the elongated hole 36C. The above-described slide pin 36D is also inserted in both the elongated hole 37C of the control link 37 (to be described later) which is provided in a state of crossing with the above-described elongated hole 36C side by side in the vehicle width direction. With the above configuration, the slide pin 36D is provided so as to be slidable only in a region along a common hole shape in which the elongated hole 36C of the above-described holding link 36 and the elongated hole 37C of the control link 37 cross each other.

As the detection link 22A configuring the trigger 22 of the above-described memory mechanism 20 is pushed and moved by the movement of the seat position to the entrance support position in the vicinity of the rearmost shown in FIG. 23 or the returning movement of the seat position to the default position shown in FIG. 27, the above-described slide pin 36D is pressed by the pressing piece 22Ac of the detection link 22A and functions as a pressing portion for pushing and moving the holding link 36 in the counter-clockwise direction in the figure. As the holding link 36 is pushed and moved in the counter-clockwise direction in the figure via the slide pin 36D as described above, the above-described holding pin 36B is removed from the lead-in hole 35Da of the memory operation link 35, and the restriction holding state of the returning rotation of the memory operation link 35 by the holding pin 36B is released.

<Specific Configuration of Control Link 37>

As shown in FIGS. 10 and 12, the control link 37 is provided in a state of being rotatably pin-connected to the above-described base bracket 31 by the shaft pin 37A having an axis oriented in the vehicle width direction. The engaging pin 37B having a shaft protruding in the vehicle width direction is attached to the portion of the above-described control link 37 which extends by being bent forward and downward from the setting position of the shaft pin 37A. Further, the elongated hole 37C is formed at the portion of the control link 37 extending diagonally rearward and downward from the setting position of the shaft pin 37A. The elongated hole 37C extends diagonally and straightly rearward and downward along the extending direction. As shown in FIG. 12, the above-described control link 37 is normally biased to rotate in the clockwise direction (backward direction) in the figure about the shaft pin 37A by a spring (not shown) hooked between the above-described base bracket 31 and the control link 37. With the above biasing, the control link 37 is normally maintained in a state where its rotation is stopped at the rotational position where the engaging pin 37B is brought into contact with the base bracket 31 from the lower side.

In a state where the above-described control link 37 is maintained in its initial rotational posture, the elongated hole 37C formed in the above-described control link 37 is in a state of being placed in a posture position where it crosses with the elongated hole 36C of the above-described holding link 36 in a side view. In the elongated hole 37C of the control link 37, the slide pin 36D inserted into the elongated hole 36C of the above-described holding link 36 is also inserted within a common hole shape portion crossing the elongated hole 36C of the holding link 36. In this way, as shown in FIGS. 17 to 27, the above-described control link 37 can release the rotational movement of the above-described holding link 36 with respect to the control link 37 by the movement of sliding the slide pin 36D in the elongated hole 37C. Further, the control link 37 can change the position in the height direction of the slide pin 36D in the elongated hole 36C of the holding link 36 by its rotational movement with respect to the holding link 36.

As shown in FIG. 17, as the above-described memory operation link 35 is operated to rotate by operating the memory lever 6, the engaging pin 37B of the above-described control link 37 is pressed downward by the engaging piece 35Eb of the above-described swinging link 35E rotating together with the memory operation link 35 and is turned in the counter-clockwise direction (forward direction) in the figure about the shaft pin 37A. With this rotation, as shown in FIG. 18, the control link 37 lifts the slide pin 36D inserted into the elongated hole 37C upward and moves the slide pin 36D toward a position higher than the pressing piece 22Ac of the detection link 22A configuring the trigger 22 of the above-described memory mechanism 20.

With the above movement, as shown in FIG. 19, at the stage at which the holding pin 36B of the holding link 36 enters the lead-in hole 35Da, the control link 37 lifts the position of the slide pin 36D in the elongated hole 36C of the holding link 36 up to a position higher than the pressing piece 22Ac of the detection link 22A. In this state, even when the holding link 36 is rotated in the clockwise direction in the figure, the slide pin 36D is moved to a position at which it overlaps with the pressing piece 22Ac in the front and rear direction without being pressed against the pressing piece 22Ac of the detection link 22A. In this way, the slide pin 36D can move on the upper surface of the pressing piece 22Ac.

As shown in FIG. 21, by retracting the seat position and switching the detection link 22A to the rearwardly tilted posture after the above-described operation of the memory lever 6, the control link 37 is rotated in the clockwise direction in the figure by its own spring biasing force to lower the slide pin 36D downward. With the above movement, when the detection link 22A is pushed and moved by the movement of the seat position to the entrance support position in the vicinity of the rearmost shown in FIG. 23 or by the returning movement of the seat position to the default position shown in FIG. 27, the slide pin 36D is moved to a position where it is pressed by the pressing piece 22Ac of the detection link 22A.

<Specific Configuration of Release Operation Link 38>

As shown in FIGS. 10 and 11, the release operation link 38 is provided in a state of being rotatably pin-connected to the above-described base bracket 31 by a shaft pin 38A having an axis oriented in the vehicle width direction. As shown in FIG. 11, normally, the above-described release operation link 38 is biased to rotate around the shaft pin 38A in a counter-clockwise direction (forward direction) in the figure by a spring (not shown) hooked between the above-described base bracket 31 and the release operation link 38. With this biasing, the release operation link 38 is normally maintained in a state where its rotation is stopped at the rotational position where a protruding piece 38B formed to protrude upward on an upper portion of the setting position of the shaft pin 38A is brought into contact with a locking piece 31C formed on the base bracket 31.

A release piece 38C is formed at the rear edge of the portion of the above-described release operation link 38 extending rearward from the setting position of the shaft pin 38A and is brought into contact with the pressure receiving piece 22Bc of the stopper link 22B configuring the trigger 22 of the above-described memory mechanism 20 from the upper side. Further, a pressure receiving piece 38D is formed at the portion of the above-described release operation link 38 extending downward from the portion extending rearward from the setting position of the shaft pin 38A. A rear end portion of the above-described loop handle 5 dented into a shape opening forward is inserted into the pressure receiving piece 38D. In this way, as shown in FIGS. 13 and 14, the pressure receiving piece 38D is operated to be pressed downward by the operation of the loop handle 5. Further, as shown in FIGS. 10 and 11, an operation pin 38E is formed at the portion of the above-described release operation link 38 extending rearward from the setting position of the shaft pin 38A. The operation pin 38E has a shaft protruding in the vehicle width direction and is inserted into an escape hole 40B (to be described later) formed in the memory release member 40.

As shown in FIG. 11, normally, the above-described operation pin 38E is brought into contact with an upper end portion of the escape hole 40B of the memory release member 40, thereby functioning to restrict the position of movement of the memory release member 40 to move downward with respect to the release operation link 38 by a biasing force of a spring (not shown) hooked between the release operation link 38 and the memory release member 40. With the above configuration, as shown in FIG. 13, the release operation link 38 is adapted to be move downward integrally with the memory release member 40 to an operation position in the middle of being pushed down by the operation of the loop handle 5. However, even when the position of the release operation link 38 is restricted in the course of the operation movement thereof by fitting the pressing piece 40C on the lower end side of the above-described memory release member 40 into the concave surface portion 21Ba1 of the memory piece 21B configuring the above-described memory mechanism 20 and pushing down the memory piece 21B to the position where the memory piece 21B is bottomed out, the relative movement of the release operation link 38 being pushed down independently while leaving the memory release member 40 is elastically allowed by the above-described movement of the operation pin 38E being moved downward in the escape hole 40B, as shown in FIGS. 14 and 15.

<Specific Configuration of Memory Release Member 40>

As shown in FIGS. 10 and 11, the memory release member 40 is formed of a substantially plate-like member having a surface oriented in the vehicle width direction and is provided side by side so as to be adjacent to the above-described release operation link 38 in the vehicle width direction. The above-described memory release member 40 is provided in a state where a slide claw 40A formed by being bent in the vehicle width direction at a front upper end portion thereof is brought into contact with a guide piece 31B formed in the above-described base bracket 31 from the front side. The guide piece 31B extends in an upwardly protruding shape. Further, in the above-described memory release member 40, the operation pin 38E provided so as to protrude in the vehicle width direction from the above-described release operation link 38 is inserted, slidably in the height direction, into an escape hole 40B formed in the middle portion thereof and extending a straight shape in a height direction.

As shown in FIG. 11, the above-described memory release member 40 is normally biased in the operation direction of being pushed down with respect to the release operation link 38 and in the movement direction of pressing the slide claw 40A against the guide piece 31B of the base bracket 31 from the front side by a spring (not shown) hooked between the above-described release operation link 38 and the memory release member 40. With the above biasing, the posture of the memory release member 40 with respect to the release operation link 38 is normally maintained at a state in which the operation pin 38E of the release operation link 38 is pressed against the upper end portion in the escape hole 40B.

As shown in FIG. 13, as the release operation link 38 is operated to be pushed down about the shaft pin 38A by operating the above-described loop handle 5, the above-described memory release member 40 is adapted to straightly move downward while sliding the slide claw 40A along the guide piece 31B of the base bracket 31 in conjunction with the release operation link 38. With the above movement, the pressing piece 40C formed at the lower end portion thereof is fitted into the concave surface portion 21Ba1 of the memory piece 21B configuring the above-described memory mechanism 20 and the memory piece 21B is pushed down to the position where the memory piece 21B is bottomed out, so that the memory piece 21B is adapted to be released from the position restriction state with respect to the memory rail 21A.

Then, as the operation of the loop handle 5 is further advanced from that state, as shown in FIG. 14, while leaving the memory release member 40 in a state where the movement in the downward direction is restricted by being fitted with the above-described memory piece 21B, the release operation link 38 is elastically pushed down in the downward direction by moving the operation pin 38E downward in the escape hole 40B. In this way, a bottom portion on the rear end side of the loop handle 5 pushes and deflects the lock portions 13C of the lock spring 13 downward, thereby releasing the locked state of the lock spring 13. Thus, even when the loop handle 5 is further operated from the above state to the overstroke position as shown in FIG. 15, since excessive downward movement amount of the release operation link 38 with respect to the memory release member 40 according to this operation is elastically released, this operation can be performed without applying overload on each part.

<Specific Configuration of Forced Release Link 41>

As shown in FIGS. 10 and 11, the forced release link 41 is provided in a state of being rotatably pin-connected to the above-described base bracket 31 by a shaft pin 41A having an axis oriented in the vehicle width direction. As shown in FIG. 11, normally, the above-described forced release link 41 is biased to rotate around the shaft pin 41A in the clockwise direction (backward direction) in the figure by a spring (not shown) hooked between the above-described base bracket 31 and the forced release link 41. With this biasing, the forced release link 41 is normally maintained in a state where its rotation is stopped at the rotational position where a pressure receiving piece 41B extending forward from the setting position of the shaft pin 41A is brought into contact with the operation pin 38E of the above-described release operation link 38 from the lower side.

As shown in FIGS. 13 to 15, as the release operation link 38 is operated to be pushed down about the shaft pin 38A by operating the above-described loop handle 5, the above-described forced release link 41 is operated such that the pressure receiving piece 41B is pushed down by the operation pin 38E of the release operation link 38 and is pushed and rotated in the counter-clockwise direction (forward direction) in the figure. With the above configuration, as the loop handle 5 is operated from a state in which the seat position is displaced to an arbitrary intermediate position while maintaining its memory state by the operation of the memory lever 6 as described with reference to FIG. 21, the pressing piece 41C of the forced release link 41 extending upward from the setting position of the shaft pin 41A presses the above-described holding link 36 from the rear side directly to the front side, thereby forcibly rotating the holding link 36 to the front side. With this rotation, similarly to the state shown in FIG. 23, the holding pin 36B of the holding link 36 is removed from the lead-in hole 35Da of the memory operation link 35, thereby cancelling the released and maintained state of the lock spring 13.

<Overall Operation>

To summarize the above, the memory mechanism 20 and the operation mechanism 30 configuring the above-described slide rail device M are adapted to be moved so that the seat position can be adjusted in the following manner by operating the loop handle 5 and the memory lever 6 described above. First, as shown in FIG. 4, the case where the operation of the loop handle 5 is performed from the state in which the seat position is in the using position such as a driving position will be described. Meanwhile, in the following description, as shown in FIG. 11, the state in which the concave surface portion 21Ba1 of the memory piece 21B is positioned directly below the pressing piece 40C of the memory release member 40, the detection link 22A is brought into an upright posture in which the leg piece 22Ab is brought into contact with the rear end portion of the memory piece 21B, and the lock spring 13 is maintained in the locked state will be described as an initial state.

Specifically, when the loop handle 5 is operated from the initial state, first, as shown in FIG. 13, the release operation link 38 is operated to be pushed down by the loop handle 5, and the pressing piece 40C on the lower end side of the memory release member 40 moving together with the release operation link 38 is fitted into the concave surface portion 21Ba1 of the memory piece 21B. The pressing piece 40C pushes down the memory piece 21B to the position where the memory piece 21B is bottomed out, and removes the memory piece 21B from the position restriction state with respect to the memory rail 21A. Then, as the operation of the loop handle 5 is further advanced from that state, as shown in FIG. 14, the release operation link 38 is elastically pushed down together with the loop handle 5 while leaving the memory release member 40, and the lock spring 13 is pushed down by the loop handle 5 to release the slide lock state. Furthermore, with the movement of the release operation link 38, the stopper link 22B is operated to be pulled up to the height position where it is not brought into contact with the stopper bracket 15. Here, the operation of the above-described loop handle 5 can be maximally performed up to the overstroke position shown in FIG. 15.

Therefore, according to the above operation, the seat position to be displaced in the front and rear direction while causing the memory piece 21B to move together with the memory release member 40. Specifically, since the above operation causes the stopper link 22B to be pulled up to the height position where it is not brought into contact with the stopper bracket 15, the seat position can be moved to the rearmost beyond the stopper bracket 15, as shown in FIG. 16. Then, by returning the operation of the loop handle 5 after changing the seat position, the operation state of the above-described configurations is returned to the same state as that shown in FIG. 11, and the seat position is returned to the locked state at that position.

Subsequently, a case where the memory lever 6 is operated from the initial state will be described. Specifically, when the memory lever 6 is operated from the initial state shown in FIG. 12, first, as shown in FIG. 17, the input link 34 is rotationally operated via the cable 34C and the memory operation link 35 is rotationally operated via the locking/unlocking link 34D and the driving gear 34E, and the lock spring 13 is pushed down by the release arm 33A gear-connected to the memory operation link 35 via the operation shaft 32A to release the slide locked state. Then, as the operation of the memory lever 6 is further advanced from that state, the holding pin 36B elastically enters the lead-in hole 35Da from the receiving hole 35D of the memory operation link 35, as shown in FIG. 18. In this way, as shown in FIG. 20, by the hooking of the holding pin 36B, the memory operation link 35 is maintained in a state of being fixed at the rotational position where the lock spring 13 is operated to be released even when an operation hand is released from the operation of the memory lever 6 (even when the operation is returned). Here, the operation of the above-described memory lever 6 can be maximally performed up to the overstroke position shown in FIG. 19.

Figure 24:
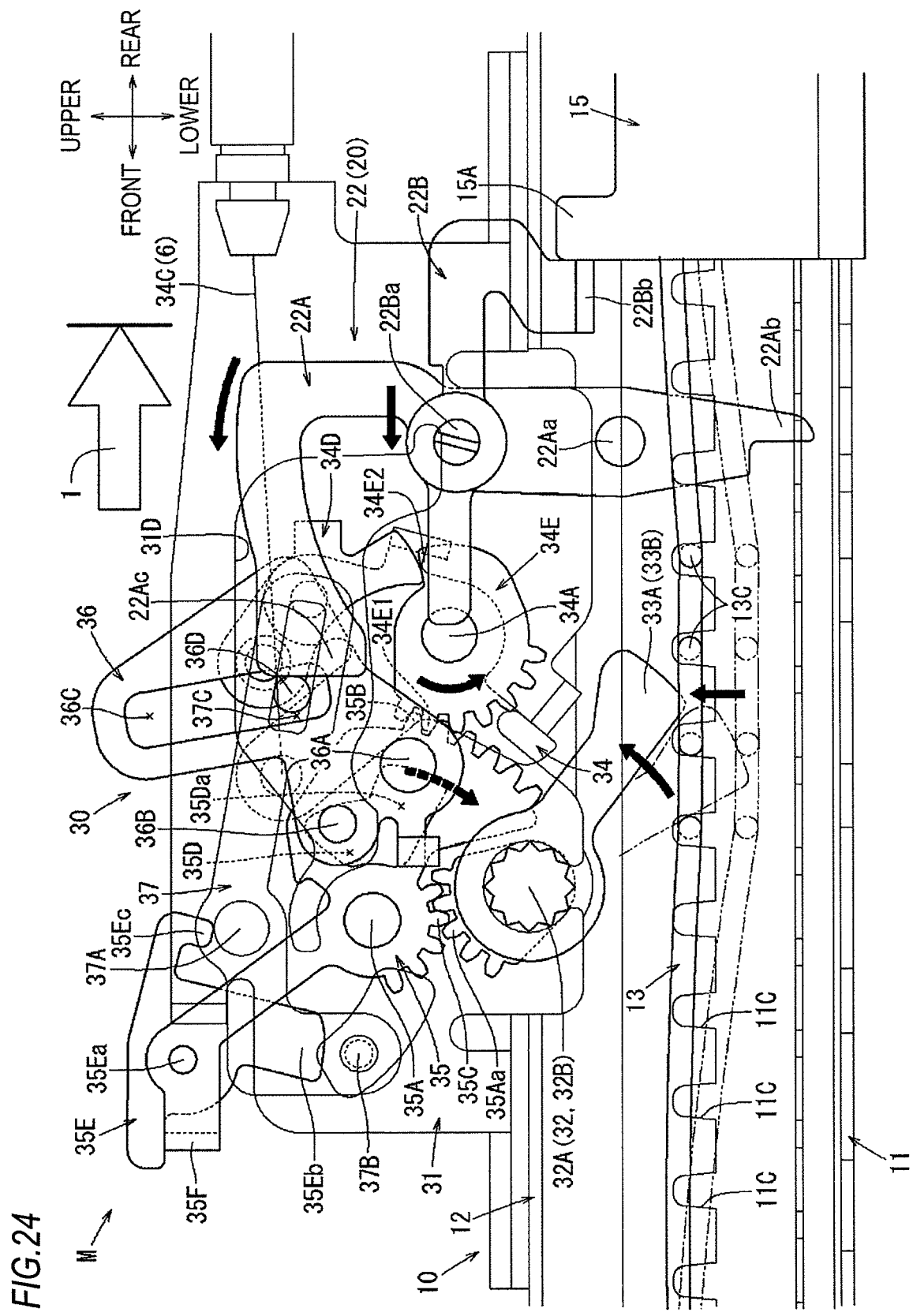
FIG. 24 is a side view showing a state in which the sliding is returned to the locked state by the releasing.

Accordingly, after the above operation, the seat position can be displaced in the rearward direction even when an operation hand is released from the operation of the memory lever 6. Then, subsequently, as shown in FIG. 21, for example, in order to widen the space for entering the vehicle, the seat position is displaced toward the rear side where the stopper bracket 15 is provided. In this way, the detection link 22A is released from the contact state with the memory piece 21B and is switched to the rearwardly tilted posture. Then, as the seat position is further displaced toward the rear side from that state, the stopper link 22B is brought into contact with the stopper bracket 15, as shown in FIG. 22. Then, as shown in FIG. 23, with the progress of the rearward movement of the seat position, the detection link 22A is pushed and rotated, and the slide pin 36D is pushed to the front side. In this way, the holding link 36 is pushed and rotated forward, and the holding pin 36B is removed from the lead-in hole 35Da of the memory operation link 35, so that the position holding state of the memory operation link 35 by the holding pin 36B is cancelled. Thereby, as shown in FIG. 24, the memory operation link 35 is returned to its initial position, and the lock spring 13 is returned to the locked state by a spring biasing force at that position, so that the seat position is locked at that position (entrance support position).

Figure 25:
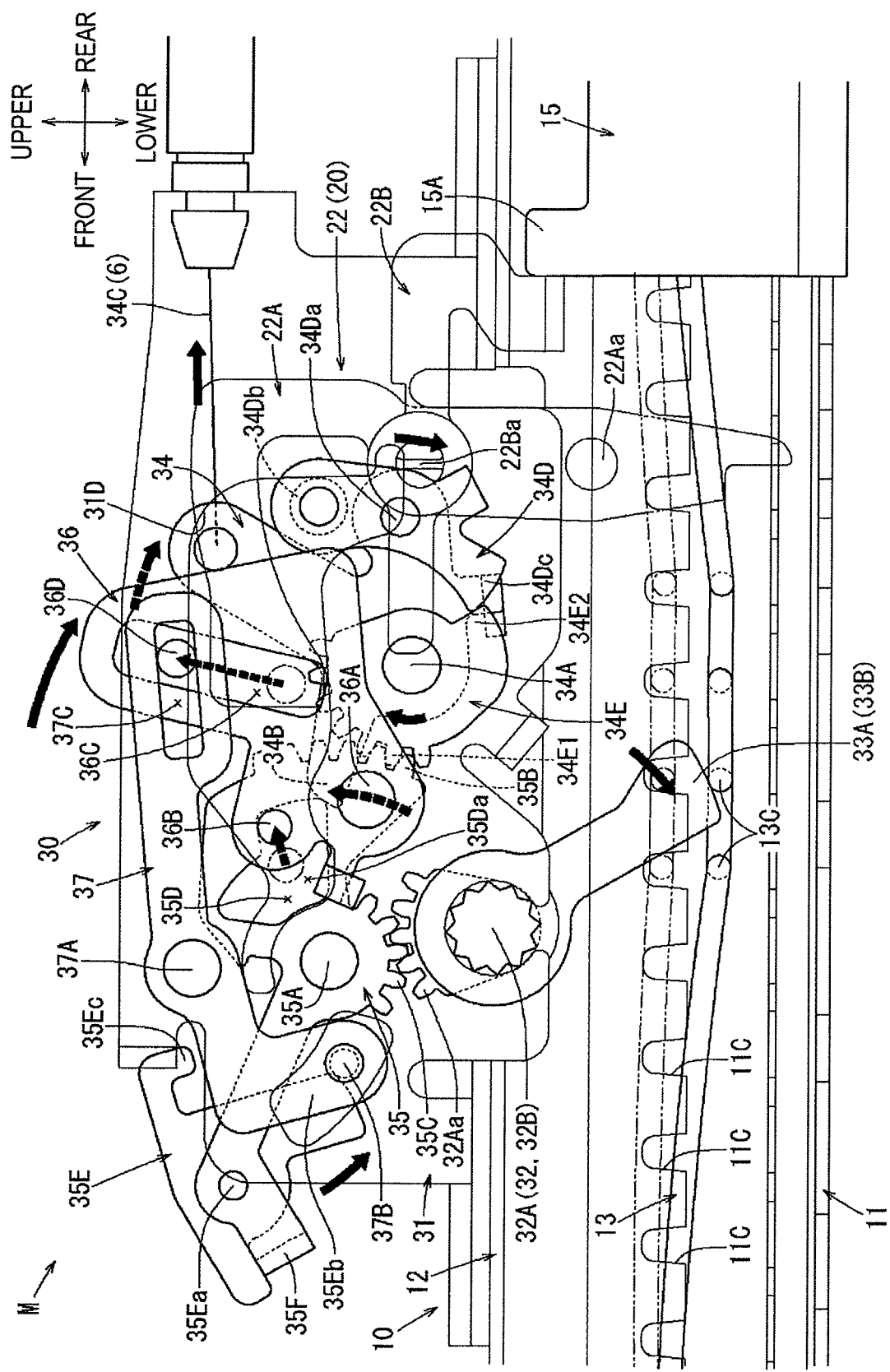
FIG. 25 is a side view showing a state in which the slide lock is released by operating the memory lever from the state of being locked at the entrance support position shown in FIG. 24.

Subsequently, a case where the memory lever 6 is operated again from a state in which the seat position is locked at the above position (entrance support position) will be described. Specifically, when the memory lever 6 is operated from the position (entrance support position) shown in FIG. 24, as shown in FIG. 25, in the same manner as in the above-described operation, the memory operation link 35 is rotationally operated via the input link 34, the locking/unlocking link 34D and the driving gear 34E through the cable 34C, and the lock spring 13 is pushed down by the release arm 33A gear-connected to the memory operation link 35 via the operation shaft 32A to release the slide locked state. As the operation of the memory lever 6 is further advanced, the holding pin 36B elastically enters the lead-in hole 35Da of the memory operation link 35, and the memory operation link 35 is maintained in a state of being fixed at the rotational position where the lock spring 13 is operated to be released.

Accordingly, after the above operation, the seat position can be displaced in the forward direction even when an operation hand is released from the operation of the memory lever 6. Then, subsequently, as shown in FIG. 26, the seat position is displaced toward the default position. In this way, the stopper link 22B is released from the contact with the stopper bracket 15 and is switched to the rearwardly tilted posture. Then, as the seat position is further displaced toward the front side from that state, the detection link 22A is brought into contact with the memory piece 21B, as shown in FIG. 27. Then, with the progress of the forward movement of the seat position, the detection link 22A is pushed and rotated, and the slide pin 36D is pushed to the front side. In this way, the holding link 36 is pushed and rotated forward, and the holding pin 36B is removed from the lead-in hole 35Da of the memory operation link 35, so that the position holding state of the memory operation link 35 by the holding pin 36B is cancelled. Thereby, the memory operation link 35 is returned to its initial position, and the lock spring 13 is returned to the locked state by a spring biasing force at that position, so that the seat position is locked at that position (default position).

Figure 28:
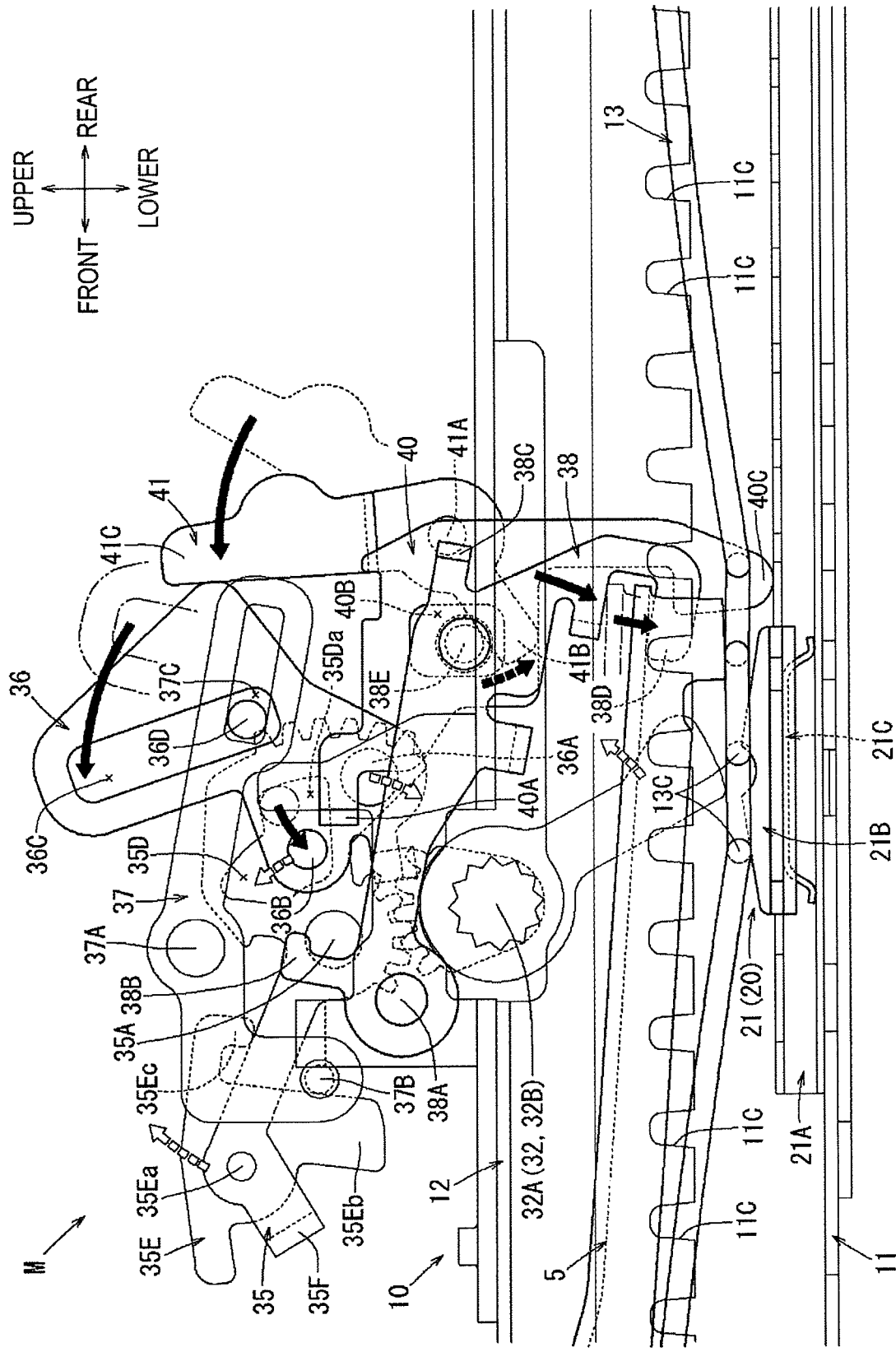
FIG. 28 is a side view showing a state in which the released and maintained state of the slide lock is released by a forced release link by operating the loop handle from the retreat state shown in FIG. 21.
Figure 29:
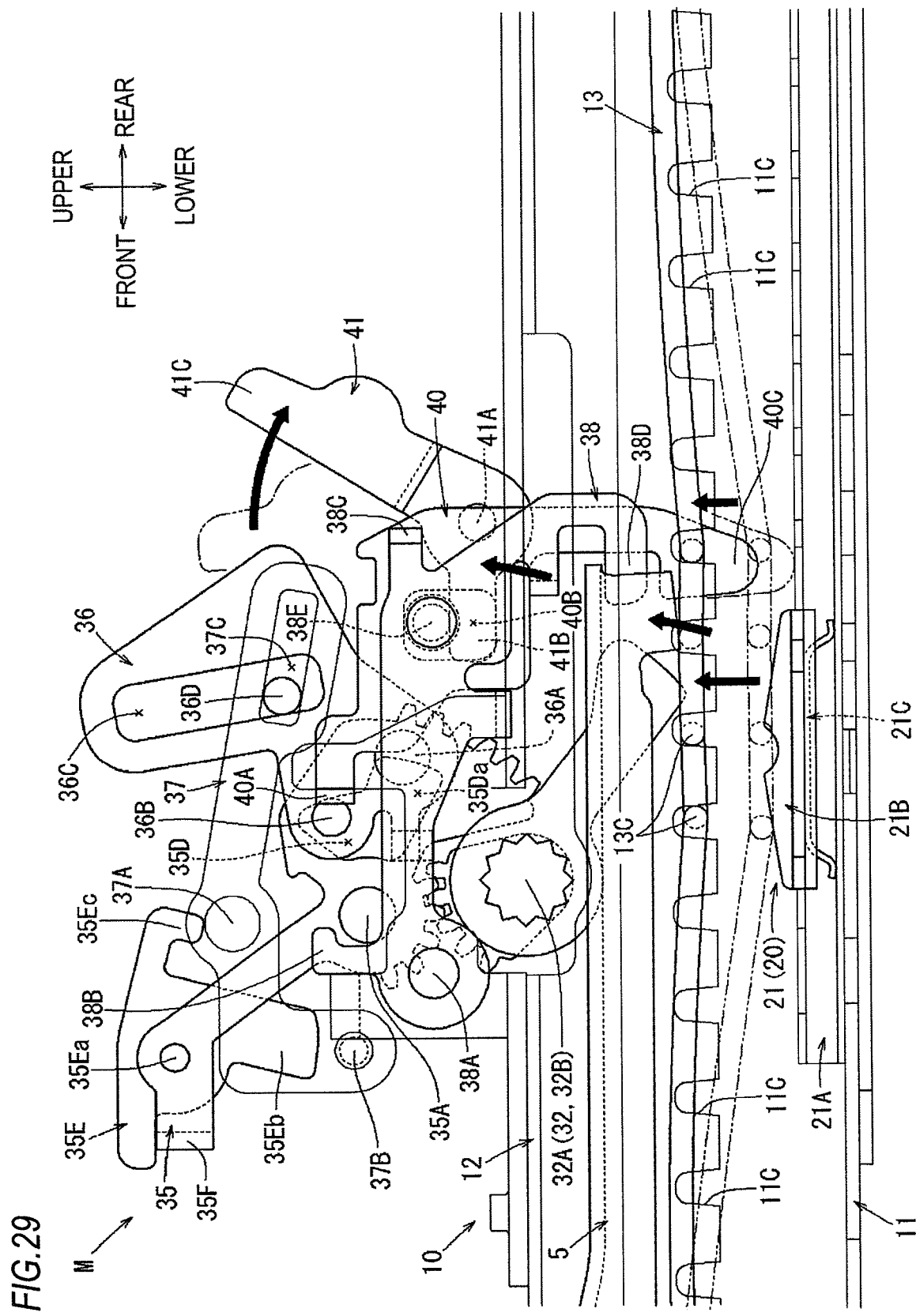
FIG. 29 is a side view showing a state in which the operation of the loop handle is returned after the operation.

Subsequently, a case where the loop handle 5 is operated from a state in which the seat position has been displaced to an arbitrary intermediate position while maintaining its memory state by the operation of the memory lever 6 as described with reference to FIG. 21 will be described. In this case, as shown in FIG. 28, the forced release link 41 is pushed and rotated with the operation of the loop handle 5, and the holding link 36 is pushed and rotated so as to cancel the position holding state of the memory operation link 35 by the pressing piece 41C of the forced release link 41. Thereby, the memory operation link 35 moves to be returned to its initial position. However, due to the lock spring 13 being pushed down by the operation of the loop handle 5, the memory operation link 35 is maintained in a state where the slide locked state is released. That is, the operation mechanism 30 is moved from the initial state shown in FIG. 11 to the same state as when the loop handle 5 is operated as shown in FIGS. 13 to 15. Therefore, as shown in FIG. 29, as the operation of the loop handle 5 is returned, the operation state of the above-described configurations is returned to the same state as that shown in FIG. 11, and the seat position is returned to the locked state at that position.

Subsequently, a case will be described in which the loop handle 5 is operated to an operated state as described with reference to FIG. 28 from a state in which the seat position is displaced to an arbitrary intermediate position while maintaining its memory state by the operation of the memory lever 6 as described with reference to FIG. 21, and then, the seat position is moved to the default position where the memory piece 21B is left while the operated state is maintained. In this case, as shown in FIG. 30, the memory release member 40 is brought closer to the memory piece 21B left in the default position from the rear side while being operated to be pushed down.

As a result, as shown in FIG. 31, with the progress of the forward movement of the seat position described above, the pressing piece 40C of the memory release member 40 described above is obliquely pressed against the inclined surface 21Ba3 on the rear side of the above-described memory piece 21B from the rear upper side to apply a pressing force in a front lower direction to the inclined surface 21Ba3. Thus, the memory piece 21B is pushed and inclined rearward and downward while pushing and bending the rear leg 21Cb of the leaf spring 21C so as to be tilted. Then, as shown in FIG. 32, with the progress of the forward movement of the seat position, the pressing piece 40C of the memory release member 40 slides forward on the rear-side inclined surface 21Ba3 while elastically pushing and tilting the above-described memory piece 21B rearward and downward. Then, the pressing piece 40C of the memory release member 40 is fitted into the concave surface portion 21Ba1 of the memory piece 21B and is returned, as in the state shown in FIG. 13, to the operation state in which the memory piece 21B is pushed down to the position where the memory piece 21B is bottomed out, that is, the state in which the memory piece 21B can move together with the memory release member 40.

Subsequently, a case will be described in which the speed of movement becomes abrupt due to momentum of collision or the like when the seat position is moved forward and returned toward the default position shown in FIG. 27 from the state in which the seat position is displaced to an arbitrary intermediate position while maintaining its memory state by the operation of the memory lever 6 as described with reference to FIG. 21. In this case, as described with reference to FIG. 33, when the movement of the lock spring 13 elastically restoring the locked state is delayed even in a case where the detection link 22A is brought into contact with the memory piece 21B and is pushed and rotated to a position where the detection link 22A is in the upright posture, the detection link 22A is pushed and rotated to a position where the detection link 22A is in the forwardly tilted posture beyond the upright posture, and the lock spring 13 returns to the locked state at that position to establish the slide lock state.

<Summary>

To summarize the above, the slide rail device M of the present embodiment has the following configurations. That is, the vehicle slide rail device (slide rail device M) includes the slide rail (slide rail 10) which is capable of adjusting the seat position when the lock mechanism (lock spring 13) is released, the memory mechanism (memory mechanism 20) which includes the memory member (memory piece 21B) configured to define the default position, which is the seat position before change, by mechanical engagement to allow the seat position to return to the default position. The vehicle slide rail device (slide rail device M) includes the memory operation link (memory operation link 35) which is configured to release the lock mechanism (lock spring 13) while leaving the memory member (memory piece 21B) in the state of defining the default position, the holding link (holding link 36) which is configured to, in response to the operation of the memory operation link (memory operation link 35), be engaged with the memory operation link (memory operation link 35) by being biased and hold the memory operation link (memory operation link 35) in the release operated position, and the detection member (detection link 22A) which is configured to, in response to moving the seat position in a state where the memory operation link (memory operation link 35) is held by the holding link (holding link 36), press the pressing portion (slide pin 36D) of the holding link (holding link 36) by being brought into contact with the trigger member (memory piece 21B or stopper bracket 15) installed at a predetermined slide position and be moved so as to release the holding state of the memory operation link (memory operation link 35) by the holding link (holding link 36) at the release operated position.

Further, the vehicle slide rail device (slide rail device M) includes the variable structure (control link 37) which is provided in a state of being engaged with the pressing portion (slide pin 36D) of the holding link (holding link 36) and is configured to change a position where the pressing portion (slide pin 36D) is arranged in the holding link (holding link 36) according to the movement of the memory operation link (memory operation link 35). In a state where the detection member (detection link 22A) is moved by being brought into contact with the trigger member (memory piece 21B or stopper bracket 15), the variable structure (control link 37) is configured to arrange the pressing portion (slide pin 36D) at a first position which is a position after the pressing portion (slide pin 36D) is pressed by the detection member (detection link 22A) (see FIG. 12). After the pressing portion (slide pin 36D) has been arranged at the first position, as the memory operation link (memory operation link 35) is operated and the holding link (holding link 36) is engaged with the memory operation link (memory operation link 35) by being biased, the variable structure (control link 37) is configured to move the pressing portion (slide pin 36D) to a second position where the interference between the pressing portion (slide pin 36D) and the detection member (detection link 22A) is avoided (see FIG. 18). After the pressing portion (slide pin 36D) has been moved to the second position, as the detection member (detection link 22A) moves apart from the trigger member (memory piece 21B or stopper bracket 15) and changes its posture by the change of the seat position, the variable structure (control link 37) is configured to move the pressing portion (slide pin 36D) to a third position at which the pressing portion (slide pin 36D) is capable of being pressed by the detection member (detection link 22A), the third position being located in the empty region from which the detection member (detection link 22A) has retreated due to the detection member (detection link 22A) changing its posture (see FIG. 21).

By adopting such a configuration, with the variable structure (control link 37), it is possible to switch between a state in which the pressing portion (slide pin 36D) is moved so as not to interfere with the detection member (detection link 22A) and a state in which the pressing portion (slide pin 36D) is returned to be capable of being pressed by the movement of the detection member (detection link 22A) by bringing the detection member (detection link 22A) into contact with the trigger member (memory piece 21B or stopper bracket 15). With this configuration, since it is not necessary to release and rotate the detection member (detection link 22A) so as to avoid the interference with the holding link (holding link 36) which engages with the memory operation link (memory operation link 35) in accordance with the operation of the memory operation link (memory operation link 35), it is possible to rationalize the entire structure.

Further, the pressing portion (slide pin 36D) includes the slide pin (slide pin 36D) assembled in a slidable state in the first elongated hole (elongated hole 36C) formed in the holding link (holding link 36). The variable structure (control link 37) includes the control link (control link 37) having the second elongated hole (elongated hole 37C) extending so as to intersect with the first elongated hole (elongated hole 36C) formed in the holding link (holding link 36). The slide pin (slide pin 36D) is also assembled in a slidable state in the second elongated hole (elongated hole 37C) of the control link (control link 37), so that the slide pin (slide pin 36D) slides within the first elongated hole (elongated hole 36C) and moves to the second position as the control link (control link 37) rotates according to the movement of the memory operation link (memory operation link 35).

With such a configuration, the variable structure (control link 37) can be simply configured by the control link (control link 37) that rotates so as to change the position of the slide pin (slide pin 36D) in accordance with the movement of the memory operation link (memory operation link 35).

Further, the control link (control link 37) is biased in the direction (clockwise direction in FIG. 12) opposite to the rotation direction in which the slide pin (slide pin 36D) moves toward the second position, and after the control link (control link 37) rotates to move the slide pin (slide pin 36D) to the second position in accordance with the movement of the memory operation link (memory operation link 35), as the memory operation link (memory operation link 35) reaches the rotational position where the memory operation link (memory operation link 35) is held at the release operated position by the holding link (holding link 36), the control link (control link 37) is released from the engagement state with the memory operation link (memory operation link 35) and causes, by being biased, the slide pin (slide pin 36D) to move on the detection member (detection link 22A) (see FIG. 20), and then, the slide pin (slide pin 36D) is moved to the empty region in accordance with the detection member (detection link 22A) changing its posture (see FIG. 21).

With such a configuration, it is possible to simply configure a structure of returning the slide pin (slide pin 36D) to a state in which the slide pin (slide pin 36D) can be pressed by the detection member (detection link 22A) in accordance with the posture change of the detection member (detection link 22A).

Other Embodiments

Although the embodiments of the disclosure have been described using one embodiment, the disclosure can be implemented in various forms other than the above embodiment. For example, the configuration of the vehicle slide rail device of the disclosure may be widely applied to seats provided for various vehicles other than automobiles, such as trains, aircrafts or ships, in addition to seats of an automobile other than the driver's seat. Further, the slide rail may change the seat position in the vehicle width direction. Further, the slide rail may be used for connecting a seat back to a vehicle body such as a sidewall of a vehicle in a state of being able to adjust a backrest angle, as disclosed in the literature such as JP-A-2010-274738.

Further, the slide rail lock mechanism is not limited to the locking type in which the spring itself attached to the upper rail (movable side rail) enters the lock groove of the lower rail (fixed side rail) by biasing and is locked, as described in the above embodiment. For example, as disclosed in the literature such as JP-A-2014-189218, the slide rail lock mechanism may have the locking type in which the lock claw attached to the upper rail enters the lock groove of the lower rail by a spring biasing force and is locked.

Further, the memory mechanism is not limited to the configuration which is used to define the default position of the seat position and temporarily retract the seat position from the default position. For example, the memory mechanism may be used to temporarily advance the seat position from the default position.

Further, the pressing portion of the holding link pressed by the detection member is not limited to the slide pin as described in the above embodiment. For example, the pressing portion may be moved to the second position where the interference with the detection member is avoided by the movement of appearance and retraction, or the pressing portion may be moved to an empty region from which the detection member has retreated as the detection member moves apart from the trigger member to change its posture and may be pressed by the detection member. Further, when the pressing portion is the slide pin, the shape of the first elongated hole formed in the holding link or the shape of the second elongated hole formed in the control link for sliding the slide pin is not limited to a linearly extending shape but may be extended in a curved shape or other shape.

What is claimed is:

1. A vehicle slide rail device comprising:
    a slide rail which is capable of adjusting a seat position when a lock mechanism is released;
    a memory mechanism which includes a memory member configured to define a default position, which is the seat position before change, by mechanical engagement to allow the seat position to return to the default position;
    a memory operation link which is configured to release the lock mechanism while leaving the memory member in a state of defining the default position;
    a holding link which is configured to, in response to an operation of the memory operation link, be engaged with the memory operation link by being biased and hold the memory operation link in a release operated position;
    a detection member which is configured to, in response to moving the seat position in a state where the memory operation link is held by the holding link, press a pressing portion of the holding link by being brought into contact with a trigger member installed at a predetermined slide position and be moved so as to release the holding state of the memory operation link by the holding link at the release operated position; and
    a variable structure which is provided in a state of being engaged with the pressing portion of the holding link and is configured to change a position where the pressing portion is arranged in the holding link according to a movement of the memory operation link,
    wherein, in a state where the detection member is moved by being brought into contact with the trigger member, the variable structure is configured to arrange the pressing portion at a first position which is a position after the pressing portion is pressed by the detection member, wherein, after the pressing portion has been arranged at the first position, as the memory operation link is operated and the holding link is engaged with the memory operation link by being biased, the variable structure is configured to move the pressing portion to a second position where an interference between the pressing portion and the detection member is avoided, and wherein, after the pressing portion has been moved to the second position, as the detection member moves apart from the trigger member and changes its posture by the change of the seat position, the variable structure is configured to move the pressing portion to a third position at which the pressing portion is capable of being pressed by the detection member, the third position being located in an empty region from which the detection member has retreated due to the detection member changing its posture.

2. The vehicle slide rail device according to claim 1, wherein the pressing portion includes a slide pin assembled in a slidable state in a first elongated hole formed in the holding link, wherein the variable structure includes a control link having a second elongated hole extending so as to intersect with the first elongated hole formed in the holding link, and wherein the slide pin is also assembled in a slidable state in the second elongated hole of the control link, and the slide pin slides within the first elongated hole and moves to the second position as the control link rotates according to the movement of the memory operation link.

3. The vehicle slide rail device according to claim 2, wherein the control link is biased in a direction opposite to a rotation direction in which the slide pin moves toward to the second position, and after the control link rotates to move the slide pin to the second position in accordance with the movement of the memory operation link, as the memory operation link reaches a rotational position where the memory operation link is held at the release operated position by the holding link, the control link is released from an engagement state with the memory operation link and causes, by being biased, the slide pin to move on the detection member, and then, the slide pin is moved to the empty region in accordance with the detection member changing its posture.

4. The vehicle slide rail device according to claim 1, wherein the trigger member includes the memory member.

* * * * *